United States Patent
Liem et al.

(10) Patent No.: US 11,187,792 B2
(45) Date of Patent: Nov. 30, 2021

(54) DEVICE FOR CONVERTING A TEMPORAL DELAY OF A SIGNAL TRANSMITTED BETWEEN A TRANSMITTER AND A RECEIVER

(71) Applicant: ELMOS SEMICONDUCTOR SE, Dortmund (DE)

(72) Inventors: Marco Liem, Berlin (DE); André Srowig, Heidelberg (DE)

(73) Assignee: ELMOS SEMICONDUCTOR SE, Dortmund (DE)

( * ) Notice: Subject to any disclaimer, the term of this patent is extended or adjusted under 35 U.S.C. 154(b) by 592 days.

(21) Appl. No.: 16/081,138

(22) PCT Filed: Feb. 22, 2017

(86) PCT No.: PCT/EP2017/054073
§ 371 (c)(1),
(2) Date: Aug. 30, 2018

(87) PCT Pub. No.: WO2017/148772
PCT Pub. Date: Sep. 8, 2017

(65) Prior Publication Data
US 2019/0086523 A1 Mar. 21, 2019

(30) Foreign Application Priority Data

Mar. 1, 2016 (DE) .................... 10 2016 103 688.9
Mar. 1, 2016 (DE) .................... 10 2016 103 689.7
(Continued)

(51) Int. Cl.
*G01S 7/48* (2006.01)
*G01S 7/4865* (2020.01)
(Continued)

(52) U.S. Cl.
CPC .......... *G01S 7/4865* (2013.01); *G01S 7/4811* (2013.01); *G01S 17/10* (2013.01)

(58) Field of Classification Search
None
See application file for complete search history.

(56) References Cited

U.S. PATENT DOCUMENTS 5,836,004 A * 11/1998 Jiang .................... G04F 10/005
341/166
2003/0051552 A1 3/2003 Ilnicki et al.
(Continued)

FOREIGN PATENT DOCUMENTS

DE 198 33 207 A1 2/2000
DE 101 38 531 A1 3/2003
(Continued)

OTHER PUBLICATIONS

International Search Report and Written Opinion for corresponding Patent Application No. PCT/EP2017/054073 dated May 17, 2017.

*Primary Examiner* — Hovhannes Baghdasaryan
(74) *Attorney, Agent, or Firm* — Mindful IP PLLC

(57) ABSTRACT

The device executes a method for determining the delay time of a first wavelet in a transmission path (I1). For this purpose, the first wavelet is transmitted into the transmission path (I1) at a time after a reference time. After passing through the transmission path (I1), the delayed and typically deformed transmission wavelet is scalar-multiplied with a second (analysis) wavelet. The result is compared to a reference value. The scalar product value adopts the reference value at a time ($t_s$). The delay of the first and/or second wavelet in relation to the reference time is adjusted according to said time ($t_s$) in relation to the reference time. An amplitude adjustment is not carried out.

6 Claims, 11 Drawing Sheets

(30) Foreign Application Priority Data

Figure 1:
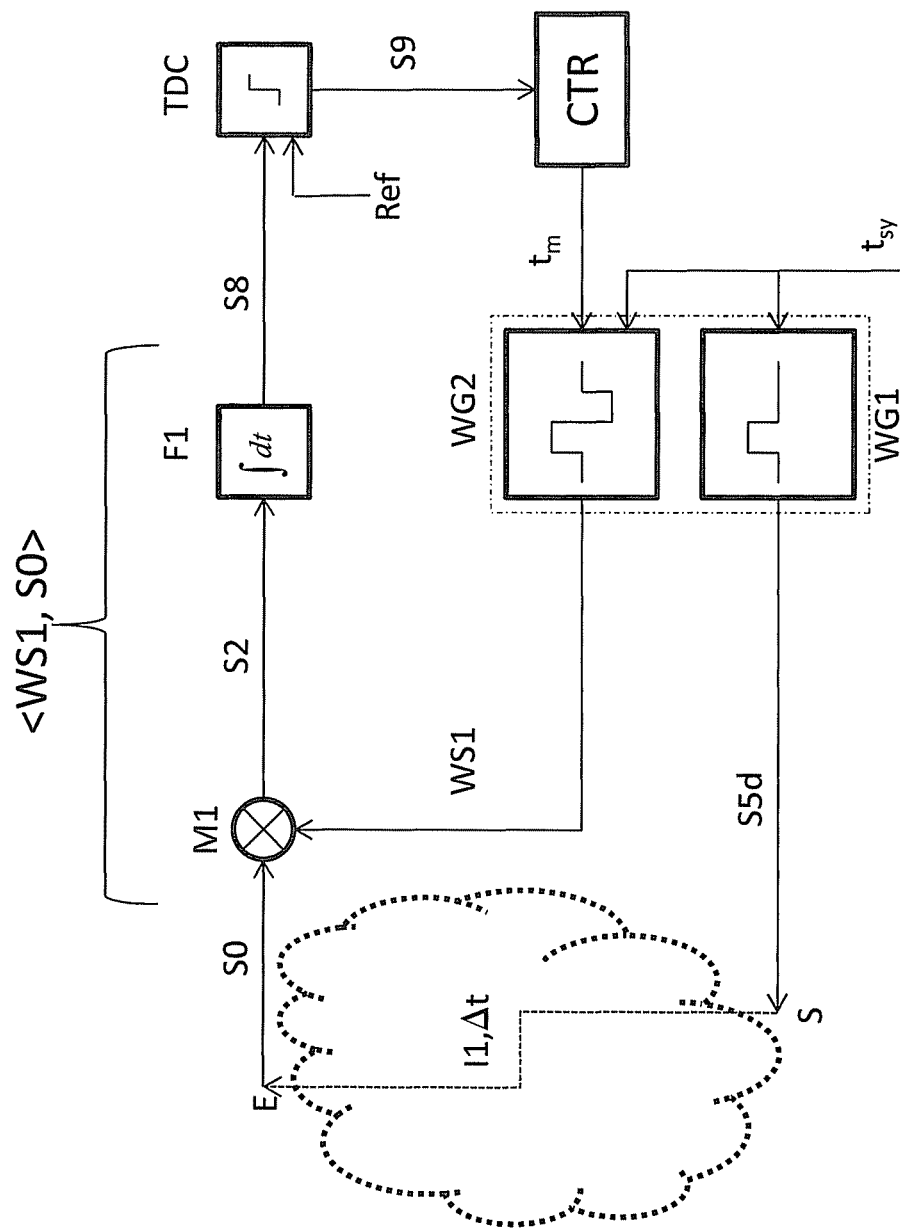

| | | | |
|---|---|---|---|
| Mar. 1, 2016 | (DE) | ................ | 10 2016 103 690.0 |
| May 9, 2016 | (DE) | ................ | 10 2016 108 488.3 |
| May 9, 2016 | (DE) | ................ | 10 2016 108 489.1 |
| May 9, 2016 | (DE) | ................ | 10 2016 108 490.5 |
| May 9, 2016 | (DE) | ................ | 10 2016 108 491.3 |
| May 9, 2016 | (DE) | ................ | 10 2016 108 492.1 |
| May 9, 2016 | (DE) | ................ | 10 2016 108 494.8 |
| May 9, 2016 | (DE) | ................ | 10 2016 108 495.6 |
| May 9, 2016 | (DE) | ................ | 10 2016 108 496.4 |
| May 9, 2016 | (DE) | ................ | 10 2016 108 497.2 |

(51) Int. Cl.
*G01S 17/10* (2020.01)
*G01S 7/481* (2006.01)

(56) References Cited

U.S. PATENT DOCUMENTS

| | | |
|---|---|---|
| 2007/0181786 A1 | 8/2007 | Doemens et al. |
| 2015/0160067 A1 | 6/2015 | Sai |

FOREIGN PATENT DOCUMENTS

| | | |
|---|---|---|
| DE | 101 53 741 A1 | 5/2003 |
| DE | 101 63 534 A1 | 7/2003 |
| DE | 102 21 578 A1 | 11/2003 |
| DE | 10 2007 023 920 A1 | 12/2008 |
| DE | 10 2007 046 562 A1 | 4/2009 |
| DE | 10 2008 018 718 A1 | 10/2009 |
| DE | 10 2009 020 218 B3 | 1/2011 |
| DE | 10 2009 037 596 A1 | 5/2011 |
| DE | 10 2011 076 635 B3 | 10/2012 |
| DE | 10 2012 206 089 A1 | 9/2013 |
| DE | 10 2016 108 488 B3 | 4/2017 |
| DE | 10 2016 108 489 B3 | 4/2017 |
| DE | 10 2016 108 490 B3 | 4/2017 |
| DE | 10 2016 108 491 B3 | 4/2017 |
| DE | 10 2016 103 688 B3 | 5/2017 |
| DE | 10 2016 103 690 B3 | 5/2017 |
| DE | 10 2016 108 492 B3 | 5/2017 |
| DE | 10 2016 108 494 B3 | 5/2017 |
| DE | 10 2016 108 495 B3 | 5/2017 |
| DE | 10 2016 108 497 B3 | 5/2017 |
| DE | 10 2016 108 496 A1 | 9/2017 |
| EP | 0 473 082 A2 | 3/1992 |
| EP | 1 293 803 A2 | 3/2003 |
| EP | 1 678 523 B1 | 7/2007 |
| EP | 1 048 961 B1 | 7/2009 |
| EP | 2 924 460 A1 | 9/2015 |
| WO | 02/25805 A2 | 3/2002 |
| WO | 2007/031102 A1 | 3/2007 |
| WO | 2013/083346 A1 | 6/2013 |

\* cited by examiner

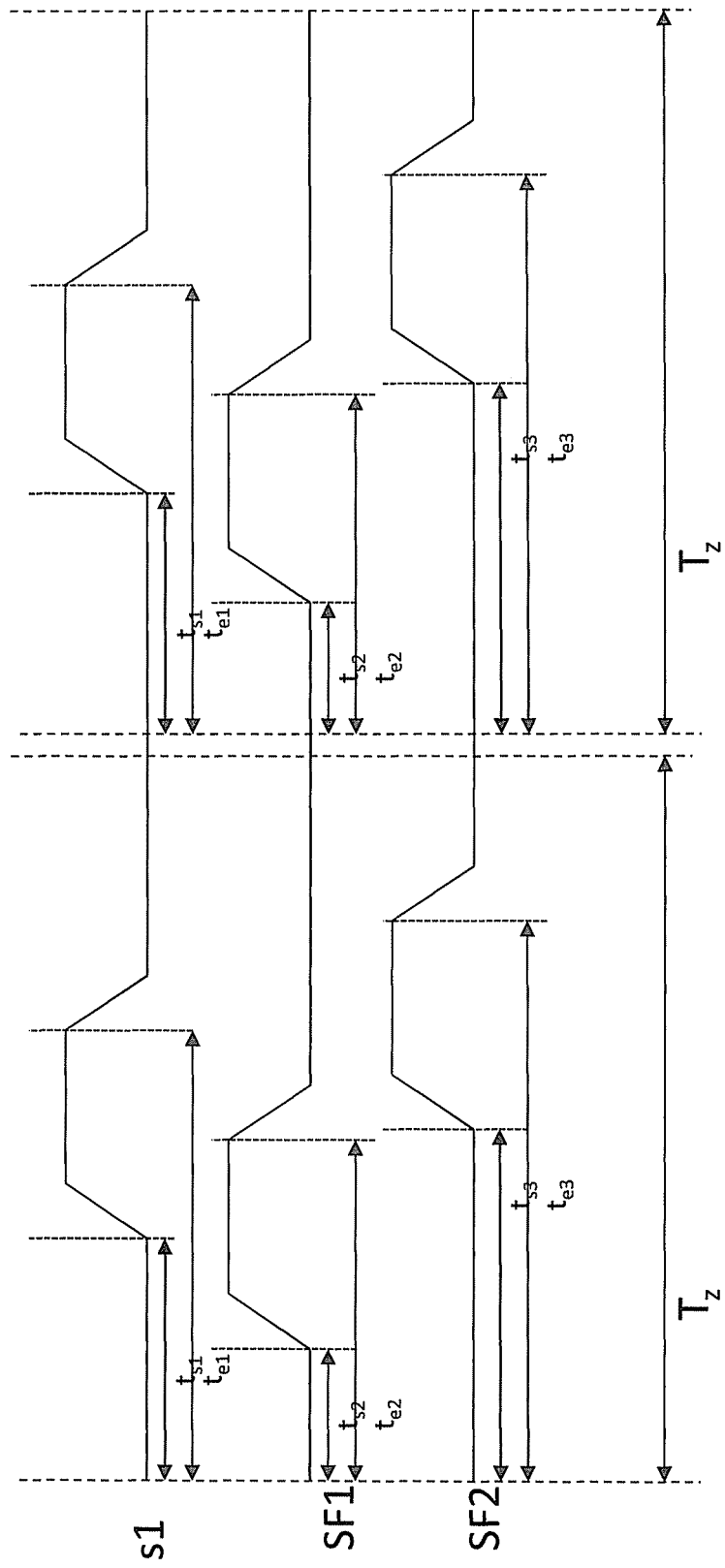

DEVICE FOR CONVERTING A TEMPORAL DELAY OF A SIGNAL TRANSMITTED BETWEEN A TRANSMITTER AND A RECEIVER

The present application claims the priorities of the German patent application 10 2016 103 689.7 of 1 Mar. 2016, 10 2016 103 688.9 of 1 Mar. 2016, 10 2016 103 690.0 of 1 Mar. 2016, 10 2016 108 488.3 of 9 May 2016, 10 2016 108 490.5 of 9 May 2016, 10 2016 108 491.3 of 9 May 2016, 10 2016 489.1 of 9 May 2016, 10 2016 108 492.1 of 9 May 2016, 10 2016 108 494.8 of 9 May 2016, 10 2016 108 495.6 of 9 May 2016, 10 2016 108 497.2 of 9 May 2016 and 10 2016 108 496.4 of 9 May 2016 whose contents are incorporated in the subject matter of the present patent application by reference.

The invention relates to a device for converting a temporal delay of an output signal of a receiver of a transmission path relative to a transmission signal transmitted by the transmitter of the transmission path. Particularly, the invention relates to

- an optical travel time measurement using a one- or two-stage delta-sigma method and an associated device,
- a method for a time-to-digital conversion by means of a transmission wavelet and an analysis wavelet with controlled delay,
- a method for time-to-digital conversion with controlled temporal wavelet compression by means of a transmission wavelet and an analysis wavelet with controlled delay,
- a method for time-to-digital conversion with controlled temporal wavelet compression by means of a transmission wavelet with controlled delay and an analysis wavelet,
- a device for time-to-digital conversion by means of a transmission wavelet and an analysis wavelet with controlled delay,
- a device for time-to-digital conversion by means of a transmission wavelet with controlled delay and an analysis wavelet,
- a device for time-to-digital conversion with controlled temporal wavelet compression by means of a transmission wavelet and an analysis wavelet with controlled delay,
- a device for time-to-digital conversion with controlled temporal wavelet compression by means of a transmission wavelet with controlled delay and an analysis wavelet, and
- an optical travel time measurement using a one- or two-stage delta-sigma method and an associated device.

The invention relates to a method for converting a temporal delay $\Delta t$ of a receiver output signal S0 relative to a delayed transmission signal S5$d$, to which the transmission wavelet signal S5$d$ has been subjected in a transmission path I1 of any physical nature during the conversion into the receiver output signal S0, into a digital value, particularly a binary value.

In many applications it is required that delay times of a signal relative to a transmitted signal is determined. Such applications relate to the travel time of electromagnetic waves, the travel time of electromagnetic waves or of sound waves (e. g. for distance determination e. g. for producing 3D images, as is exemplarily described in DE-A-101 53 742 and WO-A-02/25805, or the range determination), the flight time of particles, reaction times in chemistry, decay times in particle physics etc.

Typically, these delay times are to be further processed in digital data processing installations.

Against this background, the digitizing determination of such delay times is a general problem of the circuit technology.

From the literature many methods for the delta-sigma conversion of signal amplitudes are known. Common to all of them is that they comprise an amplitude-controlled feedback control loop. In the case of minor deviations, the amplitude is strongly affected by noise and quantization errors which limit the resolution. If the delay of an analog receiver output signal relative to a digital transmission signal is to be determined, the analog receiver output signal is summated to a negative-feedback analog feedback signal to generate an analog filter input signal. The analog filter input signal indicates the weighted difference between the amplitude-value-discrete output signal and the analog receiver output signal. It is an object of the prior art to control this deviation to zero. Therefore, in the simplest case, the analog filter input signal is integrated into the analog filter output signal with the aid of a first filter. More complicated filter algorithms are conceivable. The analog filter output signal is then converted into an amplitude-value-discrete output signal. This amplitude-value-discrete output signal is then multiplied by an analog factor to generate an analog feedback signal and returned to the feedback control loop. For determining the delay between the amplitude-value-discrete output signal and the digital transmission signal, they are compared with each other in a digital manner. The determination of the delay in a transmission path I1 is thus performed in the three independent steps:

- generating the digital transmission signal and feeding it into the transmission path I1 and extracting the receiver output signal at the end of the transmission path;
- generating an amplitude-value-discrete output signal which represents the receiver input signal;
- comparing the thus generated amplitude-value-discrete output signal with the digital transmission signal and regulating an amplitude difference to zero.

Each of these three steps leads to errors in the processing during the determination of a digital value which represents the delay in the transmission path.

Such an amplitude-value-discrete device is known from EP-A-2 924 460, for example. In the method described there the amplitude portion of the basic wavelets is determined on an input signal by a scalar product generation which can be realized by multiplication and subsequent low-pass filtering. In a second step the thus determined amplitude portion values of the respective basic wavelets are multiplied by these basic wavelets, multiplied by minus 1 and mixed to generate a compensation signal controlling a compensation transmitter which also irradiates into the receiver of the device according to EP-A-2 924 460. If the feedback control loop is stable, the individual amplitude values of the respective wavelets indicate the measuring result as a measuring value vector. During trials it has turned out that the method according to the invention described below is superior to the method and the device of EP-A-2 924 460, and that with the invention a resolution higher by at least one order of magnitude can be reached.

It is an object of the invention to provide a solution which reduces the aforementioned drawbacks of the prior art occurring as process errors.

According to the invention, this object is achieved by a device for converting into a digital value, particularly a binary value, a temporal delay of an output signal S0 of a receiver E of a transmission path I1 relative to a transmission wavelet signal S5$d$ transmitted into the transmission path I1 by a transmitter S, comprising

- a transmission wavelet signal generator WG1 for generating the transmission wavelet signal S5$d$ on the basis of a first temporal wavelet WL1 having a first reference time point $t_0$, wherein the transmission wavelet signal S5$d$ is defined, by respective parameters adapted to be predetermined by the transmission wavelet signal generator WG1, with respect to its temporal position, i. e. its start and/or its end time point, wherein both time points are variable, and/or with respect to its temporal expansion or compression, i. e. the temporal interval between its start and its end time point, wherein both time points are variable in a concurrent or countercurrent manner, and/or with respect to its amplitude,
- a first analysis wavelet generator WG2 for generating a first analysis wavelet signal WS1 on the basis of a second temporal wavelet WL2 having a second reference time point $t_0+t_v$, wherein the first analysis wavelet signal WS1 is defined, by respective parameters adapted to be predetermined by the first analysis wavelet signal generator WG2, with respect to its temporal position, i. e. its start and/or its end time point, wherein both time points are variable, and/or with respect to its temporal expansion or compression, i. e. the temporal interval between its start and its end time point, wherein both time points a variable in a concurrent or countercurrent manner, and/or with respect to its amplitude,
- a scalar product unit WS1, SO for calculating a temporal scalar product signal S8 from the receiver output signal S0 and the first analysis wavelet signal WS1,
- a time-to-digital converter TDC for generating a time-continuous value-discrete, particularly binary evaluation signal S9 for the length of a predeterminable measuring time interval by comparing the magnitude of the scalar product signal S8 with a first reference value Ref and for changing the value of the evaluation signal S9 at that time point $t_0+t_s$ at which the scalar product signal S8 becomes equal to the reference value Ref or larger than the reference value Ref, i. e. "crosses" and/or "intersects" the threshold defined by the reference value, and
- a feedback controller CTR for varying either at least one of the parameters defining the transmission wavelet signal S5$d$ in the transmission wavelet signal generator WG1 or at least one of the parameters defining the first analysis wavelet signal WS1 in the first analysis wavelet signal generator WG2 or both at least one of the parameters defining the transmission wavelet signal S5$d$ in the transmission wavelet signal generator WG1 and at least one of the parameters defining the first analysis wavelet signal WS1 in the first analysis wavelet signal generator WG2, namely in dependence on the time point $t_0+t_s$ at which, relative to the reference time point $t_0$ of the first temporal wavelet WL1 of the transmission wavelet signal S5$d$, the scalar product signal S8 becomes equal to the reference value Ref or larger than the reference value Ref, i. e. "crosses" and/or "intersects" the threshold defined by the reference value.

Thus the device according to the invention uses wavelets for converting a temporal delay into a digital value, particularly a binary value. Wavelets within the meaning of the invention are signal waveforms as described in https://en.wikipedia.org/wiki/Wavelet#Definition_of_a_wavelet of 21 Feb. 2017. A wavelet is thus a wave-shaped oscillation with an amplitude whose amount starts at zero, then rises and/or alternately rises and falls and finally ends at zero. A wavelet may typically be visualized as a "small wave", as in the case of the recording of a seismograph or a heartbeat monitor. Generally, wavelets are purposefully developed and have special properties which make them useful for the signal processing. Wavelets can be combined, namely using reversing, shifting, multiplying and integrating processes which are also referred to as convolution and may comprise ranges of known signals for extracting information from unknown signals.

The invention operates over individual measuring time intervals. These measuring time intervals are determined by the length of the wavelets used, but may also be larger than those. In any case, the start and the end of the wavelet are situated within one measuring time interval. Preferably, all the measuring time intervals have the same length.

As stated above, the device according to the invention comprises, inter alia, a scalar product unit. In the simplest case the scalar product of two signals is generated by integration via the product of the instantaneous value, namely over a measuring time interval. By using wavelets which are zero at the start or after the start of the measuring time interval and at the end or before the end of the measuring time interval, it is ensured that the integration is automatically ended without a special device being required for this purpose. The integrator can thus permanently operate, whereby the control of the integrator is simplified.

The scalar product must be executed over the measuring time interval for the scalar product of two orthogonal wavelets to actually become zero.

Generally, the scalar product $<a,b>$ of two signals a and b should have the following properties for the signals a,b,c: $<a,g*b>=g*<a,b>$ with g as the real number $<a,b+c>=<a,b>+<a,c>$. In addition, a signal ai should preferably exist for each signal a with $<a,ai>=1$ (existence of the inverse element). However, this is not absolutely necessary but advantageous. Finally, a signal 0 should preferably exist having the property $<a,0>=0$. The scalar product can, but must not be commutative: $<a,b>=<b,c>$.

According to a preferred embodiment of the invention it is provided that the scalar product unit WS1, SO is provided with a multiplier M1 for calculating a filter input signal S2 as a multiplication of the receiver output signal SO and the first analysis wavelet signal WS1, and with a first filter F1, particularly a low-pass filter, for filtering the filter input signal S2. More preferably, the first filter F1 is an integrator or is operated as such.

According to another preferred embodiment the device further comprises:

- a correction unit KE for generating a correction signal K1 in dependence on the time point $t0+t_s$ at which, relative to the reference time point $t_0$ of the first temporal wavelet WL1 of the transmission wavelet signal S5$d$, the scalar product signal S8 becomes equal to the reference value Ref or larger than the reference value Ref,
- a summator S1 for generating a corrected scalar product signal S10 by adding the correction signal K1 to the scalar product signal S8, and
- a second filter F2, particularly a low-pass filter, for filtering the corrected scalar product signal S10 for generating a filtered scalar product signal S11, wherein the filtered scalar product signal S11 is adapted to be fed to the time-to-digital converter TDC for generating the evaluation signal S9.

Preferably, the second filter F2 is an integrator or is operated as such.

Preferably, the time-to-digital converter TDC is a comparator.

According to a preferred embodiment of the invention, it is provided that the first wavelet WL1 of the transmission wavelet signal generator WG1 and the second wavelet WL2 of the first analysis wavelet signal generator WG2 are configured such that the value of the scalar product signal S8 depends, in a temporal range about the temporal working point in a monotonously decreasing, particularly strictly monotonously decreasing, or monotonously increasing, particularly strictly monotonously increasing manner, on the temporal delay $\Delta t$ of the transmission wavelet signal S5$d$ from the transmitter of the transmission path I1 to its receiver E, wherein the temporal delay $\Delta 1$ is situated in a temporal interval whose length is different from zero.

According to the invention it was recognized that due to the execution of the temporal digitization in a single step the sequence of the steps to be performed is reduced to the following sequence:
1. generating the digital transmission signal and feeding it into the transmission path I1 and extracting the receiver output signal from the transmission path;
2. generating and temporally regulating a time-continuous value-discrete evaluation signal relative to the transmission signal which represents an intersection point of the filter output signal with a reference value, wherein the time-continuous value-discrete evaluation signal represents the delay time.

In the invention (in contrast to prior art) an amplitude discretization by regulating the amplitude of a filter input signal thus does explicitly not take place. In contrast to prior art, according to the invention neither an amplitude nor amplifications or amplitudes are controlled by the generator output signals used in the feedback control loop, nor is the amplitude of the transmission signal controlled. It is an object of the feedback control according to the invention, in contrast to prior art, not to control the filter output signal such that the amplitude values coincide with each other, but rather to control them such that the temporal intersection point of the filter input signal having a first constant amplitude value coincides with the temporal intersection point of the receiver input signal having a second amplitude value.

These first and second amplitude values are typically, but not necessarily zero and equal.

The object of converting a temporal delay $\Delta t$ of the receiver output signal S0 relative to a transmission wavelet signal S5$d$ which has been subjected to delaying during its transmission along a transmission path I1 of any physical nature is, in practice, achieved by the following steps according to the invention:

First, the transmission wavelet signal S5$d$ is generated on the basis of a first temporal wavelet WL1. In each time segment $T_s$ in which a wavelet is generated, this wavelet has a first reference point $t_0$. In the following, this reference time point $t_0$ serves as a temporal reference point within a time segment $T_s$. The time segments $T_s$ preferably do not overlap each other.

Second, the thus generated transmission wavelet signal S5$d$ is fed into said transmission path I1. It passes through the transmission path I1 and is converted into the receiver output signal S0 at the end of the transmission path SI1. Typically, at the end of the transmission path I1 a receiver is located which generates this receiver output signal S0. Concerning the problem described here, the nature of the transmission path I1, the transmitter or the receiver is irrelevant.

Third, a first analysis wavelet signal WS1 is generated on the basis of a second wavelet WL2. This second wavelet WL2 is typically not identical with the first wavelet WL1 and typically has a different second reference time point $t_0+t_v$ at least in the respective time segment. Typically, it is provided with a first delay time $t_v$ relative to the first reference time to of the first wavelet WL1 in the time segment.

Fourth, a temporal scalar product signal S8 is generated by a scalar product generation between the receiver output signal S0 and the first analysis wavelet signal WS1. The nature of the scalar product is a subject matter of further embodiments of the invention.

Fifth, a time-continuous value-discrete evaluation signal S9 is generated by comparing the value of the scalar product signal S8 with a first reference value Ref and changing the value of the time-continuous value-discrete evaluation signal S9. This is preferably performed in a comparator, namely at that (intersection) time point at which (in relation to the first reference time point) the value of the scalar product signal S8 assumes a reference value Ref.

Sixth, the first delay time $t_v$ is varied in dependence on the intersection time point $t_0+t_s$. The variation of the delay time L is thus dependent on the time point of the value change of the evaluation signal S9 and not on its amplitude, which is the essential difference between the invention and prior art. According to the invention, it has been recognized that such a time point of the value change of the evaluation signal S9 can be essentially more exactly determined than a concrete amplitude. Hereby, the temporal resolution is improved by at least the factor 10. Instead of a feedback control of the second reference time point $t_0+t_v$ of the second wavelet WL2, a feedback control of the first reference time point $t_0+t_v$ of the first wavelet WL1 can be performed, for example, wherein, preferably, the second wavelet WL2 has a second reference time point $t_0$ without a delay $t_v$. Of course, these two feedback control systems can be mixed. Wavelet are characterized by having a delay $t_v$ and further a signal compression $\alpha$ for the transformation. This corresponds to the phase $\varphi$ and the frequency $\omega$ of the Fourier transformation. Accordingly, in a further variant of the invention it is provided, instead of the delay $t_v$, to control the first compression $\alpha_1$ of the first wavelet WL1 during the generation of the delayed transmission signal in dependence on the time point of the value change of the evaluation signal S9, or to control the second compression $\alpha_2$ of the second wavelet WL2 in dependence on the time point of the value change of the evaluation signal S9. Of course, these feedback control methods, too, can be combined. The combination can include the feedback control of the delay. A combination of a plurality of analysis wavelet signals WS1, WS2 in corresponding paths is possible.

As has already been stated, a feedback control method on the basis of a signal value change (change of the value and/or the state of the evaluation signal from 0 to 1 (or vice versa), or from 1 to 2 etc.) comprises an essentially higher resolution than a method on the basis of an amplitude value.

According to another embodiment of the invention, potential errors are further minimized. This is realized by the generation of a correction signal K1 in dependence on the intersection time point $t_0+t_s$. As a next step, a corrected scalar product signal S10 is generated by adding the value of the correction signal K1 to the value of the scalar product signal S8. By filtering the corrected scalar product signal S10 the filtered scalar product signal S11 is generated. As a rule, an integrator or a low-pass filter is used. The thus generated filtered scalar product signal S11 is then used instead of the scalar product signal S8 for generating the time-continuous value-discrete evaluation signal S9. This offers the advantage that the resultant resolution error is further minimized.

A possible concrete realization of the scalar product generation comprises the generation of a filter input signal S2 by multiplication of the receiver output signal S0 by the first analysis wavelet signal WS1 as well as the subsequent filtering of the filter input signal S2 to generate the scalar product signal S8. This filtering, too, is typically performed as an integration and/or low-pass filtering.

Preferably, certain demands are made on the wavelets, which are, however, not absolutely necessary. It is particularly preferred that the first wavelet WL1 and the second wavelet WL2 are selected such that the value of the scalar product signal S8 depends, in a monotonously decreasing, particularly strictly monotonously decreasing, or monotonously increasing, particularly strictly monotonously increasing manner, on the temporal delay $\Delta t$ of the transmission wavelet signal S5$d$ in the transmission path I1 relative to the receiver output signal S0. This should at least be the case in a predetermined range. The temporal delay $\Delta t$ should be situated in a temporal interval whose length is different from zero.

Figure 2:
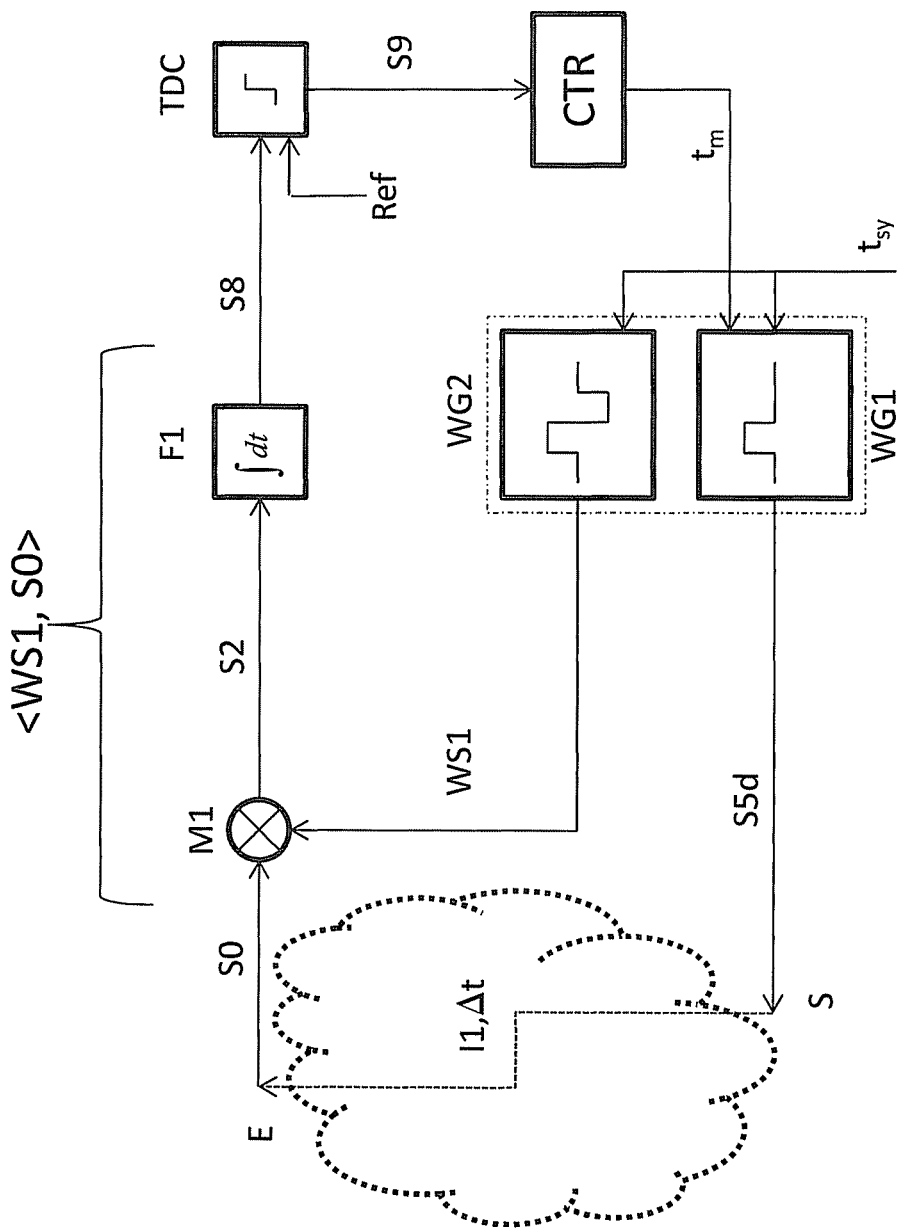
Figure 3:
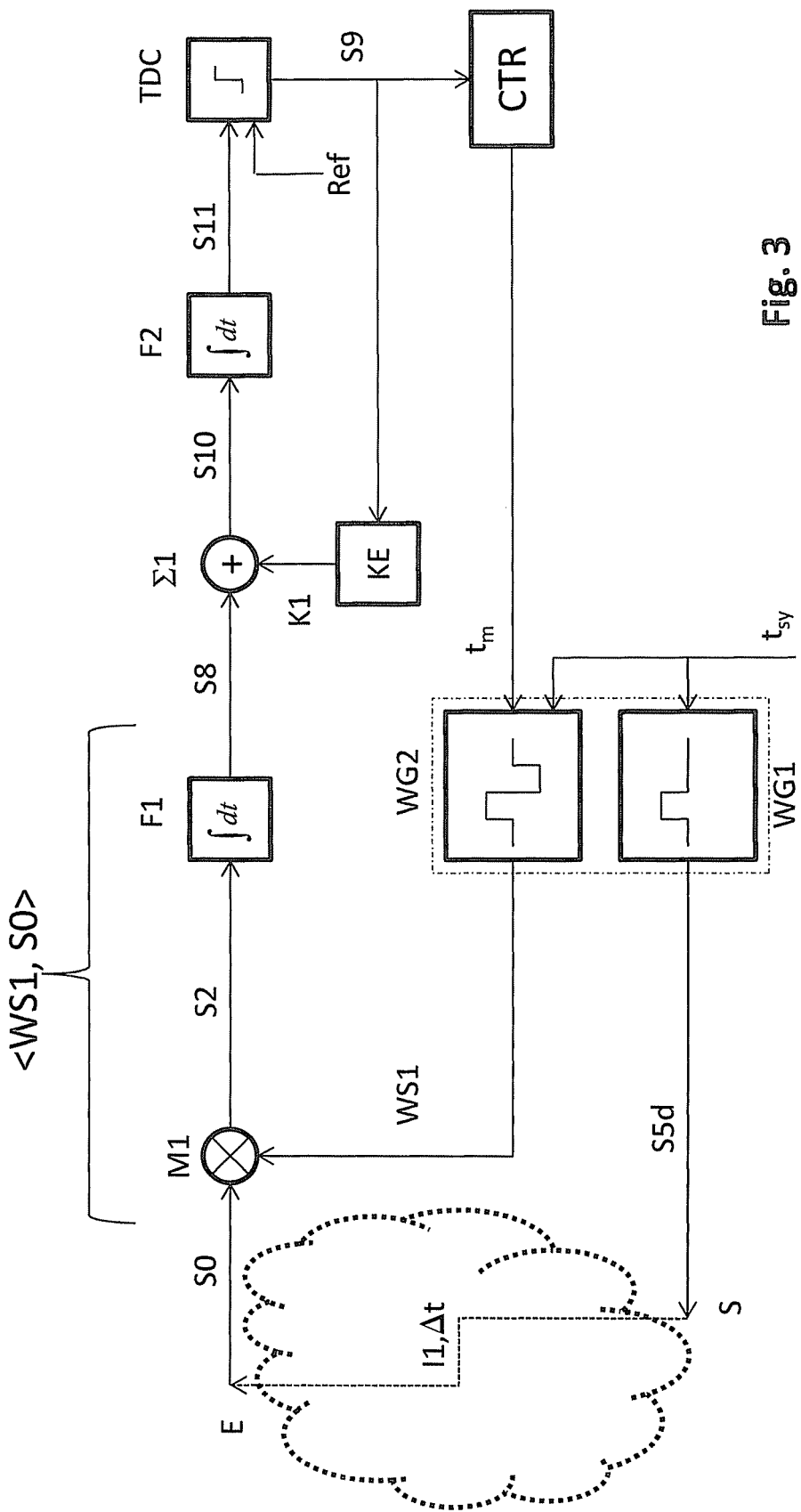
Figure 4:
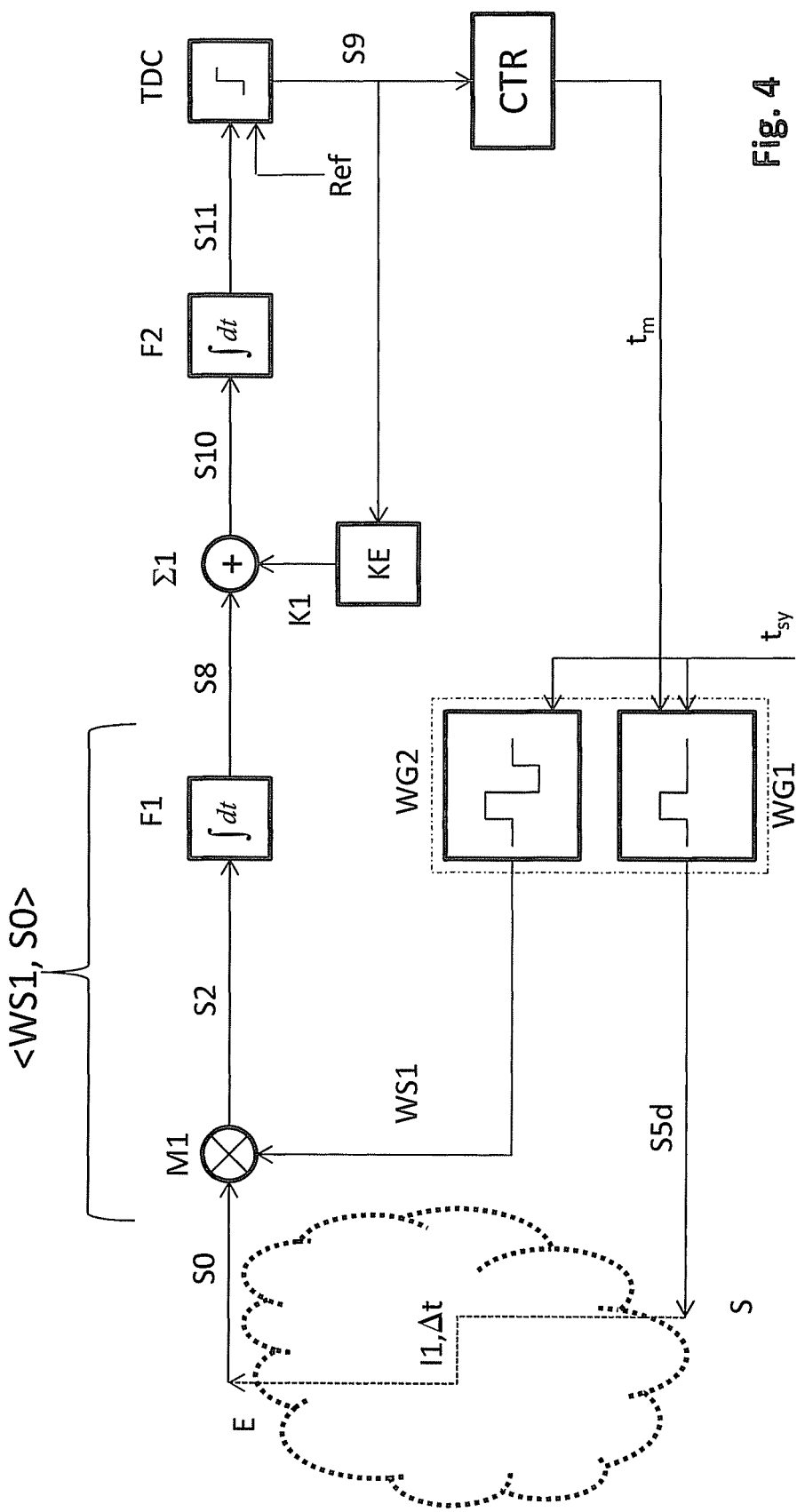
Figure 5:
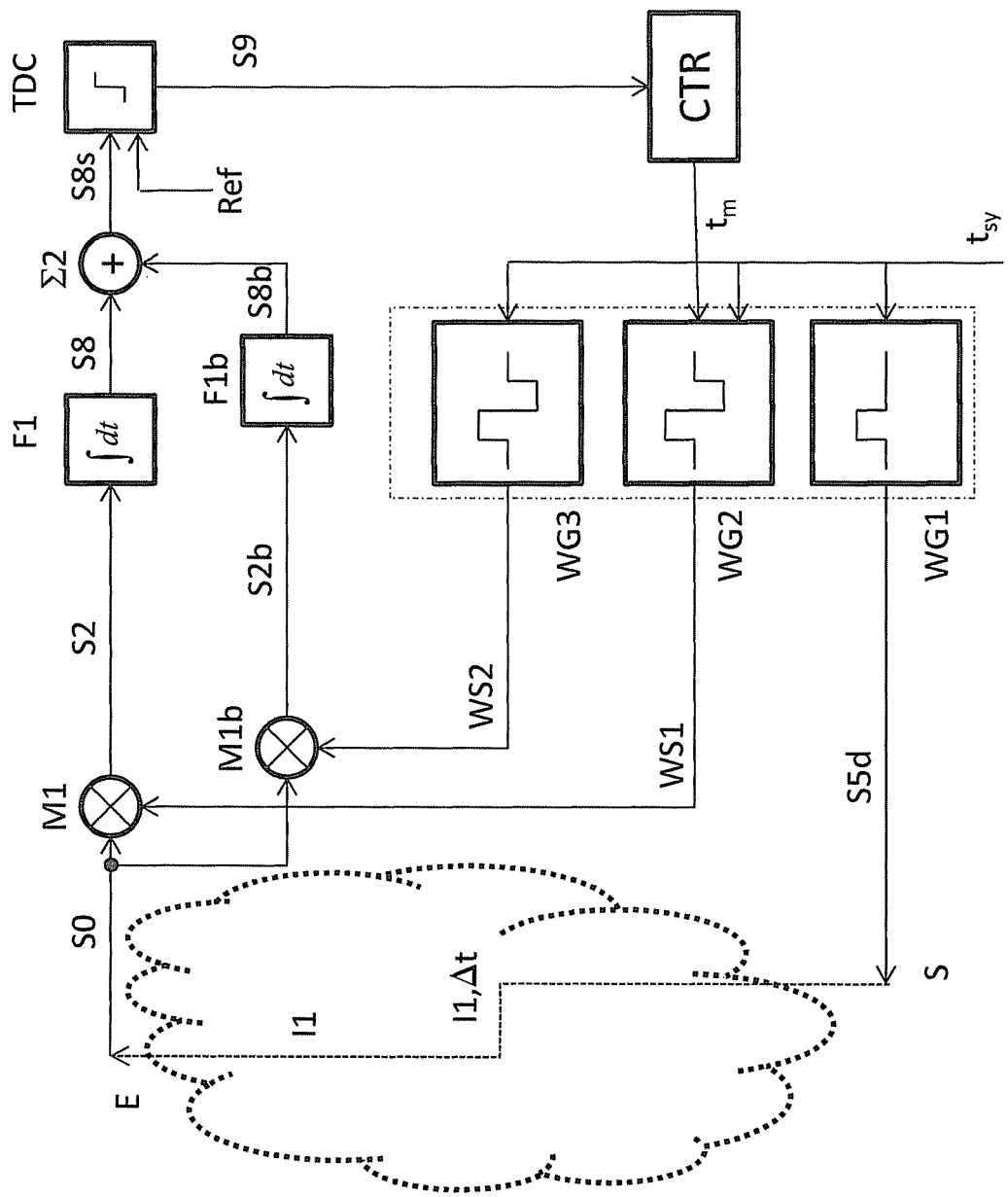
Figure 6:
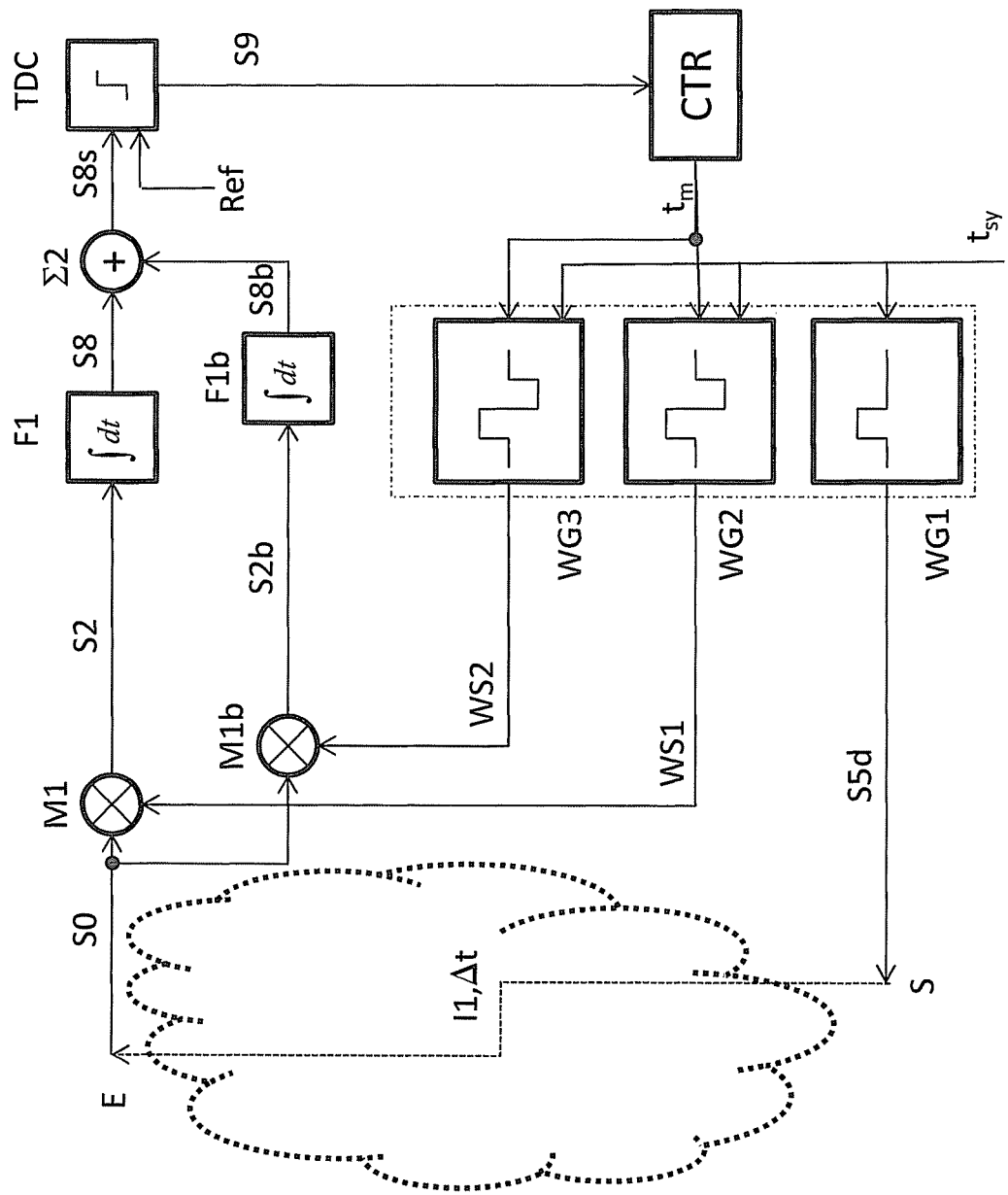
Figure 7:
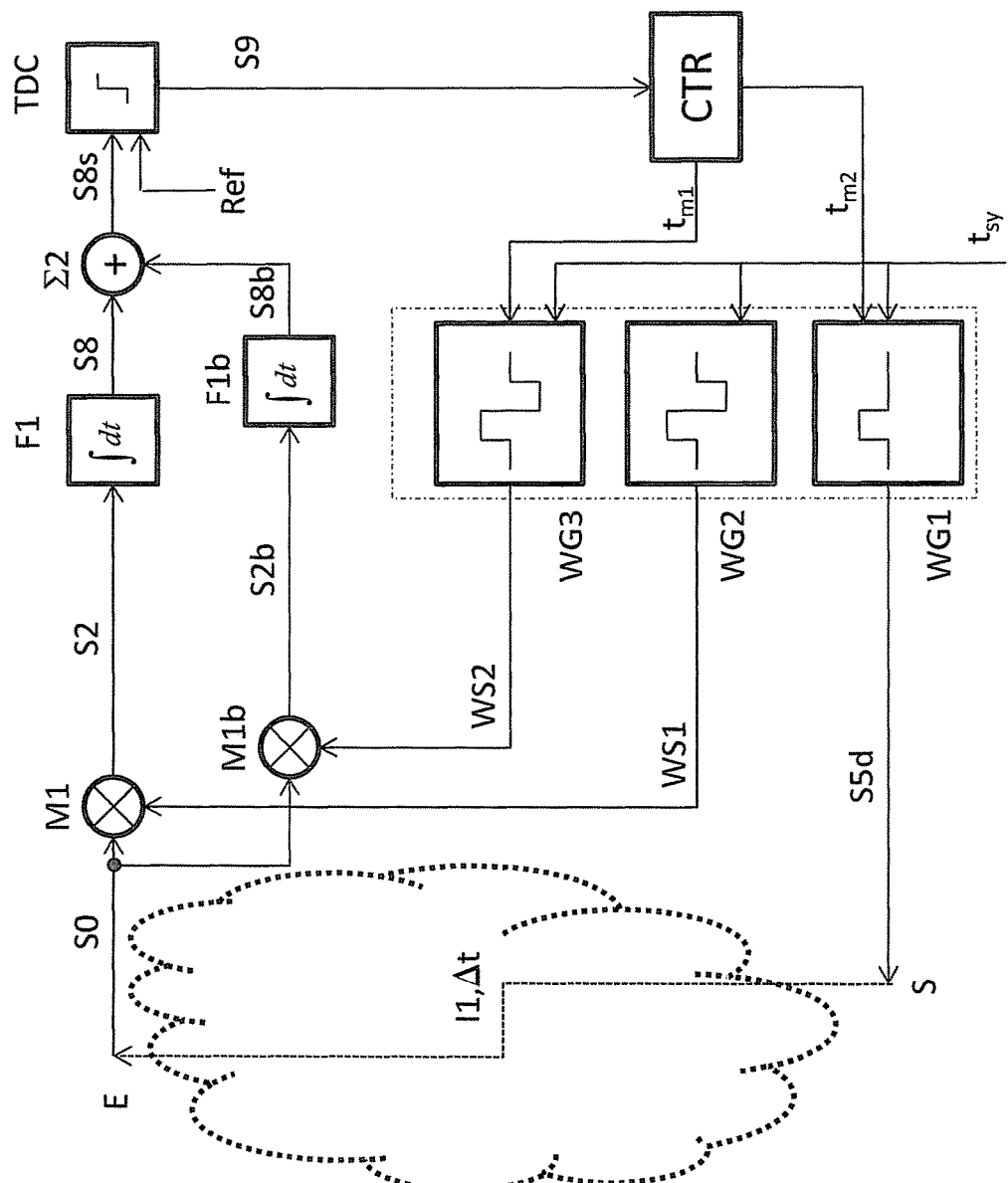
Figure 8:
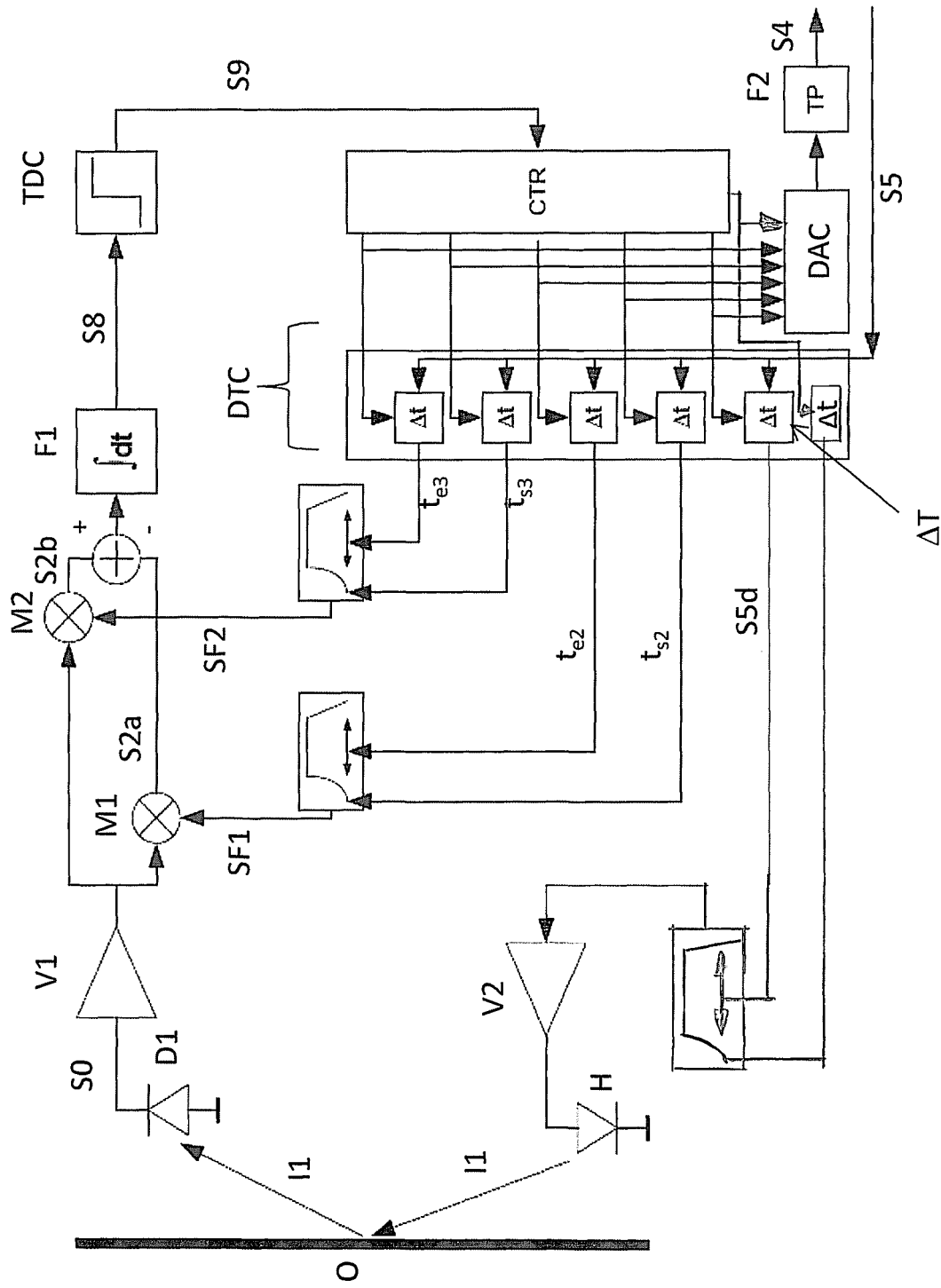
Figure 9:
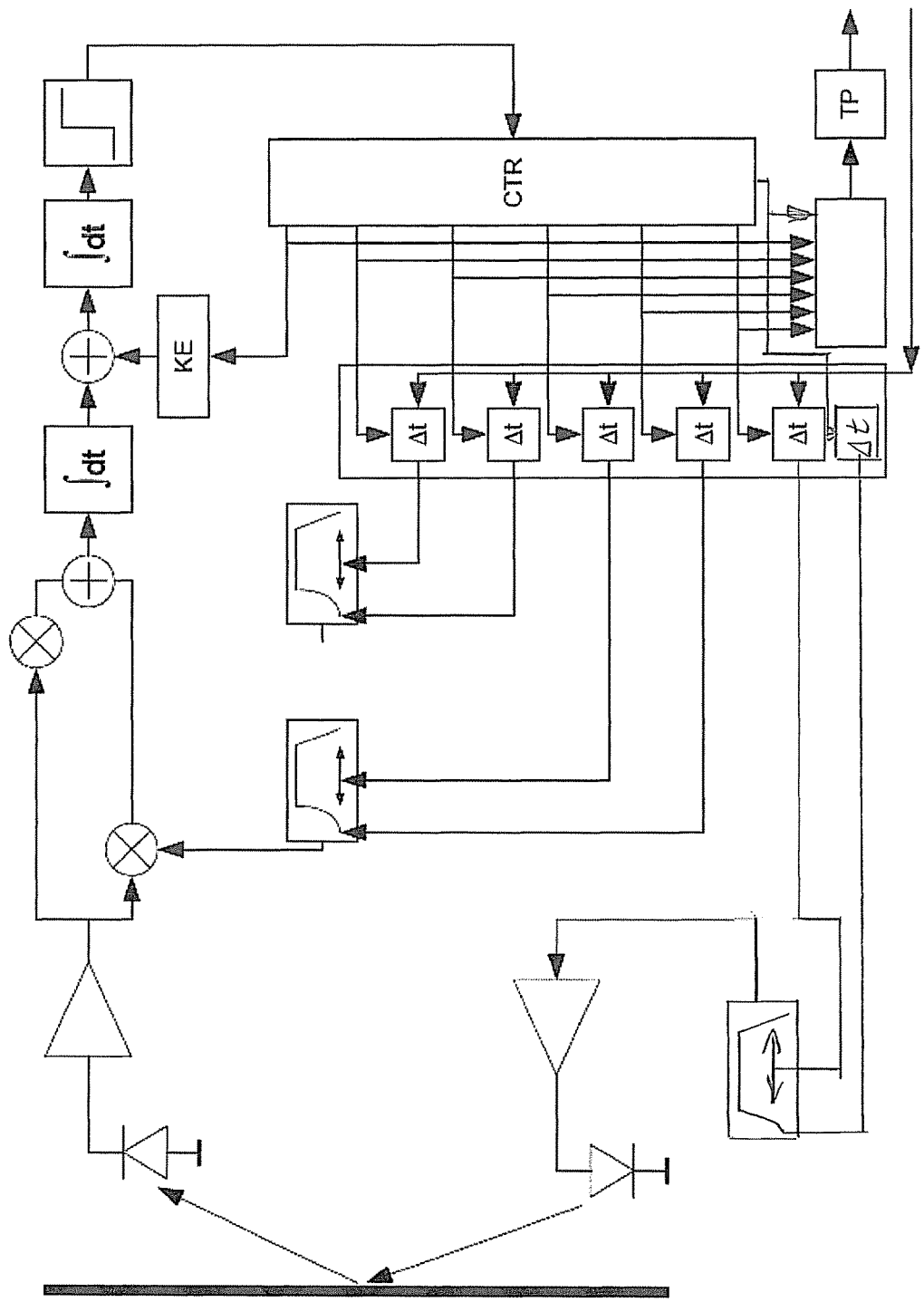
Figure 10:
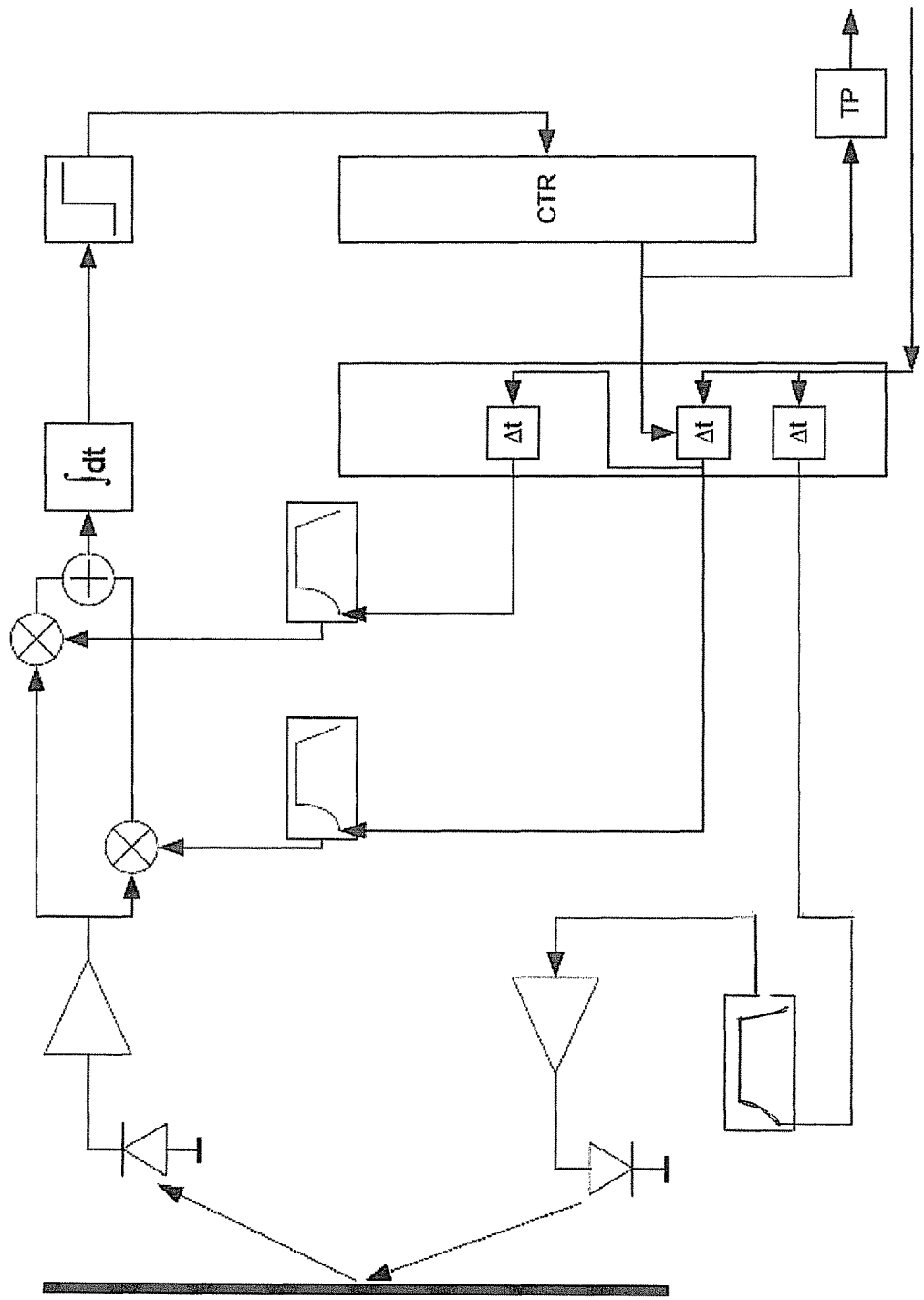

Hereunder the invention is explained in detail on the basis of several exemplary embodiments with reference to the drawings in which:

FIG. 1 shows a simplified schematic diagram of a device which performs the method according to the invention by controlling the first analysis wavelet signal generator WG2, FIG. 2 shows a simplified schematic diagram of a device which performs the method according to the invention by controlling the transmission wavelet signal generator WG1, FIG. 3 shows a simplified schematic diagram of a device which performs the method according to the invention with reduced error by controlling the first analysis wavelet signal generator WG2, FIG. 4 shows a simplified schematic diagram of a device which performs the method according to the invention with reduced error by controlling the transmission wavelet signal generator WG1, FIG. 5 shows the schematic diagram of FIG. 1, but supplemented by a second wavelet analysis signal path, FIG. 6 shows the schematic diagram of FIG. 5, wherein two wavelet signal generators are controlled, FIG. 7 shows the schematic diagram of FIG. 5, wherein the wavelet signal generator for the transmitter and a wavelet signal generator for the receiver path are controlled, FIG. 8 shows a basic configuration of the invention, FIG. 9 shows the invention employing a two-stage delta-sigma method, FIG. 10 shows a particular simple variant of the device according to the invention, and FIG. 11 shows a time diagram of the receive window signals SF1 and SF2 as well as the first signal s1.

FIG. 1 shows the simplified schematic diagram of a device which executes the method according to the invention. A transmission wavelet signal generator WG1 generates the transmission wavelet signal S5$d$ on the basis of a first wavelet WL1 which is not illustrated. The transmission wavelet signal S5$d$ is fed into the transmission path I1 by a transmitter S. There, it is subjected to the delay $\Delta t$ and appears at the output, i. e. at a receiver E of the transmission path I1 as a (delayed) receiver output signal S0. A first analysis wavelet signal generator WG2 generates a first analysis wavelet signal WS1 on the basis of a second wavelet WL2 which is not illustrated. A first multiplier M1 multiplies the first analysis wavelet signal WS1 by the receiver output signal S0; the result of the multiplication is the filter input signal S2. A first filter F1 filters the filter input signal S2 to generate the scalar product signal S8. Preferably, the first filter is a low-pass filter or an integrator. A time-to-digital converter TDC, typically a comparator, generates the time-continuous value-discrete evaluation signal S9 by comparing the value of the scalar product signal S8 with a first reference value Ref and changing the time-continuous value-discrete evaluation signal S9 when the value of the scalar product signal S8 intersects the reference value Ref at an intersection time point $t_0+t_s$ relative to the first reference time point $t_0$. A feedback controller CTR controls the delay $t_v$ of the second wavelet WL2 in the first analysis wavelet signal generator WG2 in dependence on the time point of the change of the value of the time-continuous value-discrete evaluation signal S9 (in FIG. 1 $t_m$ means the delay $t_v$).

In this example, the two wavelet generators WG1, WG2 are started via a synchronization signal $t_{sv}$ which respectively indicates the reference time point $t_0$.

In FIG. 2 the feedback control of the delay in the transmission wavelet signal generator WG1 is performed.

In FIG. 3 a correction unit KE converts the time point of the change of the value of the time-continuous value-discrete evaluation signal S9 into a correction signal K1. A first summator $\Sigma 1$ adds the scalar product signal S8 and the correction signal K1 to generate the corrected scalar product signal S10. A first filter F1 filters the corrected scalar product signal S10 and generates a filtered scalar product signal S11. The second filter is preferably a low-pass filter or an integrator. Instead of the scalar product signal S8 used in FIG. 1, it generates the input signal for the time-to-digital converter TDC.

In FIG. 4 in a circuit, such as that of FIG. 3, the feedback control of the delay is performed in the transmission wavelet signal generator WG1.

FIG. 5 corresponds to FIG. 1, with the exception that a second analysis wavelet signal generator WG3 generates a second analysis wavelet signal WS2 with the aid of a third wavelet WL3. In the example of FIG. 5 this is (uncontrolledly) performed synchronously with the other wavelet generators WG1, WG2. This second analysis wavelet signal WS2 is multiplied again by the receiver output signal S0 in a second multiplier M1$b$ to generate a second filter input signal S2$b$. Another first filter F1$b$ filters the second filter input signal S2$b$; at the output of the further first filter F1$b$ a (second) scalar product pre-signal S8$b$ is provided. Accordingly, the output signal of the first filter F1 is a first scalar product pre-signal S8$a$. This first scalar product pre-signal S8$a$ and the second scalar product pre-signal S8$b$ are weighted by the second summator $\Sigma 2$ to generate the scalar product signal S8. The second summator $\Sigma 2$ may be identical with the first summator $\Sigma 1$ of the circuits of FIGS. 3 and 4. The exemplary illustration of a possible realization can be combined with the other possible realizations described above and other possible realization which correspond to the claims.

FIG. 6 corresponds to FIG. 5, with the exception that the two analysis wavelet signal generators WG2, WG3 are controlled. The feedback control can be performed by various signals with different sensitivities of the wavelet generators relative to these feedback control signals, that is in a weighted manner. Further, it is conceivable that the feedback control is performed with different time constants.

FIG. 7 corresponds to FIG. 5, with the exception that the transmission wavelet signal generator WG1 and the second analysis wavelet signal generator WG2, which generates the second analysis wavelet signal WS2, are controlled. The feedback control can be performed by different signals with different sensitivities of the wavelet generators relative to these feedback control signals, that is in a weighted manner. It is further conceivable that the feedback control is performed with different time constants.

The invention described here can be employed for the light travel time measurement, for example.

The measurement of the light travel time is a usual method for a distance measurement by means of modulated light signals. Conventional solutions are limited with regard to extraneous light suppression, high demands on the analog components and thus require complex and cost-intensive architectures and cause a high current consumption.

From prior art various devices for light intensity measurements and for light travel time measurement are known. These are for example: DE-A-19 833 207, DE-B10 2009 020 218, EP-B-1 678 523, DE-B-10 2011 076 635, DE-A-10 2012 206 089, DE-A-10 2009 037 596, DE-A-10 2008 018 718, WO-A-2007 031 102, EP-B1 048 961, DE-A-10 138 531, DE-A-10 2007 046 562, DE-A-10 163 534, DE-A-10 221 578, US-A-2007 0 181 786, DE-A-10 2007 023 920 and WO-A-2013/083346.

The technologies described there are partly know by the name of HALIOS® TOF sensor technology. It already possesses a zero control of the phase signal.

This solution of the HALIOS® TOF sensor technology has the following drawbacks:
1) the resolution increase beyond the discretization of the DAC DLL is effected only via a message after the discretization, not via a delta-sigma feedback control loop since the information destined for this purpose—the analog residual error after the discretization—is deleted;
2) the feedback control loop controls only via the already discretized (digital) error such that the feedback control functions only with a minimum noise;
3) the methods require a high circuit complexity of the corresponding devices;
4) there are extreme demands on the amplitude control;
5) a high current consumption occurs;
6) there are high load changes;
7) there are high current peaks in the case of a burst operation;
8) there is the necessity of an optically complexly coupled compensator LED;
9) a parallel operation of a plurality of photo diodes is not possible.

Accordingly, the thus defined system performance is not sufficient for many commercial applications. This results in an excessive system complexity which, in turn, leads to an excessively large chip area in the case of monolithically integrated circuits and thus to a high current consumption. Moreover, these technologies are not sufficiently scalable such that a parallel operation of a plurality of TOF channels with a single transmission channel is not readily possible.

For improving the prior art, according to the invention the zero control of the phase is modified into a delta-sigma method. This is achieved by the following technical measures:
1. Resetting of the integrator after each integration time window, such as is known today, is eliminated.
2. The difference of the integrals on the rising and the falling edge of the transmitter pulse is already generated in the storage element of the integrator. For this purpose, a mechanism is required which enables the integration with a selectable sign.
3. The feedback from the discretizer to the DAC is effected directly at the next measuring pulse.
4. The low-pass determining the result is realized outside the feedback control loop.

Another independent item is the zero control of the phase by shifting the integration window instead of the temporal shift of the transmission signal. Thereby a scalability is realized. That is, a plurality of sensor channels can be simultaneously subjected to a zero control at an LED signal.

The invention applied to the light travel time measurement thus relates to a device for travel time determination in a first transmission path I1 between a transmitter H and a first receiver D1. For feeding the transmitter H either a transmission wavelet signal S5$d$ delayed by a delay time $\Delta t$ is at least temporarily generated from a transmission signals S5 by means of a delay unit $\Delta t$ or the transmission signal S5 is used as the transmission wavelet signal S5$d$ which always feeds the transmitter H within the meaning of this disclosure. The transmitter H transmit a first, particularly optical signal s1 time-segment-wise in relation to a time segment $T_z$ into the first transmission path I1 in dependence on said transmission wavelet signal S5$d$. The first signal s1 comprises at least one carrier signal as a signal component, which at least by a modulation signal is modulated in the amplitude and/or phase and/or polarization and/or wavelength and/or amplitude modulation frequency and/or the spectral composition. For example, this is a light signal which is emitted by an LED in an amplitude-modulated manner with a modulation frequency and a predetermined optical wavelength. Particularly preferably, this is a pulsedly operated laser diode. In each time segment $T_z$ in which the transmitter H transmits the first signal s1, the first signal comprises a first temporal start $t_{s1}$ and a first temporal end $t_{e1}$ within this respective time segment $T_z$. Within the meaning of a pulse operation, a first temporal start $t_{s1}$ is the start of the pulse and the first temporal end $t_{e1}$ is the end of the transmission pulse. The time segments $T_z$ are preferably, but not necessarily of an equal temporal length. Each time segment $T_z$ possesses a temporal start $t_{sz}$ of the time segment $T_z$ and a temporal end $t_{ez}$ of the time segment $T_z$. Further, the first temporal start $t_{s1}$ and the first temporal end $t_{e1}$ of the first signal s1 are preferably, but not necessarily equal from time segment to time segment. Hereunder, only a single time segment $T_z$ is dealt with, wherein the previous time segments $T_z$ and the following time segments $T_z$ respectively behave similarly. The time segments $T_z$ do preferably not overlap each other and do not directly follow each other. Rather, it is conceivable that time segments are separated from each other by larger temporal intervals.

The first transmission path I1 preferably contains an object O whose distance is to be determined via the travel time measurement. Of course, the travel time can also be determined in the first transmission path I1 itself, for example for determining the refraction index in the transmission path. The first transmission path thus modifies the first signal s1 upon passage through the first transmission path I1 into a second, particularly optical signal s2. Thus the object O is understood as a portion of the first transmission path I1. This modification may apply to the amplitude and/or the phase and/or the polarization and/or the wavelength and/or the amplitude modulation frequency and/or the spectral composition of the second signal s2 as compared with the first signal s1, wherein the change of the phase corresponds to a delay due to the travel time. After the first signal s1 has passed through the first transmission path I1 and in doing so has been modified into the second signal S2, the first receiver D1 receives the second signal s2 after it has exited the first transmission path I1 within this respective time segment $T_z$. In the first receiver D1 the second signal s2 is converted into a receiver output signal S0 by said receiver. Within this respective time segment $T_z$ a first multiplier M1 multiplies the receiver output signal S0 by a first receive window signal SF1 into a first internal signal S2a. Within said respective time segment $T_z$ the first receive window signal SF1 comprises a second temporal start $t_{s2}$ which is temporally situated before the first temporal start $t_{s1}$ of the first signal s1 and is temporally situated before the temporal end $t_{e1}$ of the first signal s1. On the other hand, within said respective time segment $T_z$ the first receive window signal SF1 comprises a second temporal end $t_{e2}$ which is temporally situated after the first temporal start $t_{s1}$ of the first signal s1 and is temporally situated before the temporal end $t_{e1}$ of the first signal s1.

The first receive window which is defined by the first receive window signal SF1 thus is situated such that it overlaps with the transmission pulse of the first signal s1 in such a manner that the transmission pulse starts in the first receive window and the first receive window ends before the transmission pulse ends.

Within this respective time segment $T_z$ a second multiplier M2 multiplies the receiver output signal S0 by a second receive window signal SF2 into a second internal signal S2b. Within said respective time segment $T_z$ the second receive window signal SF2 comprises a third temporal start $t_{s3}$ which is temporally situated after the first temporal start $t_{s1}$ of the first signal s1 and is temporally situated before the temporal end $t_{e1}$ of the first signal s1. Within said respective time segment $T_z$ the second receive window signal SF2 comprises a third temporal end $t_{e3}$ which is temporally situated after the first temporal start $t_{s1}$ of the first signal s1 and is temporally situated after the temporal end $t_{e1}$ of the first signal s1.

The second receive window which is defined by the second receive window signal SF2 thus is situated such that it overlaps with the transmission pulse of the first signal s1 in such a manner that the transmission pulse ends in the second receive window and the second receive window ends after the transmission pulse ends.

The two thus generated signals are now further processed. A first filter F1 now generates the difference of the first internal signal S2a previously generated and the second internal signal S2b within this respective time segment $T_z$. The result of the filtering by the first filter F1 is a first filter output signal S8. Particularly preferred is an integration and/or low-pass filtering by the first filter F1.

In a first variant the second temporal start $t_{s2}$ of the first receive window signal SF1 depends on the first filter output signal S8.

In a second variant the second temporal end $t_{e2}$ of the first receive window signal SF1 depends on the first filter output signal S8.

In a third variant the third temporal start $t_{s3}$ of the second receive window signal SF2 depends on the first filter output signal S8.

In a fourth variant the third temporal end $t_{e3}$ of the second receive window signal SF2 depends on the first filter output signal S8.

In a fifth variant the delay time Δt depends on the first filter output signal S8.

The first filter output signal S8 may already be used as a measuring value signal for a travel time of the first signal s1 in the transmission path I1. However, it has turned out that it is favorable to provide a subsequent second filter F2, particularly a low-pass filter, such that the actual first output signal S4 serves as a measuring value for the travel time determination of the first signal s1 and/or the second signal s2 together in the first transmission path I1.

According to another embodiment of the invention, the first filter F1 integrates the difference of the first internal signal S2a and the second internal signals S2b into a first filter output signal S8.

According to a third embodiment of the invention, the first receive window signal SF1 is zero with respect to its amount from the temporal start $t_{sz}$ of the respective time segment $T_z$ to the second temporal start $t_{s2}$ of the first receive window signal SF1. In this embodiment, the first receive window signal SF1 increases with respect to its amount from the second temporal start $t_{s2}$ of the first receive window signal SF1 in a temporally monotonous or jump-like manner. A slow increase of the amount of the first receive window signal SF1 relative to the jump-like increase for reducing the jitter sensitivity of the system is preferred. It is therefore reasonable when the rise time is longer than 1% of the first minimum constancy time $t_{k1}$ explained below and/or at least 1% of the temporal length of the time segment $T_z$. For a first minimum constancy time $t_{k1}$ until the second temporal end $t_{s2}$ of the first receive window signal SF1 the amount of the first receive window signal SF1 remains at a constant value. Constancy within the meaning of this disclosure means a variation of the amplitude of the first receive window signal SF1 by less than 25%. The first receive window signal SF1 decreases with respect to its amount to the second temporal end $t_{e2}$ of the first receive window signal SF1 in a temporally monotonously decreasing or jump-like manner and then remain zero with respect to its amount until the temporal end $t_{ez}$ of the respective time segment $T_z$.

In a fourth embodiment of the invention, in line with the previous embodiment, the second receive window signal SF2 is zero with respect to its amount from the temporal start $t_{sz}$ of the respective time segment $T_z$ until the third temporal start $t_{s3}$ of the second receive window signal SF2. The second receive window signal SF2 increases with respect to its amount from the third temporal start $t_{s3}$ of the second receive window signal SF2 in a temporally monotonously or jump-like manner and remains at a constant value with respect to its amount for a second minimum constancy time $t_{k2}$ until the third temporal end $t_{e3}$ of the second receive window signal SF2. With regard to the constancy the above description applies. The second receive window signal SF2 decreases with respect to its amount to the third temporal end $t_{e3}$ of the second receive window signal SF2 in a temporally monotonously or jump-like manner and then remains zero with respect to its amount until the temporal end $t_{ez}$ of the respective time segment $T_z$.

In a fifth embodiment of the invention, the first minimum constancy time $t_{k1}$ is equal to the second minimum constancy time $t_{k2}$ which is a preferred embodiment of the fourth embodiment.

In a sixth embodiment, the first minimum constancy time $t_{k1}$ and/or the second minimum constancy time $t_{k2}$ is larger than the temporal resolution by which
- the second temporal start $t_{s2}$ of the first receive window signal SF1 and/or
- the second temporal end $t_{e2}$ of the first receive window signal SF1 and/or
- the third temporal start $t_{s3}$ of the second receive window signal SF2 and/or
- the third temporal end $t_{e3}$ of the second receive window signal SF2 and/or
- the delay time (Δt)

are dependent on the first filter output signal S8 and/or a first digitized filter output signal S9 described below.

In a seventh embodiment, the first minimum constancy time $t_{k1}$ and/or the second minimum constancy time $t_{k2}$ is larger than the temporal sum of the temporal resolution by which
- the second temporal start $t_{s2}$ of the first receive window signal SF1 and/or
- the second temporal end $t_{e2}$ of the first receive window signal SF1 and/or
- the third temporal start $t_{s3}$ of the second receive window signal SF2 and/or
- the third temporal end $t_{e3}$ of the second receive window signal SF2 and/or
- the delay time Δt are dependent on the first filter output signal S8 and/or a first digitized filter output signal S9 plus the rise time $t_a$ by which the transmitter H starts to send, plus the fall time $t_F$ by which the transmitter H stops to send.

In an eighth embodiment of the invention, the first filter F1 is a linear filter having a filter function f(ΔS2). Here, ΔS2 is the differential signal of the first internal signal S2a and the second internal signal S2b. However, first the filter function f( ) may be considered in a general way and may be considered as a feature of the filter itself. This purely mathematical feature, which may manifest itself in the technical realization of the filter, may also be applied to individual signals for characterizing these signals.

In a ninth embodiment of the invention, the amount change of a filter function f( ) depending on the second receive window signal SF2 and corresponding to what is described above is, from the temporal start $t_{sz}$ of the respective time segment $T_z$ until the temporal end $t_{ez}$ of the respective time segment $T_z$, equal to an amount change of the filter function f( ) depending on the first receive window signal SF1 and corresponding to what is described above from the temporal start $t_{sz}$ of the respective time segment until the temporal end $t_{ez}$ of the respective time segment $T_z$. This means nothing other than that the first receive window signal SF1 and the second receive window signal SF2 should behave in the same manner during filtering by the first filter F1. Since the first filter F1 is linear, a subtraction of the receive window signals thus leads to a disappearing first filter output signal F8.

In a tenth embodiment of the invention, the temporal integral of the second receive window signal SF2 from the temporal start $t_{sz}$ of the respective time segment $T_z$ until the temporal end $t_{ez}$ of the respective time segment $T_z$ is equal to the integral of the first receive window signal SF1 from the temporal start $t_{sz}$ of the respective time segment $T_z$ until the temporal end $t_{ez}$ of the respective time segment $T_z$. As is said above, the integration is a special possible configuration of the first filter F1. The tenth embodiment of the invention is thus only a special configuration of the ninth embodiment with a first filter F1 in the form of an integrator.

In an eleventh embodiment of the invention, the first filter output signal S8 is converted by an analog-to-digital converter ADC and/or a time-to-digital converter TDC into a value-discrete first digitized filter output signal S9. A time-to-digital-converter TDC is always to be given preference since it allows for a higher resolution. At least
- the second temporal start $t_{s2}$ of the first receive window signal SF1 and/or
- the second temporal end $t_{e2}$ of the first receive window signal SF1 and/or
- the third temporal start $t_{s3}$ of the second receive window signal SF2 and/or
- the third temporal end $t_{e3}$ of the second receive window signal SF2 and/or
- the delay time Δt are dependent on the first digitized filter output signal S9 instead of the first filter output signal S8. The first filter output signal S8 and/or the first digitized filter output signal S9 and/or one or a plurality of first output signals S4 derived from these, particularly by one or a plurality of following second filters F2, are used, within this respective time segment $T_z$, as a measuring value for the travel time determination of the first signal s1 in the transmission path l1.

The twelfth embodiment of the invention relates to a two-stage delta-sigma system. Here, a first summator Σ1 summates the filter output signal S8 and a first correction signal SK1 to generate a first filter input signal S10. A third linear filter F3 having a filter function f3(S10) filters the second filter input signal S10 to generate a third filter output signal S11. The third filter output signal S11 instead of the first filter output signal S8 is converted, by an analog-to-digital converter ADC or a time-to-digital converter TDC, into the value-discrete first digitized filter output signal S9. Here, too, the variant with the time-to-digital converter TDC is to be given preference. A correction signal generating unit KE, which preferably converts the digitized filter output signal S9 into a charge amount for the third filter F3, which preferably is another integrator, generates the first correction signal SK1, which preferably is a charge signal, in dependence on the digitized filter output signal S9.

This design of a second integrator loop offers the advantage that the noise and the feedback control errors are minimized.

In a thirteenth embodiment of the invention, a feedback controller CTR generates a first feedback controller output signal S12 in dependence on the filter output signal S8 and/or the digitized filter output signal S9 and/or the third filter output signal S11 and optionally a default value Ref. In this thirteenth embodiment of the invention, at least
- the second temporal start $t_{s2}$ of the first receive window signal SF1 and/or
- the second temporal end $t_{e2}$ of the first receive window signal SF1 and/or
- the third temporal start $t_{s3}$ of the second receive window signal SF2 and/or
- the third temporal end $t_{e3}$ of the second receive window signal SF2 and/or
- the delay time Δt are dependent on the first feedback controller output signal S12 instead of the first digitized filter output signal S9 or the first filter output signal S8.

In a fourteenth embodiment of the invention, the feedback controller CTR is a PID feedback controller.

In a fifteenth embodiment of the invention, the feedback controller CTR or a partial device of the feedback controller CTR comprises a hysteresis. This offers the advantage that the system becomes less susceptible to interference.

In a sixteenth embodiment of the invention, the device comprises a temperature sensor TS for detection, in the form of a temperature sensor signal TSS, of the temperature T of the transmitter H or a temperature being in a cause-effect relationship with it. At least
the second temporal start $t_{s2}$ of the first receive window signal SF1 and/or
the second temporal end $t_{e2}$ of the first receive window signal SF1 and/or
the third temporal start $t_{s3}$ of the second receive window signal SF2 and/or
the third temporal end $t_{e3}$ of the second receive window signal SF2 and/or
the delay time $\Delta t$
are dependent on the temperature sensor signal TSS at least partially within the respective time segment $T_z$.

In a seventeenth embodiment of the invention, the electric transmission current $I_H$ which the transmitter H draws is evaluated and used for a transmitter temperature estimation. Therefore, in this variant, the device comprises a transmission current detection device $I_{HM}$ which supplies a transmission current measuring signal. In this case, preferably at least
the second temporal start $t_{s2}$ of the first receive window signal SF1 and/or
the second temporal end $t_{e2}$ of the first receive window signal SF1 and/or
the third temporal start $t_{s3}$ of the second receive window signal SF2 and/or
the third temporal end $t_{e3}$ of the second receive window signal SF2 and/or
the delay time $\Delta t$
are at least partially dependent on the transmission current measuring signal $I_{MS}$.

It has turned out that it is reasonable and favorable not to vary the temporal parameters of the receive window signal SF1, SF2 independently of each other.

In an eighteenth embodiment of the invention, therefore either the second temporal start $t_{s2}$ of the first receive window signal SF1 is identical with the second temporal end $t_{e2}$ of the first receive window signal SF1, and the third temporal start $t_{s3}$ of the second receive window signal SF2 is situated after the third temporal end $t_{e3}$ of the second receive window signal SF2, or the second temporal start $t_{s2}$ of the first receive window signal SF1 is situated after the second temporal end $t_{e2}$ of the first receive window signal SF1, and the third temporal start $t_{s3}$ of the second receive window signal SF2 is identical with the third temporal end $t_{e3}$ of the second receive window signal SF2.

In a nineteenth embodiment of the invention, the second temporal start $t_{s2}$ of the first receive window signal SF1 and the third temporal start $t_{s3}$ of the second receive window signal SF2 are dependent in the same manner on the first filter output signal S8 and/or the first digitized filter output signal S9 and/or the third filter output signal S11 and/or the first feedback controller output signal S12. Here, the same manner means that the corresponding deviations of these time points with respect to the levels of these signals do not differ from each other with respect to the sign and do not differ from each other with respect to their amount by more than 25%.

In a twentieth embodiment of the invention, the second temporal start $t_{s2}$ of the first receive window signal SF1 and the third temporal end $t_{e3}$ of the second receive window signal SF2 are dependent in the same manner on the first filter output signal S8 and/or the first digitized filter output signal S9 and/or the third filter output signal S11 and/or the first feedback controller output signal S12. Here, too, the same manner means that the corresponding derivations of these time points with respect to the levels of these signal do not differ from each other with respect to the sign and do not differ from each other with respect to their amount by more than 25%.

In a twenty-first embodiment of the invention, the second temporal end $t_{e2}$ of the first receive window signal SF1 and the third temporal end $t_{e3}$ of the second receive window signal SF2 are dependent in the same manner on the first filter output signal S8 and/or the first digitized filter output signal S9 and/or the third filter output signal S11 and/or the first feedback controller output signal S12. Here, too, the same manner means that the corresponding derivations of these time points with respect to the levels of these signals do not differ from each other with respect to the sign and do not differ from each other with respect to their amount by more than 25%.

In a twenty-second embodiment of the invention, the second temporal end $t_{e2}$ of the first receive window signal SF1 and the third temporal start $t_{s3}$ of the second receive window signal SF2 are dependent in the same manner on the first filter output signal S8 and/or the first digitized filter output signal S9 and/or the third filter output signal S11 and/or the first feedback controller output signal S12. Here, too the same manner means that the corresponding derivations of these time points with respect to the levels of these signals do not differ from each other with respect to the sign and do not differ from each other with respect to their amount by more than 25%.

Besides these variants, one variant is of particular interest. Here, the system comprises a plurality of receivers, a first receiver D1 and a second receiver D2, the feedback control loop then preferably only relates to the temporal parameters of the corresponding receive window signals. Of course, from the receive window signals S0, S0B a feedback control signal for the temporal delay of the transmission signal S5 relative to the transmission wavelet signal S5d can be synthetized. However, the simplest manner is to assign this delay to a receiver or to a sum signal of the respective filter output signals S8, S8d etc.

Therefore, a twenty-third embodiment of the invention serves for parallel determination of the travel time in a second transmission path I2 which can entirely or partially coincide with the first transmission path I1 and contain the object O and/or another object O2, between the transmitter H and at least one further receiver D2. The transmitter H, in dependence on the transmission wavelet signal S5d, transmits a third, particularly optical signal s3 in a time-segment-wise manner into the second transmission path I2.

Typically, this configuration is such that the transmitter transmits an optical signal, wherein a first portion of this optical signal enters the first transmission path I1 and generates the first signal s1 and a second portion enters the second transmission path I2 and generates the third signal s3. Thus, typically, the first signal s1 and the second signal s2 are synchronous. Therefore, the third signal s3, too, comprises a carrier signal as a signal component. This carrier signal is thus modulated at least by a modulation signal in the amplitude and/or phase and/or polarization and/or wavelength and/or amplitude modulation frequency and/or spectral composition. In each time segment $T_z$ in which the transmitter H transmits the third signal s3, the third signal s3 comprises, within this respective time segment $T_z$, a fourth temporal start $t_{s4}$ and a fourth temporal end $t_{e4}$. The second transmission path I2 modifies the third signal s3, when it is passing through this second transmission path I2, to a fourth, particularly optical signal s4. Again, this modification can relate to the amplitude and/or the phase and/or the polarization and/or the wavelength and/or the amplitude modulation frequency and/or the spectral composition of the fifth signal in comparison to the fourth signal, wherein the phase change again corresponds to the delay caused by the travel time. The further receiver D2 receives the fourth signal s4 after its exit from the second transmission path I2. In the further receiver D2, the further receiver D2 converts the fourth signal s4 into a further receiver output signal S0B. A third multiplier M3 multiplies the further receiver output signal S0B by a third receive window signal SF3 into a third internal signal S2Ba. The first receive window signal SF3 comprises, within said respective time segment $T_z$, a fifth temporal start $t_{s5}$ that is temporally situated before the fourth temporal start to of the third signal s4 and temporally before the fourth temporal end $t_{e4}$ of the fourth signal s4. The third receive window signal SF3 comprises, within said respective time segment $T_z$, a fifth temporal end $t_{e5}$ that is temporally situated after the fourth temporal start $t_{s4}$ of the fourth signal s4 and temporally before the fourth temporal end $t_{e4}$ of the fourth signal s4. A fourth multiplier M4 multiplies the further receiver output signal S0B by a fourth receive window signal SF4 into a fourth internal signal S2Bb. The fourth receive window signal SF4 comprises, within said respective time segment $T_z$, a sixth temporal start $t_{s6}$ that is temporally situated after the fourth temporal start $t_{s4}$ of the fourth signal s4 and temporally before the fourth temporal end $t_{e4}$ of the fourth signal s4. The fourth receive window signal SF4 comprises, within said respective time segment $T_z$, a sixth temporal end $t_{e6}$ that is temporally situated after the fourth temporal start $t_{s4}$ of the fourth signal s4 and temporally after the fourth temporal end $t_{e4}$ of the fourth signal s4. A fourth filter F4, which preferably is an integrator or a low-pass or a band-pass filter, filters the difference of the third internal signal S2Ba and the fourth internal signal S2Bb to generate a fourth filter output signal S8B. At least the fifth temporal start $t_{s5}$ of the third receive window signal SF3 and/or the fifth temporal end $t_{e5}$ of the third receive window signal SF3 and/or the sixth temporal start $t_{s6}$ of the fourth receive window signal SF4 and/or the sixth temporal end $t_{e6}$ of the fourth receive window signal SF4 and/or the delay time Δt are dependent on the fourth filter output signal S8B. The fourth filter output signal S8B and/or a further output signal S4B derived therefrom particularly by a following fifth filter F5, is used, within this respective time segment $T_z$, as a further measuring value for the travel time determination of the fourth signal s4 in the second transmission path I2. The fifth filter F5 preferably is a low-pass filter. On the basis of this embodiment, a twenty-fourth embodiment of the invention is conceivable where a second summator Σ2 generates a receiver output sum signal S0Σ from the receiver output signal S0 and the further receiver output signal S0B by summation, which forms the basis for the feedback control. Thus a mean value in the form of a distance can be directly measured. The feedback control is then effected such that the third multiplier M3 multiplies the receiver output sum signal S0Σ instead of the further receiver output signal S0B by the third receive window signal SF3 into the third internal signal S2Ba. The fourth multiplier M4 multiplies the receiver output sum signal S0Σ instead of the further receiver output signal S0B by the fourth receive window signal SF4 into the fourth internal signal S2Bb.

Instead of the sum formation a difference formation can be performed. In the case of small signals, the angle is then directly obtained by triangulation. In such a twenty-fifth embodiment of the invention, a fourth difference formation unit ΔS generates a receiver output differential signal S0Δ from the receiver output signal S0 and the further receiver output signal S0B by difference formation. As above, the feedback control can now be carried out in line with the sum formation. The third multiplier M3 multiplies the receiver output differential signal S0Δ instead of the further receiver output signal S0B by the third receive window signal SF3 into the third internal signal S2Ba. The fourth multiplier M4 multiplies the receiver output differential signal S0Δ instead of the further receiver output signal S0B by the fourth receive window signal SF4 into the fourth internal signal S2Bb.

The following embodiments relate to the design of the multiplier.

In a twenty-sixth embodiment of the invention, the first multiplier M1 is designed as an analog switch. In this embodiment of the invention, the first multiplier outputs either the receiver output signal S0 or a predetermined fixed potential as a first internal signal S2a in dependence on the first receive window signal SF1. Since the device should be symmetrical, the second multiplier M2 is also designed as an analog switch which outputs either the receiver output signal S0 or a predetermined fixed potential as a second internal signal S2b in dependence on the second receive window signal SF2.

In a twenty-seventh embodiment of the invention, the first multiplier M1 is also designed as an analog switch which connects the receiver output signal S0 to the first internal signal S2a and separates the receiver output signal S0 from the first receiver D1 when the first receive window signal SF1 is in a first state. The first multiplier M1 separates the receiver output signal S0 from the first internal signal S2a and connects the receiver output signal S0 to the first receiver D1 when the first receive window signal SF1 is in a second state. For symmetry purposes, the second multiplier M2 is also designed as an analog switch which connects the receiver output signal S0 to the second internal signal S2b and separates the receiver output signal S0 from the first receiver D1 when the second receive window signal SF2 is in a first state. The second multiplier M2 separates the receiver output signal S0 from the second internal signal S2b and connects the receiver output signal S0 to the first receiver D1 when the second receive window signal SF2 is in a second state.

In a twenty-seventh embodiment of the invention, the first multiplier M1 is designed as an analog switch which connects the receiver output signal S0 to the first internal signal S2a and separates the receiver output signal S0 from the first receiver D1 when the first receive window signal SF1 is in a first state. The first multiplier M1 separates the receiver output signal S0 from the first internal signal S2a and connects the receiver output signal S0 and the first receiver D1 and separates the receiver D1 from the current or voltage source when the first receive window signal SF1 is in a second state. The second multiplier M2 is designed as an analog switch which connects the receiver output signal S0 to the second internal signal S2b and separates the receiver output signal S0 from the first receiver D1 when the second receive window signal SF2 is in a first state. The second multiplier M2 separates the receiver output signal S0 from the second internal signal S2b and connects the receiver output signal S0 to the first receiver D1 when the second receive window signal SF2 is in a second state. However, the device then additionally comprises a partial device which connects the receiver output signal S0 with a current or voltage source when the receiver output signal S0 is connected neither with the first internal signal S2a nor with the second internal signals S2b.

The invention further comprises an associated method. This is a method for travel time determination of a first, preferably optical signal s1 in a first transmission path I1, which can include an object O, between a transmitter H and a first receiver D1. The method comprises steps which are typically carried out in parallel or quasiparallel. These steps include, optionally, at least temporarily delaying a transmission signal S5 by a delay time $\Delta t$ to generate a transmission wavelet signal S5d, wherein this is performed particularly by a delay unit $\Delta T$, or the transmission wavelet signal S5d is equal to the transmission signal S5. As a further step the method comprises, related to a time segment $T_z$, time-segment-wise transmission of a first, particularly optical signal s1 into the first transmission path I1 in dependence on the transmission wavelet signal S5d, particularly by a transmitter H. The first signal s1 comprises at least one carrier signal as a signal component which at least by a modulation signal is modulated in the amplitude and/or phase and/or polarization and/or wavelength and/or amplitude modulation frequency and/or spectral composition. In each time segment $T_z$ in which particularly the transmitter H transmits the first signal s1, the first signal s1 comprises, within this respective time segment $T_z$, a first temporal start $t_{s1}$ and a first temporal end $t_{e1}$. As a further step the method comprises modifying the first signal s1, when it is passing through the first transmission path I1, to a second, particularly optical signal s2. This modification relates to the amplitude and/or the phase and/or the polarization and/or the wavelength and/or the amplitude modulation frequency and/or the spectral composition of the second signal s2 in comparison to the first signal s1. As another step the method comprises receiving the second signal s2 after its exit from the transmission path I1 within this respective time segment $T_z$, particularly by the first receiver D1. Another step comprises converting the second signal s2 into a receiver output signal S0, particularly in the first receiver D1. In addition, the method comprises the step of multiplying the receiver output signal S0 by a first receive window signal SF1 into a first internal signal S2a, particularly by a first multiplier M1. The first receive window signal SF1 comprises, within said respective time segment $T_z$, a second temporal start $t_{s2}$ that is temporally situated before the first temporal start $t_{s1}$ of the first signal s1 and temporally before the temporal end $t_{e1}$ of the first signal s1. The first receive window signal SF1 comprises, within said respective time segment $T_z$, a second temporal end $t_{e2}$ that is temporally situated after the first temporal start $t_{s1}$ of the first signal s1 and temporally before the temporal end $t_{e1}$ of the first signal s1. A parallel step of the method comprises multiplying the receiver output signal S0 by a second receive window signal SF2 into a second internal signal S2b, within this respective time segment $T_z$, particularly by a second multiplier M2. The second receive window signal SF2 comprises, within said respective time segment $T_z$, a third temporal start $t_{s3}$ that is temporally situated after the first temporal start $t_{s1}$ of the first signal s1 and temporally before the temporal end $t_{e1}$ of the first signal s1. The second receive window signal SF2 comprises, within said respective time segment $T_z$, a third temporal end $t_{e3}$ that is temporally situated after the first temporal start $t_{s1}$ of the first signal s1 and temporally after the temporal end $t_{e1}$ of the first signal s1. Another step is filtering the difference of the first internal signal S2a and the second internal signal S2b to generate a first filter output signal S8, particularly by a first filter F1. Further, the method comprises generating an output signal S4 in dependence on the first filter output signal S8 and/or use of the first filter output signal S8 as an output signal S4, particularly by a subsequent second filter F2. Using the output signal S4 as representing a measuring value for the travel time determination of the first signal s1 and/or the second signal s2 together, in the first transmission path I1 is also part of the method. It is an essential feature of the method according to the invention that at least the second temporal start $t_{s2}$ of the first receive window signal SF1 and/or the second temporal end $t_{e2}$ of the first receive window signal SF1 and/or the third temporal start $t_{s3}$ of the second receive window signal SF2 and/or the third temporal end $t_{e3}$ of the second receive window signal SF2 and/or the delay time $\Delta t$ are dependent on the first filter output signal S8.

A thirtieth embodiment of the invention relates to a method for travel time determination of a first, particularly optical signal s1 in a first transmission path I1 between a transmitter H and a first receiver D1. The transmitter H transmits a first signal 51 into the first transmission path I1 that, after passing through at least a part of the first transmission path I1 (and thus being delayed), is received by the first receiver D1 as a second signal s2 being a modified first signal s1, and is converted into a receiver output signal S0. In the first receiver D1, the second signal s2 is evaluated within two temporal receive windows, a first receive window SF1 having a first temporal length T1 and a second receive window SF2 having a second temporal length T2. The start of the first signal s1 is included exclusively in the first receive window SF1 and the end of the first signal s1 is included exclusively in the second receive window SF2. The method is characterized in that the receiver output signal S0 comprises a first signal portion which is to be assigned to the first receive window SF1, and a second signal portion which is to be assigned to the second receive window SF2, wherein the first signal portion averaged over a predefined time segment $T_z$ is, except for a deviation, as large as the second signal portion averaged over the time segment $T_z$. This deviation is at least temporarily used as a feedback control signal for the temporal position of one or both receive windows SF1, SF2 in relation to the first signal s1 and/or the temporal position of the first signal s1 in relation to the two receive windows SF1, SF2, and/or of the first temporal length T1 of the first receive window and/or of the second temporal length T2 of the second receive window SF1, SF2.

In another embodiment of this method this deviation as well as a first correction signal SKE are added (summated) with to each other. Finally, in the signal path this sum is integrated and the resultant integration result, instead of said deviation, is used as a feedback control signal.

In FIG. 8 a general version of the device according to the invention is illustrated. In the delay unit $\Delta t$ the transmission signal S5 is delayed to generate the transmission wavelet signal S5d. This delay is dependent on the digitalized filter output signal S9. The transmission wavelet signal S5d controls, via the transmission amplifier V2, the transmitter H which here is a laser diode. Particularly preferably, the transmission signal S5 is a pulsed signal. The transmitter H transmits into the first transmission path I1 a portion of which is the object O. The first receiver D1 receives the signal modified while passing through the first transmission path and converts it into the receiver output signal S0 which is amplified by the input amplifier V1. The first multiplier M1 multiplies the receiver output signal S0 by the first receive window signal SF1 to generate the first internal signal S2a. The second multiplier M2 multiplies the receiver output signal S0 by the second receive window signal SF2 to generate the second internal signal S2b. Here, the first filter F1 integrates the difference of the first internal signal S2a and the second internal signal S2b to generate the first filter output signal S8. A time-to-digital converter digitizes the signal to generate the digitized filter output signal S9. Preferably, this is a comparator or an inverter or the like. In this example, the digital filter output signal S9 controls a feedback controller CTR which, by means of a digital-to-time signal converter DTC, determines the second start $t_{s2}$ of the first receive window signal SF1 and the second end $t_{e2}$ of the first receive window signal SF1 and the third start $t_{s3}$ of the second receive window signal SF2 and the third end $t_{e3}$ of the second receive window signal SF2 as well as said delay of the transmission signal S5 relative to the transmission wavelet signal S5d. Typically, the digital-to-time signal converter is a combination of multiplexers which pick up, in a hardwired or programmable or adjustable manner, the digitized filter output signal S9 step-wise delayed in a delay chain at the different steps.

At the same time, a digital-to-analog converter generates the output signal S4 from the digitized filter output signal S9, more precisely the signals derived therefrom, after the filtering in a low-pass F2.

FIG. 9 corresponds to FIG. 8, with the exception that the filter output signal S8 is multiplied by a first correction signal SK1 to generate a second filter input signal S10 and is then integrated into a third filter F3 to generate a third filter output signal F11 which then serves as an input for the time-to-digital converter TDC. The first correction signal SK1 is generated by a correction signal generation unit KE, which typically is a digital-to-charge converter unit, in dependence on the digitized filter output signal S9. Due to this two-stage delta-sigma conversion the system noise, particularly due to quantization errors, is minimized and thus the resolution of the measurement is maximized.

FIG. 10 corresponds to a simplified version of FIG. 8. In this example, too, the digital filter output signal S9 controls the feedback controller CTR which, by means of a digital-to-time signal converter DTC, determines, however, only the second start $t_{s2}$ of the first receive window signal SF1 and the third start $t_{s3}$ of the second receive window signal SF2 as well as said delay of the transmission signal S5 to generate the transmission wavelet signal S5d. The second end $t_{e2}$ of the first receive window signal SF1 and the third end $t_{e3}$ of the second receive window signal SF2 are either synchronously co-shifted through a predetermined temporal window size or, alternatively, kept constant. The only remaining output signal of the feedback controller CTR can, directly via the low-pass F2, serve as the output signal S4.

FIG. 11 shows a time diagram of the receive window signals SF1 and SF2 as well as the first signal s1.

Advantages of the Invention

By these modifications, considerable advantages are obtained:
1. Long off-times of the LED
2. Low demands on offset and amplification of the amplifier chain
3. Low power intake or larger bandwidth
4. Scalability (several photodiodes in parallel operation)
5. Easy handling without optical coupling allows for chip solutions
6. Low price Further, the invention can be alternatively circumscribed by any one of the group of features mentioned hereunder, wherein the groups of features can be combined with each other as desired and, also, individual features of a group of features can be combined with one or a plurality of features of one or a plurality of other groups of features or with one or a plurality of the above described embodiments.

1. Device for travel time determination of a first transmission path (I1) between a transmitter (H) and a receiver (D1), wherein either a delay unit (ΔT) at least temporarily generates, from a transmission signal (S5), a transmission wavelet signal (S5d) delayed by a delay time (Δt) or the transmission wavelet signal (S5d) is equal to the transmission signal (S5), and wherein the transmitter (H), in dependence on the transmission wavelet signal (S5d), transmits a first, particularly optical signal (s1), time-segment-wise related to a time segment ($T_z$), into the first transmission path (I1), which first signal (s1) comprises at least one carrier signal as a signal component which at least by a modulation signal is modulated in the amplitude and/or phase and/or polarization and/or wavelength and/or amplitude modulation frequency and/or spectral composition, wherein, in each time segment ($T_z$) in which the transmitter (H) transmits the first signal (s1), the first signal (s1) comprises, within said respective time segment ($T_z$), a first temporal start ($t_{s1}$) and a first temporal end ($t_{e1}$), and wherein the first transmission path (I1) can include an object (O), and wherein the first transmission path (I1) modifies the first signal (s1), when it is passing through this first transmission path (I1), to a second, particularly optical signal (s2), and wherein this modification relates to the amplitude and/or the phase and/or the polarization and/or the wavelength and/or the amplitude modulation frequency and/or the spectral composition of the second signal (s2) in comparison to the first signal (s1), and wherein the first receiver (D1) receives the second signal (s2) after its exit from the first transmission path (I1) within said respective time segment ($T_z$), and wherein, in the first receiver (D1), the second signal (s2) is converted into a receiver output signal (S0), and wherein a first multiplier (M1) within said respective time segment ($T_z$) multiplies the receiver output signal (S0) by a first receive window signal (SF1) into a first internal signal (S2a), and wherein the first receive window signal (SF1) comprises, within said respective time segment ($T_z$), a second temporal start ($t_{s2}$) that is temporally situated before the first temporal start ($t_{s1}$) of the first signal (s1) and temporally before the temporal end ($t_{e1}$) of the first signal (s1), and wherein the first receive window signal (SF1) comprises, within said respective time segment ($T_z$), a second temporal end ($t_{e2}$) that is temporally situated after the first temporal start ($t_{s1}$) of the first signal (s1) and temporally before the temporal end ($t_{e1}$) of the first signal (s1), and wherein a second multiplier (M2) within said respective time segment ($T_z$) multiplies the receiver output signal (S0) by a second receive window signal (SF2) into a second internal signal (S2b), and wherein the second receive window signal (SF2) comprises, within said respective time segment ($T_z$), a third temporal start ($t_{s3}$) that is temporally situated after the first temporal start ($t_{s1}$) of the first signal (s1) and temporally before the temporal end ($t_{e1}$) of the first signal (s1), and wherein the second receive window signal (SF2) comprises, within said respective time segment ($T_z$), a third temporal end ($t_{e3}$) that is temporally situated after the first temporal start ($t_{s1}$) of the first signal (s1) and temporally after the temporal end ($t_{e1}$) of the first signal (s1), and wherein a first filter (F1), within said respective time segment ($T_z$), filters the difference of the first internal signal (S2a) and the second internal signal (S2b) to generate a first filter output signal (S8), and wherein at least the second temporal start ($t_{s2}$) of the first receive window signal (SF1) and/or the second temporal end ($t_{e2}$) of the first receive window signal (SF1) and/or the third temporal start ($t_{s3}$) of the second receive window signal (SF2) and/or the third temporal end ($t_{e3}$) of the second receive window signal (SF2) and/or the delay time ($\Delta t$)

are dependent on the first filter output signal (S8), and wherein the first filter output signal (S8) and/or a first output signal (S4) derived therefrom particularly by a following second filter (F2), is used as a measuring value for the travel time determination of the first signal (s1) and/or the second signal (s2) together, in the first transmission path (I1).

(see FIGS. 8 to 11)

2. Device according to Item 1, wherein the first filter (F1) integrates the difference of the first internal signal (S2a) and the second internal signal (S2b) to generate a first filter output signal (S8) (see FIGS. 8 to 11).

3. Device according to Item 1 or 2, wherein the first receive window signal (SF1) is zero from the temporal start ($t_{sz}$) of the respective time segment ($T_z$) to the second temporal start ($t_{s2}$) of the first receive window signal (SF1), and wherein the first receive window signal (SF1) from the second temporal start ($t_{s2}$) of the first receive window signal (SF1) increases in a temporally monotonously increasing or jump-like manner and, for a first minimum constancy time ($t_{k1}$) until the second temporal end ($t_{e2}$) of the first receive window signal (SF1), remains on a constant value, wherein constancy is defined as a variation of the amplitude of the first receive window signal (SF1) by less than 25%, and wherein the first receive window signal (SF1) from the second temporal end ($t_{e2}$) of the first receive window signal (SF1) decreases in a temporally monotonously decreasing or jump-like manner and then is zero until the temporal end ($t_{ez}$) of the respective time segment ($T_z$).

(see FIGS. 8 to 11)

4. Device according to any one or a plurality of Items 1 to 3, wherein second first receive window signal (SF2) is zero from the temporal start ($t_{sz}$) of the respective time segment ($T_z$) to the third temporal start ($t_{s3}$) of the second receive window signal (SF2), and wherein the second receive window signal (SF2) from the third temporal start ($t_{s3}$) of the second receive window signal (SF2) increases in a temporally monotonously increasing or jump-like manner and, for a second minimum constancy time ($t_{k2}$) until the third temporal end ($t_{e3}$) of the second receive window signal (SF2), remains on a constant value, wherein constancy is defined as a variation of the amplitude by less than 25%, and wherein the second receive window signal (SF2) from the third temporal end ($t_{e3}$) of the second receive window signal (SF2) decreases in a temporally monotonously decreasing or jump-like manner and then is zero until the temporal end ($t_{ez}$) of the respective time segment ($T_z$).

(see FIGS. 8 to 11)

5. Device according to Item 3 or 4, wherein the first minimum constancy time ($t_{k1}$) is equal to the second minimum constancy time ($t_{k2}$) (see FIGS. 8 to 11).

6. Device according to any one or a plurality of Items 3 to 5, wherein the first minimum constancy time ($t_{k1}$) and/or the second minimum constancy time ($t_{k2}$) is larger than the temporal resolution by which the second temporal start ($t_{s2}$) of the first receive window signal (SF1) and/or the second temporal end ($t_{e2}$) of the first receive window signal (SF1) and/or the third temporal start ($t_{s3}$) of the second receive window signal (SF2) and/or the third temporal end ($t_{e3}$) of the second receive window signal (SF2) and/or the delay time ($\Delta t$)

are dependent on the first filter output signal (S8) and/or a first digitized filter output signal (S9).

(see FIGS. 8 to 11)

7. Device according to any one or a plurality of Items 3 to 6, wherein the first minimum constancy time ($t_{k1}$) and/or the second minimum constancy time ($t_{k2}$) is larger than the temporal sum of the temporal resolution by which the second temporal start ($t_{s2}$) of the first receive window signal (SF1) and/or the second temporal end ($t_{e2}$) of the first receive window signal (SF1) and/or the third temporal start ($t_{s3}$) of the second receive window signal (SF2) and/or the third temporal end ($t_{e3}$) of the second receive window signal (SF2) and/or the delay time ($\Delta t$)

are dependent on the first filter output signal (S8) and/or a first digitized filter output signal (S9), plus the rise time ($t_a$) by which the transmitter (H) starts transmitting, plus the fall time ($t_f$) by which the transmitter (H) ends transmitting. (see FIGS. 8 to 11)

8. Device according to any one or a plurality of Items 1 to 7, wherein the first filter (F1) is a linear filter having a filter function f($\Delta$S2), with $\Delta$S2 representing the differential signal of the first internal signal (S2a) and the second internal signal (S2b) (see FIGS. 8 to 11).

9. Device according to Item 8, wherein the amount change of a filter function f(SF2) depending on the second receive window signal (SF2) and corresponding to Item 8 is, from the temporal start ($t_{sz}$) of the respective time segment ($T_z$) to the temporal end ($t_{ez}$) of the respective time segment ($T_z$), equal to the amount change of the filter function f(SF1) depending on the first receive window signal (SF1)

and corresponding to Item 8 from the temporal start ($t_{sz}$) of the respective time segment to the temporal end ($t_{ez}$) of the respective time segment (see FIGS. 8 to 11).

10. Device according to Items 8 and 9, wherein the temporal integral of the second receive window signal (SF2) from the temporal start ($t_{sz}$) of the respective time segment ($T_z$) to the temporal end ($t_{ez}$) of the respective time segment ($T_z$) is equal to the integral of the first receive window signal (SF1) from the temporal start ($t_{sz}$) of the respective time segment ($T_z$) to the temporal end ($t_{ez}$) of the respective time segment ($T_z$) (see FIGS. 8 to 11).

11. Device according to any one or a plurality of Items 1 to 10,
    wherein the first filter output signal (S8) is converted, by an analog-to-digital converter (ADC) or a time-to-digital converter (TDC), into an value-discrete first digitized filter output signal (S9) which can be time-discrete and
    wherein at least
        the second temporal start ($t_{s2}$) of the first receive window signal (SF1) and/or
        the second temporal end ($t_{e2}$) of the first receive window signal (SF1) and/or
        the third temporal start ($t_{s3}$) of the second receive window signal (SF2) and/or
        the third temporal end ($t_{e3}$) of the second receive window signal (SF2) and/or
        the delay time ($\Delta t$) are dependent on the first digitized filter output signal (S9) instead of the first filter output signal (S8), and
    wherein the first filter output signal (S8) and/or the first digitized filter output signal (S9) and/or one or a plurality of first output signals (S4) derived from these, particularly by one or a plurality of following second filters (F2), are used, within said respective time segment ($T_z$), as a measuring value for the travel time determination of the first signal (s1) in the transmission path (I1).
    (see FIGS. 8 to 11).

12. Device according to Item 11,
    wherein a first summator ($\Sigma 1$) summates the filter output signal (S8) and a first correction signal (SK1) to generate a second filter input signal (S10), and
    wherein a third linear filter (F3) having a filter function $f_3$(S10) filters the second filter input signal (S10) to generate a third filter output signal (S11), and
    wherein the third filter output signal (S11) instead of the first filter output signal (S8) is converted, by an analog-to-digital converter (ADC) or a time-to-digital converter (TDC), into the value-discrete first digitized filter output signal (S9), and
    wherein a correction signal generating unit (KE) generates the first correction signal (SK1) in dependence on the digitized filter output signal (S9).
    (see FIGS. 8 to 11).

13. Device according to any one or a plurality of Items 1 to 11,
    wherein a controller (CTR) generates a first controller output signal (S12) in dependence on the filter output signal (S8) and/or the digitized filter output signal (S9) and/or the third filter output signal (S11) and optionally a default value (Ref), and
    wherein at least
        the second temporal start ($t_{s2}$) of the first receive window signal (SF1) and/or
        the second temporal end ($t_{e2}$) of the first receive window signal (SF1) and/or
        the third temporal start ($t_{s3}$) of the second receive window signal (SF2) and/or
        the third temporal end ($t_{e3}$) of the second receive window signal (SF2) and/or
        the delay time ($\Delta t$)
    are dependent on the first controller output signal (S12) instead of the first digitized filter output signal (S9) or the first filter output signal (S8).
    (see FIGS. 8 to 11).

14. Device according to Item 13, wherein the controller (CTR) is a PID controller (see FIGS. 8 to 11).

15. Device according to Item 13 or 14, wherein the controller (CTR) or a part device of the controller (CTR) comprises a hysteresis (see FIGS. 8 to 11).

16. Device according to any one or a plurality of Items 1 to 15,
    wherein the device comprises a temperature sensor (TS) for detection, in the form of a temperature sensor signal (TSS), of the temperature (T) of the transmitter (H) or a temperature being in a cause-effect relationship with it, and
    wherein at least
        the second temporal start ($t_{s2}$) of the first receive window signal (SF1) and/or
        the second temporal end ($t_{e2}$) of the first receive window signal (SF1) and/or
        the third temporal start ($t_{s3}$) of the second receive window signal (SF2) and/or
        the third temporal end ($t_{e3}$) of the second receive window signal (SF2) and/or
        the delay time ($\Delta t$)
    are dependent on the temperature sensor signal (TSS) at least partially within the respective time segment ($T_z$).
    (see FIGS. 8 to 11)

17. Device according to any one or a plurality of Items 1 to 16,
    wherein the transmitter (H) takes up an electric transmission current ($I_H$), and
    wherein the device comprises a transmission current detection device ($I_{HM}$) which supplies a transmission current measuring signal ($I_{MS}$), and
    wherein at least
        the second temporal start ($t_{s2}$) of the first receive window signal (SF1) and/or
        the second temporal end ($t_{e2}$) of the first receive window signal (SF1) and/or
        the third temporal start ($t_{s3}$) of the second receive window signal (SF2) and/or
        the third temporal end ($t_{e3}$) of the second receive window signal (SF2) and/or
        the delay time ($\Delta t$)
    are at least partially dependent on the transmission current measuring signal ($I_{MS}$).
    (see FIGS. 8 to 11)

18. Device according to any one or a plurality of Items 1 to 17, wherein either
    the second temporal start ($t_{s2}$) of the first receive window signal (SF1) is identical with the second temporal end ($t_{e2}$) of the first receive window signal (SF1), and the third temporal start ($t_{s3}$) of the second receive window signal (SF2) is situated after the third temporal end ($t_{e3}$) of the second receive window signal (SF2), or
    the second temporal start ($t_{s2}$) of the first receive window signal (SF1) is situated after the second temporal end ($t_{e2}$) of the first receive window signal (SF1), and the third temporal start ($t_{s3}$) of the second receive window signal (SF2) is identical with the third temporal end ($t_{e3}$) of the second receive window signal (SF2).
(see FIGS. 8 to 11)

19. Device according to any one or a plurality of Items 1 to 17, wherein the second temporal start ($t_{s2}$) of the first receive window signal (SF1) and the third temporal start ($t_{s3}$) of the second receive window signal (SF2) are dependent in the same manner on the first filter output signal (S8) and/or the first digitized filter output signal (S9) and/or the third filter output signal (S11) and/or the first controller output signal (S12), which means that the corresponding derivations do not differ from each other with respect to the sign and do not differ from each other with respect to their amount by more than 25% (see FIGS. 8 to 11).

20. Device according to any one or a plurality of Items 1 to 19, wherein the second temporal start ($t_{s2}$) of the first receive window signal (SF1) and the third temporal end ($t_{e3}$) of the second receive window signal (SF2) are dependent in the same manner on the first filter output signal (S8) and/or the first digitized filter output signal (S9) and/or the third filter output signal (S11) and/or the first controller output signal (S12), which means that the corresponding derivations do not differ from each other with respect to the sign and do not differ from each other with respect to their amount by more than 25% (see FIGS. 8 to 11).

21. Device according to any one or a plurality of Items 1 to 20, wherein the second temporal end ($t_{e2}$) of the first receive window signal (SF1) and the third temporal end ($t_{e3}$) of the second receive window signal (SF2) are dependent in the same manner on the first filter output signal (S8) and/or the first digitized filter output signal (S9) and/or the third filter output signal (S11) and/or the first controller output signal (S12), which means that the corresponding derivations do not differ from each other with respect to the sign and do not differ from each other with respect to their amount by more than 25% (see FIGS. 8 to 11).

22. Device according to any one or a plurality of Items 1 to 21, wherein the second temporal end ($t_{e2}$) of the first receive window signal (SF1) and the third temporal start ($t_{s3}$) of the second receive window signal (SF2) are dependent in the same manner on the first filter output signal (S8) and/or the first digitized filter output signal (S9) and/or the third filter output signal (S11) and/or the first controller output signal (S12), which means that the corresponding derivations do not differ from each other with respect to the sign and do not differ from each other with respect to their amount by more than 25% (see FIGS. 8 to 11).

23. Device according to any one or a plurality of Items 1 to 22, for parallel determination of the travel time in a second transmission path (I2) which can entirely or partially coincide with the first transmission path (I1), between the transmitter (H) and at least one further receiver (D2),
   wherein the transmitter (H), in dependence on the transmission wavelet signal (S5d), transmits a third, particularly optical signal (s3) in a time-segment-wise manner into the second transmission path (I2), which third signal (s3) comprises at least one carrier signal as a signal component which at least by a modulation signal is modulated in the amplitude and/or phase and/or polarization and/or wavelength and/or amplitude modulation frequency and/or spectral composition,
   wherein, in each time segment ($T_z$) in which the transmitter (H) transmits the third signal (s3), the third signal (s3) comprises, within said respective time segment ($T_z$), a fourth temporal start ($t_{s4}$) and a fourth temporal end ($t_{e4}$), and
   wherein the second transmission path (I2) can include a further object (O2) and/or the object (O), and
   wherein the second transmission path (I2) modifies the third signal (s3), when it is passing through this second transmission path (I2), to a fourth, particularly optical signal (s4), and
   wherein this modification relates to the amplitude and/or the phase and/or the polarization and/or the wavelength and/or the amplitude modulation frequency and/or the spectral composition of the fifth signal in comparison to the fourth signal, and
   wherein the further receiver (D2) receives the fourth signal (s4) after its exit from the second transmission path (I2) within said respective time segment ($T_z$), and
   wherein, in the further receiver (D2), the fourth signal (s4) is converted into a further receiver output signal (S0B), and
   wherein a third multiplier (M3) within said respective time segment ($T_z$) multiplies the further receiver output signal (S0B) by a third receive window signal (SF3) into a third internal signal (S2Ba), and
   wherein third first receive window signal (SF3) comprises, within said respective time segment ($T_z$), a fifth temporal start ($t_{s5}$) that is temporally situated before the fourth temporal start ($t_{s4}$) of the third signal (s4) and temporally before the fourth temporal end ($t_{e4}$) of the fourth signal (s4), and
   wherein the third receive window signal (SF3) comprises, within said respective time segment ($T_z$), a fifth temporal end ($t_{e5}$) that is temporally situated after the fourth temporal start ($t_{s4}$) of the fourth signal (s4) and temporally before the fourth temporal end ($t_{e4}$) of the fourth signal (s4), and
   wherein a fourth multiplier (M4) within said respective time segment ($T_z$) multiplies the further receiver output signal (S0B) by a fourth receive window signal (SF4) into a fourth internal signal (S2Bb), and
   wherein the fourth receive window signal (SF4) comprises, within said respective time segment ($T_z$), a sixth temporal start ($t_{s6}$) that is temporally situated after the fourth temporal start ($t_{s4}$) of the fourth signal (s4) and temporally before the fourth temporal end ($t_{e4}$) of the fourth signal (s4), and
   wherein the fourth receive window signal (SF4) comprises, within said respective time segment ($T_z$), a sixth temporal end ($t_{e6}$) that is temporally situated after the fourth temporal start ($t_{s4}$) of the fourth signal (s4) and temporally after the fourth temporal end ($t_{e4}$) of the fourth signal (s4), and
   wherein a fourth filter (F4) filters the difference of the third internal signal (S2Ba) and the fourth internal signal (S2Bb) to generate a fourth filter output signal (S8B), and
   wherein at least
      the fifth temporal start ($t_{s5}$) of the third receive window signal (SF3) and/or
      the fifth temporal end ($t_{e5}$) of the third receive window signal (SF3) and/or
      the sixth temporal start ($t_{s6}$) of the fourth receive window signal (SF4) and/or the sixth temporal end ($t_{e6}$) of the fourth receive window signal (SF4) and/or the delay time ($\Delta t$)

are dependent, within said respective time segment ($T_z$), on the fourth filter output signal (S8B), and wherein the fourth filter output signal (S8B) and/or a further output signal (S4B) derived therefrom particularly by a following fifth filter (F5), is used, within said respective time segment ($T_z$), as a further measuring value for the travel time determination of the fourth signal (s4) in the second transmission path (I2).

(see FIGS. 8 to 11)

24. Device according to Item 23, wherein a second summator ($\Sigma 2$) generates a receiver output sum signal (S0$\Sigma$) from the receiver output signal (S0) and the further receiver output signal (S0B) by summation, wherein the third multiplier (M3) multiplies the receiver output sum signal (S0$\Sigma$) instead of the further receiver output signal (S0B) by the third receive window signal (SF3) into the third internal signal (S2Ba), and wherein the fourth multiplier (M4) multiplies the receiver output sum signal (S0$\Sigma$) instead of the further receiver output signal (S0B) by the fourth receive window signal (SF4) into the fourth internal signal (S2Bb).

(see FIGS. 8 to 11)

25. Device according to Item 23 or 24, wherein a fourth difference generation unit ($\Delta S$) generates a receiver output differential signal (S0$\Delta$) from the receiver output signal (S0) and the further receiver output signal (S0B) by difference generation, wherein the third multiplier (M3) multiplies the receiver output differential signal (S0$\Delta$) instead of the further receiver output signal (S0B) by the third receive window signal (SF3) into the third internal signal (S2Ba), and wherein the fourth multiplier (M4) multiplies the receiver output differential signal (S0$\Delta$) instead of the further receiver output signal (S0B) by the fourth receive window signal (SF4) into the fourth internal signal (S2Bb).

(see FIGS. 8 to 11)

26. Device according to any one or a plurality of Items 1 to 25, wherein the first multiplier (M1) is designed as an analog switch which outputs either the receiver output signal (S0) or a predetermined fixed potential as a first internal signal (S2a) in dependence on the first receive window signal (SF1), and wherein the second multiplier (M2) is designed as an analog switch which outputs either the receiver output signal (S0) or a predetermined fixed potential as a second internal signal (S2b) in dependence on the second receive window signal (SF2).

(see FIGS. 8 to 11)

27. Device according to any one or a plurality of Items 1 to 26, wherein the first multiplier (M1) is designed as an analog switch which connects the receiver output signal (S0) to the first internal signal (S2a) and separates the receiver output signal (S0) from the first receiver (D1) when the first receive window signal (SF1) is in a first state, and wherein the first multiplier (M1) separates the receiver output signal (S0) from the first internal signal (S2a) and connects the receiver output signal (S0) and the first receiver (D1) when the first receive window signal (SF1) is in a second state, and wherein the second multiplier (M2) is designed as an analog switch which connects the receiver output signal (S0) to the second internal signal (S2b) and separates the receiver output signal (S0) from the first receiver (D1) when the second receive window signal (SF2) is in a first state, and wherein the second multiplier (M2) separates the receiver output signal (S0) from the second internal signal (S2b) and connects the receiver output signal (S0) and the first receiver (D1) when the second receive window signal (SF2) is in a second state.

(see FIGS. 8 to 11)

28. Device according to any one or a plurality of Items 1 to 26, wherein the first multiplier (M1) is designed as an analog switch which connects the receiver output signal (S0) to the first internal signal (S2a) and separates the receiver output signal (S0) from the first receiver (D1) when the first receive window signal (SF1) is in a first state, and wherein the first multiplier (M1) separates the receiver output signal (S0) from the first internal signal (S2a) and connects the receiver output signal (S0) and the receiver (D) and separates the first receiver (D1) from the current and voltage source when the first receive window signal (SF1) is in a second state, and wherein the second multiplier (M2) is designed as an analog switch which connects the receiver output signal (S0) to the second internal signal (S2b) and separates the receiver output signal (S0) from the first receiver (D1) when the second receive window signal (SF2) is in a first state, and wherein the second multiplier (M2) separates the receiver output signal (S0) from the second internal signal (S2b) and connects the receiver output signal (S0) and the first receiver (D1) when the second receive window signal (SF2) is in a second state, and wherein the device comprises a part device which connects the receiver output signal (S0) to a current and voltage source when the receiver output signal (S0) is connected neither to the first internal signal (S2a) nor to the second internal signal (S2b).

(see FIGS. 8 to 11)

29. Method for travel time determination of a first optical signal (s1) in a first transmission path (I1) which can include an object (O), between a transmitter (H) and a first receiver (D1), comprising the steps of:

optionally, at least temporarily delaying a transmission signal (S5) by a delay time ($\Delta t$) to generate a transmission wavelet signal (S5d), wherein this is performed particularly by a delay unit ($\Delta T$) or the transmission wavelet signal (S5d) is equal to the transmission signal (S5), related to a time segment ($T_z$), time-segment-wise transmission of a first, particularly optical signal (s1) into the first transmission path (I1) in dependence on the transmission wavelet signal (S5d), particularly by a transmitter (H), wherein the first signal (s1) comprises at least one carrier signal as a signal component which at least by a modulation signal is modulated in the amplitude and/or phase and/or polarization and/or wavelength and/or amplitude modulation frequency and/or spectral composition, and wherein, in each time segment ($T_z$) in which particularly the transmitter (H) transmits the first signal (s1), the first signal (s1) comprises, within said respective time segment ($T_z$), a first temporal start ($t_{s1}$) and a first temporal end ($t_{e1}$);

modifying the first signal (s1), when it is passing through this first transmission path (I1), to a second, particularly optical signal (s2), and wherein this modification relates to the amplitude and/or the phase and/or the polarization and/or the wavelength and/or the amplitude modulation frequency and/or the spectral composition of the second signal (s2) in comparison to the first signal (s1), and receiving the second signal (s2) after its exit from the transmission path (I1) within said respective time segment ($T_z$), particularly by the first receiver (D1);

converting the second signal (s2) into a receiver output signal (S0), particularly in the first receiver (D1), multiplying the receiver output signal (S0) by a first receive window signal (SF1) into a first internal signal (S2a), particularly by a first multiplier (M1)

wherein the first receive window signal (SF1) comprises, within said respective time segment ($T_z$), a second temporal start ($t_{s2}$) that is temporally situated before the first temporal start ($t_{s1}$) of the first signal (s1) and temporally before the temporal end ($t_{e1}$) of the first signal (s1), and wherein the first receive window signal (SF1) comprises, within said respective time segment ($T_z$), a second temporal end ($t_{e2}$) that is temporally situated after the first temporal start ($t_{s1}$) of the first signal (s1) and temporally before the temporal end ($t_{e1}$) of the first signal (s1), and multiplying the receiver output signal (S0) by a second receive window signal (SF2) into a second internal signal (S2b), particularly by a second multiplier (M2)

wherein the second receive window signal (SF2) comprises, within said respective time segment ($T_z$), a third temporal start ($t_{s3}$) that is temporally situated after the first temporal start ($t_{s1}$) of the first signal (s1) and temporally before the temporal end ($t_{e1}$) of the first signal (s1), and wherein the second receive window signal (SF2) comprises, within said respective time segment ($T_z$), a third temporal end ($t_{e3}$) that is temporally situated after the first temporal start ($t_{s1}$) of the first signal (s1) and temporally after the temporal end ($t_{e1}$) of the first signal (s1), and filtering the difference of the first internal signal (S2a) and the second internal signal (S2b) to generate a first filter output signal (S8), particularly by a first filter (F1), generating an output signal (S4) in dependence on the first filter output signal (S8) and/or use of the first filter output signal (S8) as an output signal (S4), particularly by a subsequent second filter (F2);

using the output signal (S4) as representing a measuring value for the travel time determination of the first signal (s1) and/or the second signal (s2) together, in the first transmission path (I1), wherein at least the second temporal start ($t_{s2}$) of the first receive window signal (SF1) and/or the second temporal end ($t_{e2}$) of the first receive window signal (SF1) and/or the third temporal start ($t_{s3}$) of the second receive window signal (SF2) and/or the third temporal end ($t_{e3}$) of the second receive window signal (SF2) and/or the delay time ($\Delta t$)

are dependent on the first filter output signal (S8).

(see FIGS. 8 to 11)

30. Method for travel time determination of a first, particularly optical signal (s1) in a first transmission path (I1) between a transmitter (H) and a first receiver (D1), wherein the transmitter (H) transmits a first signal (s1) into the first transmission path (I1) that, after passing through at least a part of the first transmission path (I1) (and thus being delayed), is received by the first receiver (D1) as a second signal (s2) being a modified first signal (s1), and is converted into a receiver output signal (S0), and wherein, in the first receiver (D1), the second signal (s2) is evaluated within two temporal receive windows, a first receive window (SF1) having a first temporal length (T1) and a second receive window (SF2) having a second temporal length (T2), wherein the start of the first signal (s1) is included exclusively in the first receive window (SF1) and the end of the first signal (s1) is included exclusively in the second receive window (SF2), wherein the receiver output signal (S0) comprises a first signal portion which is to be assigned to the first receive window (SF1), and a second signal portion which is to be assigned to the second receive window (SF2), wherein the first signal portion averaged over a predefined time segment ($T_z$) is, except for a deviation, as large as the second signal portion averaged over the time segment ($T_z$), and wherein the deviation is at least temporarily used as a feedback control signal for the temporal position of one or both receive windows (SF1, SF2) in relation to the first signal (s1) and/or the temporal position of the first signal (s1) in relation to the two receive windows (SF1,SF2), and/or the of first temporal length (T1) of the first receive window and/or of the second temporal length (T2) of the second receive window (SF1,SF2).

(see FIGS. 8 to 11)

31. Method according to Item 30, wherein the deviation and a first correction signal (SKE) are summated and this sum is then integrated, and this integration result instead of the deviation is used as a feedback control signal (see FIGS. 8 to 11).

32. Device for travel time determination of a first, particularly optical signal (s1) in a first transmission path (I1) between a transmitter (H) and a first receiver (D1), wherein either a delay unit ($\Delta T$) at least temporarily generates, from a transmission signal (S5), a transmission wavelet signal (S5d) delayed by a delay time ($\Delta t$) or the transmission wavelet signal (S5d) is equal to the transmission signal (S5), and wherein the transmitter (H), in dependence on the transmission wavelet signal (S5d), transmits a first, particularly optical signal (s1), time-segment-wise related to a time segment ($T_z$), into the first transmission path (I1), which first signal (s1) comprises at least one carrier signal as a signal component which at least by a modulation signal is modulated in the amplitude and/or phase and/or polarization and/or wavelength and/or amplitude modulation frequency and/or spectral composition, wherein, in each time segment ($T_z$) in which the transmitter (H) transmits the first signal (s1), the first signal (s1) comprises, within said respective time segment ($T_z$), a first temporal start ($t_{s1}$) and a first temporal end ($t_{e1}$), and wherein the first transmission path (I1) can include an object (O), and wherein the first transmission path (I1) modifies the first signal (s1), when it is passing through this first transmission path (I1), to a second, particularly optical signal (s2), and wherein this modification relates to the amplitude and/or the phase and/or the polarization and/or the wavelength and/or the amplitude modulation frequency and/or the spectral composition of the second signal (s2) in comparison to the first signal (s1), and wherein the first receiver (D1) receives the second signal (s2) after its exit from the first transmission path (I1) within said respective time segment ($T_z$), and wherein, in the first receiver (D1), the second signal (s2) is converted into a receiver output signal (S0), and wherein a first multiplier (M1) within said respective time segment ($T_z$) multiplies the receiver output signal (S0) by a first receive window signal (SF1) into a first internal signal (S2a), and wherein the first receive window signal (SF1) comprises, within said respective time segment ($T_z$), a second temporal start ($t_{s2}$) that is temporally situated before the first temporal start ($t_{s1}$) of the first signal (s1) and temporally before the temporal end ($t_{e1}$) of the first signal (s1), and wherein the first receive window signal (SF1) comprises, within said respective time segment ($T_z$), a second temporal end ($t_{e2}$) that is temporally situated after the first temporal start ($t_{s1}$) of the first signal (s1) and temporally before the temporal end ($t_{e1}$) of the first signal (s1), and wherein a second multiplier (M2) within said respective time segment ($T_z$) multiplies the receiver output signal (S0) by a second receive window signal (SF2) into a second internal signal (S2b), and wherein the second receive window signal (SF2) comprises, within said respective time segment ($T_z$), a third temporal start ($t_{s3}$) that is temporally situated after the first temporal start ($t_{s1}$) of the first signal (s1) and temporally before the temporal end ($t_{e1}$) of the first signal (s1), and wherein the second receive window signal (SF2) comprises, within said respective time segment ($T_z$), a third temporal end ($t_{e3}$) that is temporally situated after the first temporal start ($t_{s1}$) of the first signal (s1) and temporally after the temporal end ($t_{e1}$) of the first signal (s1), and wherein a first filter (F1), within said respective time segment ($T_z$), filters the difference of the first internal signal (S2a) and the second internal signal (S2b) to generate a first filter output signal (S8), and wherein at least
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time ($\Delta t$)

are dependent on the first filter output signal (S8), and wherein the first filter output signal (S8) and/or a first output signal (S4) derived therefrom particularly by a following second filter (F2), is used as a measuring value for the travel time determination of the first signal (s1) and/or the second signal (s2) together, in the first transmission path (I1).

(see FIGS. 8 to 11)

33. Device according to Item 32, for parallel determination of the travel time in a second transmission path (I2) which can entirely or partially coincide with the first transmission path (I1), between the transmitter (H) and at least one further receiver (D2), wherein the transmitter (H), in dependence on the transmission wavelet signal (S5d), transmits a third, particularly optical signal (s3) in a time-segment-wise manner into the second transmission path (I2), which third signal (s3) comprises at least one carrier signal as a signal component which at least by a modulation signal is modulated in the amplitude and/or phase and/or polarization and/or wavelength and/or amplitude modulation frequency and/or spectral composition, wherein, in each time segment ($T_z$) in which the transmitter (H) transmits the third signal (s3), the third signal (s3) comprises, within said respective time segment ($T_z$), a fourth temporal start ($t_{s4}$) and a fourth temporal end ($t_{e4}$), and wherein the second transmission path (I2) can include a further object (O2) and/or the object (O), and wherein the second transmission path (I2) modifies the third signal (s3), when it is passing through this second transmission path (I2), to a fourth, particularly optical signal (s4), and wherein this modification relates to the amplitude and/or the phase and/or the polarization and/or the wavelength and/or the amplitude modulation frequency and/or the spectral composition of the fifth signal in comparison to the fourth signal, and wherein the further receiver (D2) receives the fourth signal (s4) after its exit from the second transmission path (I2) within said respective time segment ($T_z$), and wherein, in the further receiver (D2), the fourth signal (s4) is converted into a further receiver output signal (S0B), and wherein a third multiplier (M3) within said respective time segment ($T_z$) multiplies the further receiver output signal (S0B) by a third receive window signal (SF3) into a third internal signal (S2Ba), and wherein the third receive window signal (SF3) comprises, within said respective time segment ($T_z$), a fifth temporal start ($t_{s5}$) that is temporally situated before the fourth temporal start ($t_{s4}$) of the third signal (s4) and temporally before the fourth temporal end ($t_{e4}$) of the fourth signal (s4), and wherein the third receive window signal (SF3) comprises, within said respective time segment ($T_z$), a fifth temporal end ($t_{e5}$) that is temporally situated after the fourth temporal start ($t_{s4}$) of the fourth signal (s4) and temporally before the fourth temporal end ($t_{e4}$) of the fourth signal (s4), and wherein a fourth multiplier (M4) within said respective time segment ($T_z$) multiplies the further receiver output signal (S0B) by a fourth receive window signal (SF4) into a fourth internal signal (S2Bb), and wherein the fourth receive window signal (SF4) comprises, within said respective time segment ($T_z$), a sixth temporal start ($t_{s6}$) that is temporally situated after the fourth temporal start ($t_{s4}$) of the fourth signal (s4) and temporally before the fourth temporal end ($t_{e4}$) of the fourth signal (s4), and wherein the fourth receive window signal (SF4) comprises, within said respective time segment ($T_z$), a sixth temporal end ($t_{e6}$) that is temporally situated after the fourth temporal start ($t_{s4}$) of the fourth signal (s4) and temporally after the fourth temporal end ($t_{e4}$) of the fourth signal (s4), and wherein a fourth filter (F4) filters the difference of the third internal signal (S2Ba) and the fourth internal signal (S2Bb) to generate a fourth filter output signal (S8B), and wherein at least
the fifth temporal start ($t_{s5}$) of the third receive window signal (SF3) and/or
the fifth temporal end ($t_{e5}$) of the third receive window signal (SF3) and/or
the sixth temporal start ($t_{s6}$) of the fourth receive window signal (SF4) and/or
the sixth temporal end ($t_{e6}$) of the fourth receive window signal (SF4) and/or
the delay time ($\Delta t$)
are dependent, within said respective time segment ($T_z$), on the fourth filter output signal (S8B), and wherein the fourth filter output signal (S8B) and/or a further output signal (S4B) derived therefrom particularly by a following fifth filter (F5), is used, within said respective time segment ($T_z$), as a further measuring value for the travel time determination of the fourth signal (s4) in the second transmission path (I2).
(see FIGS. 8 to 11)

34. Device according to Item 33,
wherein a second summator ($\Sigma 2$) generates a receiver output sum signal (S0$\Sigma$) from the receiver output signal (S0) and the further receiver output signal (S0B) by summation,
wherein the third multiplier (M3) multiplies the receiver output sum signal (S0$\Sigma$) instead of the further receiver output signal (S0B) by the third receive window signal (SF3) into the third internal signal (S2Ba), and
wherein the fourth multiplier (M4) multiplies the receiver output sum signal (S0$\Sigma$) instead of the further receiver output signal (S0B) by the fourth receive window signal (SF4) into the fourth internal signal (S2Bb).
(see FIGS. 8 to 11)

35. Device according to Item 33 or 34,
wherein a fourth difference generation unit ($\Delta S$) generates a receiver output differential signal (S0$\Delta$) from the receiver output signal (S0) and the further receiver output signal (S0B) by difference generation,
wherein the third multiplier (M3) multiplies the receiver output differential signal (S0$\Delta$) instead of the further receiver output signal (S0B) by the third receive window signal (SF3) into the third internal signal (S2Ba), and
wherein the fourth multiplier (M4) multiplies the receiver output differential signal (S0$\Delta$) instead of the further receiver output signal (S0B) by the fourth receive window signal (SF4) into the fourth internal signal (S2Bb).
(see FIGS. 8 to 11)

36. Method for travel time determination of a first optical signal (s1) in a first transmission path (I1) which can include an object (O), between a transmitter (H) and a first receiver (D1), comprising the steps of:

optionally, at least temporarily delaying a transmission signal (S5) by a delay time ($\Delta t$) to generate a transmission wavelet signal (S5$d$), wherein this is performed particularly by a delay unit ($\Delta T$) or the transmission wavelet signal (S5$d$) is equal to the transmission signal (S5), related to a time segment ($T_z$), time-segment-wise transmission of a first, particularly optical signal (s1) into the first transmission path (I1) in dependence on the transmission wavelet signal (S5$d$), particularly by a transmitter (H),
wherein the first signal (s1) comprises at least one carrier signal as a signal component which at least by a modulation signal is modulated in the amplitude and/or phase and/or polarization and/or wavelength and/or amplitude modulation frequency and/or spectral composition, and
wherein, in each time segment ($T_z$) in which particularly the transmitter (H) transmits the first signal (s1), the first signal (s1) comprises, within said respective time segment ($T_z$), a first temporal start ($t_{s1}$) and a first temporal end ($t_{e1}$);

modifying the first signal (s1), when it is passing through this first transmission path (I1), to a second, particularly optical signal (s2), and
wherein this modification relates to the amplitude and/or the phase and/or the polarization and/or the wavelength and/or the amplitude modulation frequency and/or the spectral composition of the second signal (s2) in comparison to the first signal (s1), and receiving the second signal (s2) after its exit from the transmission path (I1) within said respective time segment ($T_z$), particularly by the first receiver (D1);

converting the second signal (s2) into a receiver output signal (S0), particularly in the first receiver (D1), multiplying the receiver output signal (S0) by a first receive window signal (SF1) into a first internal signal (S2$a$), particularly by a first multiplier (M1)
wherein the first receive window signal (SF1) comprises, within said respective time segment ($T_z$), a second temporal start ($t_{s2}$) that is temporally situated before the first temporal start ($t_{s1}$) of the first signal (s1) and temporally before the temporal end ($t_{e1}$) of the first signal (s1), and
wherein the first receive window signal (SF1) comprises, within said respective time segment ($T_z$), a second temporal end ($t_{e2}$) that is temporally situated after the first temporal start ($t_{s1}$) of the first signal (s1) and temporally before the temporal end ($t_{e1}$) of the first signal (s1), and multiplying the receiver output signal (S0) by a second receive window signal (SF2) into a second internal signal (S2$b$), particularly by a second multiplier (M2)
wherein the second receive window signal (SF2) comprises, within said respective time segment ($T_z$), a third temporal start ($t_{s3}$) that is temporally situated after the first temporal start ($t_{s1}$) of the first signal (s1) and temporally before the temporal end ($t_{e1}$) of the first signal (s1), and
wherein the second receive window signal (SF2) comprises, within said respective time segment ($T_z$), a third temporal end ($t_{e3}$) that is temporally situated after the first temporal start ($t_{s1}$) of the first signal (s1) and temporally after the temporal end ($t_{e1}$) of the first signal (s1), and filtering the difference of the first internal signal (S2*a*) and the second internal signal (S2*b*) to generate a first filter output signal (S8), particularly by a first filter (F1), generating an output signal (S4) in dependence on the first filter output signal (S8) and/or use of the first filter output signal (S8) as an output signal (S4), particularly by a subsequent second filter (F2);

using the output signal (S4) as representing a measuring value for the travel time determination of the first signal (s1) and/or the second signal (s2) together, in the first transmission path (I1), wherein at least the second temporal start ($t_{s2}$) of the first receive window signal (SF1) and/or the second temporal end ($t_{e2}$) of the first receive window signal (SF1) and/or the third temporal start ($t_{s3}$) of the second receive window signal (SF2) and/or the third temporal end ($t_{e3}$) of the second receive window signal (SF2) and/or the delay time (Δt)

are dependent on the first filter output signal (S8).

(see FIGS. 8 to 11)

37. Method for travel time determination of a first, particularly optical signal (s1) in a first transmission path (I1) between a transmitter (H) and a first receiver (D1), wherein the transmitter (H) transmits a first signal (s1) into the first transmission path (I1) that, after passing through at least a part of the first transmission path (I1) (and thus being delayed), is received by the first receiver (D1) as a second signal (s2) being a modified first signal (s1), and is converted into a receiver output signal (S0), and wherein, in the first receiver (D1), the second signal (s2) is evaluated within two temporal receive windows, a first receive window (SF1) having a first temporal length (T1) and a second receive window (SF2) having a second temporal length (T2), wherein the start of the first signal (s1) is included exclusively in the first receive window (SF1) and the end of the first signal (s1) is included exclusively in the second receive window (SF2), wherein the receiver output signal (S0) comprises a first signal portion which is to be assigned to the first receive window (SF1), and a second signal portion which is to be assigned to the second receive window (SF2), wherein the first signal portion averaged over a predefined time segment ($T_z$) is, except for a deviation, as large as the second signal portion averaged over the time segment ($T_z$), and wherein the deviation is at least temporarily used as a feedback control signal for the temporal position of one or both receive windows (SF1, SF2) in relation to the first signal (s1) and/or the temporal position of the first signal (s1) in relation to the two receive windows (SF1,SF2), and/or the of first temporal length (T1) of the first receive window and/or of the second temporal length (T2) of the second receive window (SF1,SF2).

(see FIGS. 8 to 11)

38. Method according to claim 37, wherein the deviation and a first correction signal (SKE) are summated and this sum is then integrated, and this integration result instead of the deviation is used as a feedback control signal (see FIGS. 8 to 11).

39. Method for conversion of a temporal delay (Δt) of a receiver output signal (S0) relative to a transmission wavelet signal (S5*d*), which delay has been experienced by the transmission wavelet signal (S5*d*) in a transmission path (I1) of any desired physical nature during conversion into the receiver output signal (S0), comprising, at least time-segment-wise, the steps of:

generating the transmission wavelet signal (S5*d*) on the basis of a first temporal wavelet (WL1), with a first reference time point ($t_0$) of the first wavelet (WL1) in at least one respective time segment;

infeeding the transmission wavelet signal (S5*d*) into the transmission path (I1) and conversion of the transmission wavelet signal (S5*d*) into the receiver output signal (S0);

generating a first analysis wavelet signal (WS1) on the basis of a second wavelet (WL2), with a second reference time point ($t_0+t_v$) of the second wavelet (WL2) in at least the respective time segment with a first delay time ($t_v$) relative to the first reference time point ($t_0$);

generating a temporal scalar product signal (S8) by scalar product generation between the receiver output signal (S0) and the first analysis wavelet signal (WS1);

generating a time-continuous, value-discrete evaluation signal (S9) by comparison of the value of the scalar product signal (S8) to a first reference value (Ref) and change of the value of the time-continuous, value-discrete evaluation signal (S9) when the value of the scalar product signal (S8) intersects the reference value (Ref) at an intersection time point ($t_0+t_s$) relative to the first reference time point ($t_0$);

change of the first delay time ($t_v$) in dependence on the intersection time point ($t_0+t_s$).

(see FIGS. 1 to 7)

40. Method according to Item 39, comprising the additional steps of:

generating a correction signal (K1) in dependence on the intersection time point ($t_0+t_s$);

generating a corrected scalar product signal (S10) by adding the value of the correction signal (K1) to the value of the scalar product signal (S8);

filtering the corrected scalar product signal (S10) to generate a filtered scalar product signal (S11);

use of the filtered scalar product signal (S11) instead of the scalar product signal (S8) for generating the time-continuous, value-discrete evaluation signal (S9).

(see FIGS. 1 to 7)

41. Method according to Item 39, wherein the generation of a temporal scalar product signal (S8) by scalar product generation between the receiver output signal (S0) and the first analysis wavelet signal (WS1) is performed by the steps of generating a filter input signal (S2) by multiplication of the receiver output signal (S0) and the first analysis wavelet signal (WS1);

filtering the filter input signal (S2) to generate the scalar product signal (S8).

(see FIGS. 1 to 7)

42. Method according to Item 41, wherein the filtering of the filter input signal (S2) to generate the scalar product signal (S8) comprises an integration (see FIGS. 1 to 7).

43. Method according to Item 40, wherein the filtering of the corrected scalar product signal (S10) to generate the filtered scalar product signal (S11) comprises an integration (see FIGS. 1 to 7).

44. Method according to Item 39, wherein the first wavelet (WS1) and the second wavelet (WL2) are selected in such a manner that the value of the scalar product signal (S8) is dependent, in a monotonously decreasing or strictly monotonously decreasing manner or in a monotonously increasing or strictly monotonously increasing manner, on the temporal delay (Δt) of the transmission wavelet signal (S5d) in the transmission path to the receiver output signal (S0), wherein the temporal delay (Δt) is situated in a temporal interval whose temporal length is different from zero (see FIGS. 1 to 7).

45. Method for conversion of a temporal delay (Δt) of a receiver output signal (S0) relative to a transmission wavelet signal (S5d), which delay has been experienced by the transmission wavelet signal (S5d) in a transmission path (I1) of any desired physical nature during conversion into the receiver output signal (S0), comprising, at least time-segment-wise, the steps of:
   generating a first analysis wavelet signal (WS1) on the basis of a second wavelet (WL2), with a first reference time point ($t_0$) of the second wavelet (WL2) in at least the respective time segment;
   generating the transmission wavelet signal (S5d) on the basis of a first temporal wavelet (WL1), with a second reference time point ($t_0+t_v$) of the first wavelet (WL1) in at least one respective time segment with a first delay time ($t_v$) relative to the first reference time point ($t_0$);
   infeeding the transmission wavelet signal (S5d) into the transmission path (I1) and conversion of the transmission wavelet signal (S5d) into the receiver output signal (S0);
   generating a temporal scalar product signal (S8) by scalar product generation between the receiver output signal (S0) and the first analysis wavelet signal (WS1);
   generating a time-continuous, value-discrete evaluation signal (S9) by comparison of the value of the scalar product signal (S8) to a first reference value (Ref) and change of the value of the time-continuous, value-discrete evaluation signal (S9) when the value of the scalar product signal (S8) intersects the reference value (Ref) at an intersection time point ($t_0+t_s$) relative to the first reference time point ($t_0$);
   change of the first delay time ($t_v$) in dependence on the intersection time point ($t_0+t_s$).
   (see FIGS. 1 to 7)

46. Method according to Item 45, comprising the additional steps of
   generating a correction signal (K1) in dependence on the intersection time point ($t_0+t_s$);
   generating a corrected scalar product signal (S10) by adding the value of the correction signal (K1) to the value of the scalar product signal (S8);
   filtering the corrected scalar product signal (S10) to generate a filtered scalar product signal (S11);
   use of the filtered scalar product signal (S11) instead of the scalar product signal (S8) for generating the time-continuous, value-discrete evaluation signal (S9).
   (see FIGS. 1 to 7)

47. Method according to Item 45, wherein the generation of a temporal scalar product signal (S8) by scalar product generation between the receiver output signal (S0) and the first analysis wavelet signal (WS1) is performed by the steps of
   generating a filter input signal (S2) by multiplication of the receiver output signal (S0) and the first analysis wavelet signal (WS1);
   filtering the filter input signal (S2) to generate the scalar product signal (S8).
   (see FIGS. 1 to 7)

48. Method according to Item 47, wherein the filtering of the filter input signal (S2) to generate the scalar product signal (S8) comprises an integration (see FIGS. 1 to 7).

49. Method according to Item 46, wherein the filtering of the corrected scalar product signal (S10) to generate the filtered scalar product signal (S11) comprises an integration (see FIGS. 1 to 7).

50. Method according to Item 45, wherein the first wavelet (WS1) and the second wavelet (WL2) are selected in such a manner that the value of the scalar product signal (S8) is dependent, in a monotonously decreasing or strictly monotonously decreasing manner or in a monotonously increasing or strictly monotonously increasing manner, on the temporal delay (Δt) of the transmission wavelet signal (S5d) in the transmission path to the receiver output signal (S0), wherein the temporal delay (Δt) is situated in a temporal interval whose temporal length is different from zero (see FIGS. 1 to 7).

51. Method for conversion of a temporal delay (Δt) of a receiver output signal (S0) relative to a transmission wavelet signal (S5d), which delay has been experienced by the transmission wavelet signal (S5d) in a transmission path (I1) of any desired physical nature during conversion into the receiver output signal (S0), comprising, at least time-segment-wise, the steps of:
   generating the transmission wavelet signal (S5d) on the basis of a first temporal wavelet (WL1), with a first reference time point ($t_0$) of the first wavelet (WL1) and a first temporal compression ($\alpha_1$) of the first wavelet (WL1) in at least one respective time segment;
   infeeding the transmission wavelet signal (S5d) into the transmission path (I1) and conversion of the transmission wavelet signal (S5d) into the receiver output signal (S0);
   generating a first analysis wavelet signal (WS1) on the basis of a second wavelet (WL2), with a second reference time point ($t_0+t_v$) of the second wavelet (WL2) in at least the respective time segment with a first delay time ($t_v$) which can be zero, relative to the first reference time point ($t_0$), and a second temporal compression ($\alpha_2$) of the second wavelet (WL2);
   generating a temporal scalar product signal (S8) by scalar product generation between the receiver output signal (S0) and the first analysis wavelet signal (WS1);
   generating a time-continuous, value-discrete evaluation signal (S9) by comparison of the value of the scalar product signal (S8) to a first reference value (Ref) and change of the value of the time-continuous, value-discrete evaluation signal (S9) when the value of the scalar product signal (S8) intersects the reference value (Ref) at an intersection time point ($t_0+t_s$) relative to the first reference time point ($t_0$);
   change of the first temporal compression (a1) of the first wavelet (WL1) in dependence on the intersection time point ($t_0+t_s$) and/or change of the second temporal compression ($\alpha_2$) of the second wavelet (WL2) in dependence on the intersection time point ($t_0+t_s$).
   (see FIGS. 1 to 7)

52. Method according to Item 51, comprising the additional step of:
   additional change of the first delay time ($t_v$) in dependence on the intersection time point ($t_0+t_s$).
   (see FIGS. 1 to 7)

53. Method according to Item 51, comprising the additional steps of
   generating a correction signal (K1) in dependence on the intersection time point ($t_0+t_s$);
   generating a corrected scalar product signal (S10) by adding the value of the correction signal (K1) to the value of the scalar product signal (S8);

filtering the corrected scalar product signal (S10) to generate a filtered scalar product signal (S11);
use of the filtered scalar product signal (S11) instead of the scalar product signal (S8) for generating the time-continuous, value-discrete evaluation signal (S9).
(see FIGS. 1 to 7)

54. Method according to Item 51, wherein the generation of a temporal scalar product signal (S8) by scalar product generation between the receiver output signal (S0) and the first analysis wavelet signal (WS1) is performed by the steps of:
generating a filter input signal (S2) by multiplication of the receiver output signal (S0) and the first analysis wavelet signal (WS1);
filtering the filter input signal (S2) to generate the scalar product signal (S8).
(see FIGS. 1 to 7)

55. Method according to Item 41, wherein the filtering of the filter input signal (S2) to generate the scalar product signal (S8) comprises an integration (see FIGS. 1 to 7).

56. Method according to Item 53, wherein the filtering of the corrected scalar product signal (S10) to generate the filtered scalar product signal (S11) comprises an integration (see FIGS. 1 to 7).

57. Method according to Item 51, wherein the first wavelet (WS1) and the second wavelet (WL2) are selected in such a manner that the value of the scalar product signal (S8) is dependent, in a monotonously decreasing or strictly monotonously decreasing manner or in a monotonously increasing or strictly monotonously increasing manner, on the temporal delay ($\Delta t$) of the transmission wavelet signal (S5$d$) in the transmission path to the receiver output signal (S0), wherein the temporal delay ($\Delta t$) is situated in a temporal interval whose temporal length is different from zero (see FIGS. 1 to 7).

58. Method for conversion of a temporal delay ($\Delta t$) of a receiver output signal (S0) relative to a transmission wavelet signal (S5$d$), which delay has been experienced by the transmission wavelet signal (S5$d$) in a transmission path (I1) of any desired physical nature during conversion into the receiver output signal (S0), comprising, at least time-segment-wise, the steps of:
generating a first analysis wavelet signal (WS1) on the basis of a second wavelet (WL2), with a first reference time point ($t_0$) and a second temporal compression ($\alpha_2$) of the second wavelet (WL2) in at least the respective time segment;
generating the transmission wavelet signal (S5$d$) on the basis of a first temporal wavelet (WL1), with a second reference time point ($t_0+t_v$) and a first temporal compression ($\alpha_1$) of the first wavelet (WL1) in at least one respective time segment with a first delay time ($t_v$) which can be zero, relative to the first reference time point ($t_0$);
infeeding the transmission wavelet signal (S5$d$) into the transmission path (I1) and conversion of the transmission wavelet signal (S5$d$) into the receiver output signal (S0);
generating a temporal scalar product signal (S8) by scalar product generation between the receiver output signal (S0) and the first analysis wavelet signal (WS1);
generating a time-continuous, value-discrete evaluation signal (S9) by comparison of the value of the scalar product signal (S8) to a first reference value (Ref) and change of the value of the time-continuous, value-discrete evaluation signal (S9) when the value of the scalar product signal (S8) intersects the reference value (Ref) at an intersection time point ($t_0+t_s$) relative to the first reference time point ($t_0$);
change of the first delay time ($t_v$) in dependence on the intersection time point ($t_0+t_s$);
change of the second temporal compression ($\alpha_2$) of the second wavelet (WL2) in dependence on the intersection time point ($t_0+t_s$) and/or change of the first temporal compression ($\alpha_1$) of the first wavelet (WL1) in dependence on the intersection time point ($t_0+t_s$).
(see FIGS. 1 to 7)

59. Method according to Item 58, comprising the additional steps of
generating a correction signal (K1) in dependence on the intersection time point ($t_0+t_s$);
generating a corrected scalar product signal (S10) by adding the value of the correction signal (K1) to the value of the scalar product signal (S8);
filtering the corrected scalar product signal (S10) to generate a filtered scalar product signal (S11);
use of the filtered scalar product signal (S11) instead of the scalar product signal (S8) for generating the time-continuous, value-discrete evaluation signal (S9).
(see FIGS. 1 to 7)

60. Method according to Item 58, wherein the generation of a temporal scalar product signal (S8) by scalar product generation between the receiver output signal (S0) and the first analysis wavelet signal (WS1) is performed by the steps of:
generating a filter input signal (S2) by multiplication of the receiver output signal (S0) and the first analysis wavelet signal (WS1);
filtering the filter input signal (S2) to generate the scalar product signal (S8).
(see FIGS. 1 to 7)

61. Method according to Item 60, wherein the filtering of the filter input signal (S2) to generate the scalar product signal (S8) comprises an integration (see FIGS. 1 to 7).

62. Method according to Item 59, wherein the filtering of the corrected scalar product signal (S10) to generate the filtered scalar product signal (S11) comprises an integration (see FIGS. 1 to 7).

62. Method according to Item 58, wherein the first wavelet (WS1) and the second wavelet (WL2) are selected in such a manner that the value of the scalar product signal (S8) is dependent, in a monotonously decreasing or strictly monotonously decreasing manner or in a monotonously increasing or strictly monotonously increasing manner, on the temporal delay ($\Delta t$) of the transmission wavelet signal (S5$d$) in the transmission path to the receiver output signal (S0), wherein the temporal delay ($\Delta t$) is situated in a temporal interval whose temporal length is different from zero (see FIGS. 1 to 7).

63. Device for conversion of a temporal delay ($\Delta t$) of a receiver output signal (S0) relative to a transmission wavelet signal (S5$d$), which delay has been experienced by the transmission wavelet signal (S5$d$) in a transmission path (I1) of any desired physical nature during conversion into the receiver output signal (S0), comprising
a transmission wavelet signal generator (WG1) for generating the transmission wavelet signal (S5$d$) on the basis of a first temporal wavelet (WL1), with a first reference time point ($t_0$) of the first wavelet (WL1) in at least one respective time segment;
a first analysis wavelet signal generator (WG2) for generating a first analysis wavelet signal (WS1) on the basis of a second wavelet (WL2), with a second reference time point ($t_0+t_v$) of the second wavelet (WL2) in at least the respective time segment with a first delay time ($t_v$) relative to the first reference time point ($t_0$);

a scalar product device for generating a temporal scalar product signal (S8) by scalar product generation between the receiver output signal (S0) and the first analysis wavelet signal (WS1);

a time-to-digital converter (TDC), particularly a comparator, for generating a time-continuous, value-discrete evaluation signal (S9) by comparison of the value of the scalar product signal (S8) to a first reference value (Ref) and change of the value of the time-continuous, value-discrete evaluation signal (S9) when the value of the scalar product signal (S8) intersects the reference value (Ref) at an intersection time point ($t_0+t_s$) relative to the first reference time point ($t_0$);

a feedback controller (CTR) for changing the first delay time ($t_v$) used by the first analysis wavelet signal generator (WG2), in dependence on the intersection time point ($t_0+t_s$).

(see FIGS. 1 to 7)

64. Device according to Item 63, additionally comprising
a correction unit (KE) for generating a correction signal (K1) in dependence on the intersection time point ($t_0+t_s$);
a first summator (Σ1) for generating a corrected scalar product signal (S10) by adding the value of the correction signal (K1) to the value of the scalar product signal (S8);
a second filter (F2) for filtering the corrected scalar product signal (S10) to generate a filtered scalar product signal (S11);
wherein the filtered scalar product signal (S11) is used instead of the scalar product signal (S8) for generating the time-continuous, value-discrete evaluation signal (S9).

(see FIGS. 1 to 7)

65. Device according to Item 63 for generating a temporal scalar product signal (S8) by scalar product generation between the receiver output signal (S0) and the first analysis wavelet signal (WS1), additionally comprising
a first multiplier (M1) for generating a filter input signal (S2) by multiplication of the receiver output signal (S0) and the first analysis wavelet signal (WS1);
a first filter (F1) filtering the filter input signal (S2) to generate the scalar product signal (S8).

(see FIGS. 1 to 7)

66. Device according to Item 65, comprising an integrator as a first filter (F1) (see FIGS. 1 to 7).

67. Device according to Item 64, comprising an integrator as a second filter (F2) (see FIGS. 1 to 7).

68. Device according to Item 63, wherein the first wavelet (WS1) of the transmission wavelet signal generator (WG1) and the second wavelet (WL2) of the first analysis wavelet signal generator (WG2) are designed in such a manner that the value of the scalar product signal (S8) is dependent, in a monotonously decreasing or strictly monotonously decreasing manner or in a monotonously increasing or strictly monotonously increasing manner, on the temporal delay (Δt) of the transmission wavelet signal (S5d) in the transmission path to the receiver output signal (S0), wherein the temporal delay (Δt) is situated in a temporal interval whose temporal length is different from zero (see FIGS. 1 to 7).

69. Device for conversion of a temporal delay (Δt) of a receiver output signal (S0) relative to a transmission wavelet signal (S5d), which delay has been experienced by the transmission wavelet signal (S5d) in a transmission path (I1) of any desired physical nature during conversion into the receiver output signal (S0), comprising a transmission wavelet signal generator (WG1) for generating the transmission wavelet signal (S5d) on the basis of a first temporal wavelet (WL1), with a first reference time point ($t_0+t_v$) of the first wavelet (WL1) in at least one respective time segment with a first delay time ($t_v$) relative to the second reference time point ($t_0$);

a first analysis wavelet signal generator (WG2) for generating a first analysis wavelet signal (WS1) on the basis of a second wavelet (WL2), with a second reference time point ($t_0$) of the second wavelet (WL2);

a scalar product device for generating a temporal scalar product signal (S8) by scalar product generation between the receiver output signal (S0) and the first analysis wavelet signal (WS1);

a time-to-digital converter (TDC), particularly a comparator, for generating a time-continuous, value-discrete evaluation signal (S9) by comparison of the value of the scalar product signal (S8) to a first reference value (Ref) and change of the value of the time-continuous, value-discrete evaluation signal (S9) when the value of the scalar product signal (S8) intersects the reference value (Ref) at an intersection time point ($t_0+t_s$) relative to the first reference time point ($t_0$);

a feedback controller (CTR) for changing the first delay time ($t_v$) used by the transmission wavelet signal generator (WG1), in dependence on the intersection time point ($t_0+t_s$).

(see FIGS. 1 to 7)

70. Device according to Item 69, additionally comprising
a correction unit (KE) for generating a correction signal (K1) in dependence on the intersection time point ($t_0+t_s$);
a first summator (Σ1) for generating a corrected scalar product signal (S10) by adding the value of the correction signal (K1) to the value of the scalar product signal (S8);
a second filter (F2) for filtering the corrected scalar product signal (S10) to generate a filtered scalar product signal (S11);
wherein the filtered scalar product signal (S11) is used instead of the scalar product signal (S8) for generating the time-continuous, value-discrete evaluation signal (S9).

(see FIGS. 1 to 7)

71. Device according to Item 69 for generating a temporal scalar product signal (S8) by scalar product generation between the receiver output signal (S0) and the first analysis wavelet signal (WS1), additionally comprising
a first multiplier (M1) for generating a filter input signal (S2) by multiplication of the receiver output signal (S0) and the first analysis wavelet signal (WS1);
a first filter (F1) filtering the filter input signal (S2) to generate the scalar product signal (S8).

(see FIGS. 1 to 7)

72. Device according to Item 71, comprising an integrator as a first filter (F1) (see FIGS. 1 to 7).

73. Device according to Item 70, comprising an integrator as a second filter (F2) (see FIGS. 1 to 7).

74. Device according to Item 69, wherein the first wavelet (WS1) of the transmission wavelet signal generator (WG1) and the second wavelet (WL2) of the first analysis wavelet signal generator (WG2) are designed in such a manner that the value of the scalar product signal (S8) is dependent, in a monotonously decreasing or strictly monotonously decreasing manner or in a monotonously increasing or strictly monotonously increasing manner, on the temporal delay (Δt) of the transmission wavelet signal (S5d) in the transmission path to the receiver output signal (S0), wherein the temporal delay (Δt) is situated in a temporal interval whose temporal length is different from zero (see FIGS. 1 to 7).

75. Device for conversion of a temporal delay (Δt) of a receiver output signal (S0) relative to a transmission wavelet signal (S5d), which delay has been experienced by the transmission wavelet signal (S5d) in a transmission path (I1) of any desired physical nature during conversion into the receiver output signal (S0), comprising
    a transmission wavelet signal generator (WG1) for generating the transmission wavelet signal (S5d) on the basis of a first temporal wavelet (WL1), with a first reference time point ($t_0$) of the first wavelet (WL1) in at least one respective time segment;
    a first analysis wavelet signal generator (WG2) for generating a first analysis wavelet signal (WS1) on the basis of a second wavelet (WL2), with a second reference time point ($t_0+t_v$) of the second wavelet (WL2) in at least the respective time segment with a first delay time ($t_v$) relative to the first reference time point ($t_0$) and a second temporal compression ($\alpha_2$) of the second wavelet (WL2);
    a scalar product device for generating a temporal scalar product signal (S8) by scalar product generation between the receiver output signal (S0) and the first analysis wavelet signal (WS1);
    a time-to-digital converter (TDC), particularly a comparator, for generating a time-continuous, value-discrete evaluation signal (S9) by comparison of the value of the scalar product signal (S8) to a first reference value (Ref) and change of the value of the time-continuous, value-discrete evaluation signal (S9) when the value of the scalar product signal (S8) intersects the reference value (Ref) at an intersection time point ($t_0+t_s$) relative to the first reference time point ($t_0$);
    a feedback controller (CTR) for changing the second temporal compression ($\alpha_2$) used by the first analysis wavelet signal generator (WG2), in dependence on the intersection time point ($t_0+t_s$).
    (see FIGS. 1 to 7)

76. Device according to Item 75, additionally comprising
    a correction unit (KE) for generating a correction signal (K1) in dependence on the intersection time point ($t_0+t_s$);
    a first summator (Σ1) for generating a corrected scalar product signal (S10) by adding the value of the correction signal (K1) to the value of the scalar product signal (S8);
    a second filter (F2) for filtering the corrected scalar product signal (S10) to generate a filtered scalar product signal (S11);
    wherein the filtered scalar product signal (S11) is used instead of the scalar product signal (S8) for generating the time-continuous, value-discrete evaluation signal (S9).
    (see FIGS. 1 to 7)

77. Device according to Item 75 for generating a temporal scalar product signal (S8) by scalar product generation between the receiver output signal (S0) and the first analysis wavelet signal (WS1), additionally comprising
    a first multiplier (M1) for generating a filter input signal (S2) by multiplication of the receiver output signal (S0) and the first analysis wavelet signal (WS1);
    a first filter (F1) filtering the filter input signal (S2) to generate the scalar product signal (S8).
    (see FIGS. 1 to 7)

78. Device according to Item 77, comprising an integrator as a first filter (F1) (see FIGS. 1 to 7).

78. Device according to Item 76, comprising an integrator as a second filter (F2) (see FIGS. 1 to 7).

79. Device according to Item 75, wherein the first wavelet (WS1) of the transmission wavelet signal generator (WG1) and the second wavelet (WL2) of the first analysis wavelet signal generator (WG2) are designed in such a manner that the value of the scalar product signal (S8) is dependent, in a monotonously decreasing or strictly monotonously decreasing manner or in a monotonously increasing or strictly monotonously increasing manner, on the temporal delay (Δt) of the transmission wavelet signal (S5d) in the transmission path to the receiver output signal (S0), wherein the temporal delay (Δt) is situated in a temporal interval whose temporal length is different from zero (see FIGS. 1 to 7).

80. Device for conversion of a temporal delay (Δt) of a receiver output signal (S0) relative to a transmission wavelet signal (S5d), which delay has been experienced by the transmission wavelet signal (S5d) in a transmission path (I1) of any desired physical nature during conversion into the receiver output signal (S0), comprising
    a transmission wavelet signal generator (WG1) for generating the transmission wavelet signal (S5d) on the basis of a first temporal wavelet (WL1), with a first reference time point ($t_0+t_v$) of the first wavelet (WL1) in at least one respective time segment with a first delay time ($t_v$) relative to the second reference time point ($t_0$) and a first temporal compression ($\alpha_1$) of the first wavelet (WL1);
    a first analysis wavelet signal generator (WG2) for generating a first analysis wavelet signal (WS1) on the basis of a second wavelet (WL2), with a second reference time point ($t_0$) of the second wavelet (WL2);
    a scalar product device for generating a temporal scalar product signal (S8) by scalar product generation between the receiver output signal (S0) and the first analysis wavelet signal (WS1);
    a time-to-digital converter (TDC), particularly a comparator, for generating a time-continuous, value-discrete evaluation signal (S9) by comparison of the value of the scalar product signal (S8) to a first reference value (Ref) and change of the value of the time-continuous, value-discrete evaluation signal (S9) when the value of the scalar product signal (S8) intersects the reference value (Ref) at an intersection time point ($t_0+t_s$) relative to the first reference time point ($t_0$);
    a feedback controller (CTR) for changing the first temporal compression ($\alpha_1$) used by the transmission wavelet signal generator (WG1), in dependence on the intersection time point ($t_0+t_s$).
    (see FIGS. 1 to 7)

81. Device according to Item 80, additionally comprising
    a correction unit (KE) for generating a correction signal (K1) in dependence on the intersection time point ($t_0+t_s$);
    a first summator (Σ1) for generating a corrected scalar product signal (S10) by adding the value of the correction signal (K1) to the value of the scalar product signal (S8);
    a second filter (F2) for filtering the corrected scalar product signal (S10) to generate a filtered scalar product signal (S11);

wherein the filtered scalar product signal (S11) is used instead of the scalar product signal (S8) for generating the time-continuous, value-discrete evaluation signal (S9).
(see FIGS. 1 to 7)

82. Device according to Item 80 for generating a temporal scalar product signal (S8) by scalar product generation between the receiver output signal (S0) and the first analysis wavelet signal (WS1), additionally comprising
a first multiplier (M1) for generating a filter input signal (S2) by multiplication of the receiver output signal (S0) and the first analysis wavelet signal (WS1);
a first filter (F1) filtering the filter input signal (S2) to generate the scalar product signal (S8).
(see FIGS. 1 to 7)

83. Device according to Item 82, comprising an integrator as a first filter (F1) (see FIGS. 1 to 7).

84. Device according to Item 81, comprising an integrator as a second filter (F2) (see FIGS. 1 to 7).

85. Device according to Item 80, wherein the first wavelet (WS1) of the transmission wavelet signal generator (WG1) and the second wavelet (WL2) of the first analysis wavelet signal generator (WG2) are designed in such a manner that the value of the scalar product signal (S8) is dependent, in a monotonously decreasing or strictly monotonously decreasing manner or in a monotonously increasing or strictly monotonously increasing manner, on the temporal delay ($\Delta t$) of the transmission wavelet signal (S5$d$) in the transmission path to the receiver output signal (S0), wherein the temporal delay ($\Delta t$) is situated in a temporal interval whose temporal length is different from zero (see FIGS. 1 to 7).

86. Device for travel time determination of a first transmission path (I1) between a transmitter (H) and a receiver (D1),
wherein either a delay unit ($\Delta T$) at least temporarily generates, from a transmission signal (S5), a transmission wavelet signal (S5$d$) delayed by a delay time ($\Delta t$) or the transmission wavelet signal (S5$d$) is equal to the transmission signal (S5), and
wherein the transmitter (H), in dependence on the transmission wavelet signal (S5$d$), transmits a first, particularly optical signal (s1), time-segment-wise related to a time segment ($T_z$), into the first transmission path (I1), which first signal (s1) comprises at least one carrier signal as a signal component which at least by a modulation signal is modulated in the amplitude and/or phase and/or polarization and/or wavelength and/or amplitude modulation frequency and/or spectral composition,
wherein, in each time segment ($T_z$) in which the transmitter (H) transmits the first signal (s1), the first signal (s1) comprises, within said respective time segment ($T_z$), a first temporal start ($t_{s1}$) and a first temporal end ($t_{e1}$), and
wherein the first transmission path (I1) can include an object (O), and
wherein the first transmission path (I1) modifies the first signal (s1), when it is passing through this first transmission path (I1), to a second, particularly optical signal (s2), and
wherein this modification relates to the amplitude and/or the phase and/or the polarization and/or the wavelength and/or the amplitude modulation frequency and/or the spectral composition of the second signal (s2) in comparison to the first signal (s1), and
wherein the first receiver (D1) receives the second signal (s2) after its exit from the first transmission path (I1) within said respective time segment ($T_z$), and
wherein, in the first receiver (D1), the second signal (s2) is converted into a receiver output signal (S0), and
wherein a first multiplier (M1) within said respective time segment ($T_z$) multiplies the receiver output signal (S0) by a first receive window signal (SF1) into a first internal signal (S2$a$), and
wherein the first receive window signal (SF1) comprises, within said respective time segment ($T_z$), a second temporal start ($t_{s2}$) that is temporally situated before the first temporal start ($t_{s1}$) of the first signal (s1) and temporally before the temporal end ($t_{e1}$) of the first signal (s1), and
wherein the first receive window signal (SF1) comprises, within said respective time segment ($T_z$), a second temporal end ($t_{e2}$) that is temporally situated after the first temporal start ($t_{s1}$) of the first signal (s1) and temporally before the temporal end ($t_{e1}$) of the first signal (s1), and
wherein a second multiplier (M2) within said respective time segment ($T_z$) multiplies the receiver output signal (S0) by a second receive window signal (SF2) into a second internal signal (S2$b$), and
wherein the second receive window signal (SF2) comprises, within said respective time segment ($T_z$), a third temporal start ($t_{s3}$) that is temporally situated after the first temporal start ($t_{s1}$) of the first signal (s1) and temporally before the temporal end ($t_{e1}$) of the first signal (s1), and
wherein the second receive window signal (SF2) comprises, within said respective time segment ($T_z$), a third temporal end ($t_{e3}$) that is temporally situated after the first temporal start ($t_{s1}$) of the first signal (s1) and temporally after the temporal end ($t_{e1}$) of the first signal (s1), and
wherein a first filter (F1), within said respective time segment ($T_z$), filters the difference of the first internal signal (S2$a$) and the second internal signal (S2$b$) to generate a first filter output signal (S8), and
wherein at least
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time ($\Delta t$)
are dependent on the first filter output signal (S8), and
wherein the first filter output signal (S8) and/or a first output signal (S4) derived therefrom particularly by a following second filter (F2), is used as a measuring value for the travel time determination of the first signal (s1) and/or the second signal (s2) together, in the first transmission path (I1).
(see FIGS. 8 to 11)

87. Device according to Item 86, wherein the first filter (F1) integrates the difference of the first internal signal (S2$a$) and the second internal signal (S2$b$) to generate a first filter output signal (S8) (see FIGS. 8 to 11).

88. Device according to Item 1 or 2,
wherein the first receive window signal (SF1) is zero from the temporal start ($t_{sz}$) of the respective time segment ($T_z$) to the second temporal start ($t_{s2}$) of the first receive window signal (SF1), and
wherein the first receive window signal (SF1) from the second temporal start ($t_{s2}$) of the first receive window signal (SF1) increases in a temporally monotonously increasing or jump-like manner and, for a first minimum constancy time ($t_{k1}$) until the second temporal end ($t_{e2}$) of the first receive window signal (SF1), remains on a constant value, wherein constancy is defined as a variation of the amplitude of the first receive window signal (SF1) by less than 25%, and
wherein the first receive window signal (SF1) from the second temporal end ($t_{e2}$) of the first receive window signal (SF1) decreases in a temporally monotonously decreasing or jump-like manner and then is zero until the temporal end ($t_{ez}$) of the respective time segment ($T_z$).
(see FIGS. 8 to 11)

89. Device according to any one or a plurality of Items 1 to 3,
wherein second first receive window signal (SF2) is zero from the temporal start ($t_{sz}$) of the respective time segment ($T_z$) to the third temporal start ($t_{s3}$) of the second receive window signal (SF2), and
wherein the second receive window signal (SF2) from the third temporal start ($t_{s3}$) of the second receive window signal (SF2) increases in a temporally monotonously increasing or jump-like manner and, for a second minimum constancy time ($t_{k2}$) until the third temporal end ($t_{e3}$) of the second receive window signal (SF2), remains on a constant value, wherein constancy is defined as a variation of the amplitude by less than 25%, and
wherein the second receive window signal (SF2) from the third temporal end ($t_{e3}$) of the second receive window signal (SF2) decreases in a temporally monotonously decreasing or jump-like manner and then is zero until the temporal end ($t_{ez}$) of the respective time segment ($T_z$).
(see FIGS. 8 to 11)

90. Device according to Item 88 or 89, wherein the first minimum constancy time ($t_{k1}$) is equal to the second minimum constancy time ($t_{k2}$) (see FIGS. 8 to 11).

91. Device according to any one or a plurality of Items 88 to 90, wherein the first minimum constancy time ($t_{k1}$) and/or the second minimum constancy time ($t_{k2}$) is larger than the temporal resolution by which
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time ($\Delta t$)
are dependent on the first filter output signal (S8) and/or a first digitized filter output signal (S9).
(see FIGS. 8 to 11)

92. Device according to any one or a plurality of Items 88 to 91, wherein the first minimum constancy time ($t_{k1}$) and/or the second minimum constancy time ($t_{k2}$) is larger than the temporal sum of the temporal resolution by which
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time ($\Delta t$)
are dependent on
the first filter output signal (S8) and/or a first digitized filter output signal (S9),
plus the rise time ($t_a$) by which the transmitter (H) starts transmitting,
plus the fall time ($t_f$) by which the transmitter (H) ends transmitting.
(see FIGS. 8 to 11)

93. Device according to any one or a plurality of Items 86 to 92, wherein the first filter (F1) is a linear filter having a filter function f($\Delta$S2), with $\Delta$S2 representing the differential signal of the first internal signal (S2a) and the second internal signal (S2b) (see FIGS. 8 to 11).

94. Device according to Item 93, wherein the amount change of a filter function f(SF2) depending on the second receive window signal (SF2) and corresponding to Item 86 is, from the temporal start ($t_{sz}$) of the respective time segment ($T_z$) to the temporal end ($t_{ez}$) of the respective time segment ($T_z$), equal to the amount change of the filter function f(SF1) depending on the first receive window signal (SF1) and corresponding to Item 86 from the temporal start ($t_{sz}$) of the respective time segment to the temporal end ($t_{ez}$) of the respective time segment (see FIGS. 8 to 11).

95. Device according to Items 87 and 93, wherein the temporal integral of the second receive window signal (SF2) from the temporal start ($t_{sz}$) of the respective time segment ($T_z$) to the temporal end ($t_{ez}$) of the respective time segment ($T_z$) is equal to the integral of the first receive window signal (SF1) from the temporal start ($t_{sz}$) of the respective time segment ($T_z$) to the temporal end ($t_{ez}$) of the respective time segment ($T_z$) (see FIGS. 8 to 11).

96. Device according to any one or a plurality of Items 86 to 95,
wherein the first filter output signal (S8) is converted, by an analog-to-digital converter (ADC) or a time-to-digital converter (TDC), into an value-discrete first digitized filter output signal (S9) which can be time-discrete and
wherein at least
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time ($\Delta t$)
are dependent on the first digitized filter output signal (S9) instead of the first filter output signal (S8), and
wherein the first filter output signal (S8) and/or the first digitized filter output signal (S9) and/or one or a plurality of first output signals (S4) derived from these, particularly by one or a plurality of following second filters (F2), are used, within said respective time segment ($T_z$), as a measuring value for the travel time determination of the first signal (s1) in the transmission path (I1).
(see FIGS. 8 to 11).

97. Device according to Item 96,
wherein a first summator (Σ1) summates the filter output signal (S8) and a first correction signal (SK1) to generate a second filter input signal (S10), and
wherein a third linear filter (F3) having a filter function $f_3$(S10) filters the second filter input signal (S10) to generate a third filter output signal (S11), and
wherein the third filter output signal (S11) instead of the first filter output signal (S8) is converted, by an analog-to-digital converter (ADC) or a time-to-digital converter (TDC), into the value-discrete first digitized filter output signal (S9), and
wherein a correction signal generating unit (KE) generates the first correction signal (SK1) in dependence on the digitized filter output signal (S9).
(see FIGS. 8 to 11).

98. Device according to any one or a plurality of Items 86 to 97,
wherein a controller (CTR) generates a first controller output signal (S12) in dependence on the filter output signal (S8) and/or the digitized filter output signal (S9) and/or the third filter output signal (S11) and optionally a default value (Ref), and
wherein at least
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time (Δt)
are dependent on the first controller output signal (S12) instead of the first digitized filter output signal (S9) or the first filter output signal (S8).
(see FIGS. 8 to 11).

99. Device according to Item 98, wherein the controller (CTR) is a PID controller (see FIGS. 8 to 11).

100. Device according to Item 98 or 99, wherein the controller (CTR) or a part device of the controller (CTR) comprises a hysteresis (see FIGS. 8 to 11).

101. Device according to any one or a plurality of Items 86 to 100,
wherein the device comprises a temperature sensor (TS) for detection, in the form of a temperature sensor signal (TSS), of the temperature (T) of the transmitter (H) or a temperature being in a cause-effect relationship with it, and
wherein at least
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time (Δt)
are dependent on the temperature sensor signal (TSS) at least partially within the respective time segment ($T_z$).
(see FIGS. 8 to 11)

102. Device according to any one or a plurality of Items 86 to 101,
wherein the transmitter (H) takes up an electric transmission current ($I_H$), and
wherein the device comprises a transmission current detection device ($I_{HM}$) which supplies a transmission current measuring signal ($I_{MS}$), and
wherein at least
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time (Δt)
are at least partially dependent on the transmission current measuring signal ($I_{MS}$).
(see FIGS. 8 to 11)

103. Device according to any one or a plurality of Items 86 to 102, wherein either
the second temporal start ($t_{s2}$) of the first receive window signal (SF1) is identical with the second temporal end ($t_{e2}$) of the first receive window signal (SF1), and the third temporal start ($t_{s3}$) of the second receive window signal (SF2) is situated after the third temporal end ($t_{e3}$) of the second receive window signal (SF2), or
the second temporal start ($t_{s2}$) of the first receive window signal (SF1) is situated after the second temporal end ($t_{e2}$) of the first receive window signal (SF1), and the third temporal start ($t_{s3}$) of the second receive window signal (SF2) is identical with the third temporal end ($t_{e3}$) of the second receive window signal (SF2).
(see FIGS. 8 to 11)

104. Device according to any one or a plurality of Items 86 to 105, wherein the second temporal start ($t_{s2}$) of the first receive window signal (SF1) and the third temporal start ($t_{s3}$) of the second receive window signal (SF2) are dependent in the same manner on the first filter output signal (S8) and/or the first digitized filter output signal (S9) and/or the third filter output signal (S11) and/or the first controller output signal (S12), which means that the corresponding derivations do not differ from each other with respect to the sign and do not differ from each other with respect to their amount by more than 25% (see FIGS. 8 to 11).

105. Device according to any one or a plurality of Items 86 to 104, wherein the second temporal start ($t_{s2}$) of the first receive window signal (SF1) and the third temporal end ($t_{e3}$) of the second receive window signal (SF2) are dependent in the same manner on the first filter output signal (S8) and/or the first digitized filter output signal (S9) and/or the third filter output signal (S11) and/or the first controller output signal (S12), which means that the corresponding derivations do not differ from each other with respect to the sign and do not differ from each other with respect to their amount by more than 25% (see FIGS. 8 to 11).

106. Device according to any one or a plurality of Items 86 to 105, wherein the second temporal end ($t_{e2}$) of the first receive window signal (SF1) and the third temporal end ($t_{e3}$) of the second receive window signal (SF2) are dependent in the same manner on the first filter output signal (S8) and/or the first digitized filter output signal (S9) and/or the third filter output signal (S11) and/or the first controller output signal (S12), which means that the corresponding derivations do not differ from each other with respect to the sign and do not differ from each other with respect to their amount by more than 25% (see FIGS. 8 to 11).

107. Device according to any one or a plurality of Items 86 to 106, wherein the second temporal end ($t_{e2}$) of the first receive window signal (SF1) and the third temporal start ($t_{s3}$) of the second receive window signal (SF2) are dependent in the same manner on the first filter output signal (S8) and/or the first digitized filter output signal (S9) and/or the third filter output signal (S11) and/or the first controller output signal (S12), which means that the corresponding derivations do not differ from each other with respect to the sign and do not differ from each other with respect to their amount by more than 25% (see FIGS. 8 to 11).

108. Device according to any one or a plurality of Items 86 to 107, for parallel determination of the travel time in a second transmission path (I2) which can entirely or partially coincide with the first transmission path (I1), between the transmitter (H) and at least one further receiver (D2),
    wherein the transmitter (H), in dependence on the transmission wavelet signal (S5d), transmits a third, particularly optical signal (s3) in a time-segment-wise manner into the second transmission path (I2), which third signal (s3) comprises at least one carrier signal as a signal component which at least by a modulation signal is modulated in the amplitude and/or phase and/or polarization and/or wavelength and/or amplitude modulation frequency and/or spectral composition,
    wherein, in each time segment ($T_z$) in which the transmitter (H) transmits the third signal (s3), the third signal (s3) comprises, within said respective time segment ($T_z$), a fourth temporal start ($t_{s4}$) and a fourth temporal end ($t_{e4}$), and
    wherein the second transmission path (I2) can include a further object (O2) and/or the object (O), and
    wherein the second transmission path (I2) modifies the third signal (s3), when it is passing through this second transmission path (I2), to a fourth, particularly optical signal (s4), and
    wherein this modification relates to the amplitude and/or the phase and/or the polarization and/or the wavelength and/or the amplitude modulation frequency and/or the spectral composition of the fifth signal in comparison to the fourth signal, and
    wherein the further receiver (D2) receives the fourth signal (s4) after its exit from the second transmission path (I2) within said respective time segment ($T_z$), and
    wherein, in the further receiver (D2), the fourth signal (s4) is converted into a further receiver output signal (S0B), and
    wherein a third multiplier (M3) within said respective time segment ($T_z$) multiplies the further receiver output signal (S0B) by a third receive window signal (SF3) into a third internal signal (S2Ba), and
    wherein third first receive window signal (SF3) comprises, within said respective time segment ($T_z$), a fifth temporal start ($t_{s5}$) that is temporally situated before the fourth temporal start ($t_{s4}$) of the third signal (s4) and temporally before the fourth temporal end ($t_{e4}$) of the fourth signal (s4), and
    wherein the third receive window signal (SF3) comprises, within said respective time segment ($T_z$), a fifth temporal end ($t_{e5}$) that is temporally situated after the fourth temporal start ($t_{s4}$) of the fourth signal (s4) and temporally before the fourth temporal end ($t_{e4}$) of the fourth signal (s4), and
    wherein a fourth multiplier (M4) within said respective time segment ($T_z$) multiplies the further receiver output signal (S0B) by a fourth receive window signal (SF4) into a fourth internal signal (S2Bb), and
    wherein the fourth receive window signal (SF4) comprises, within said respective time segment ($T_z$), a sixth temporal start ($t_{s6}$) that is temporally situated after the fourth temporal start ($t_{s4}$) of the fourth signal (s4) and temporally before the fourth temporal end ($t_{e4}$) of the fourth signal (s4), and
    wherein the fourth receive window signal (SF4) comprises, within said respective time segment ($T_z$), a sixth temporal end ($t_{e6}$) that is temporally situated after the fourth temporal start ($t_{s4}$) of the fourth signal (s4) and temporally after the fourth temporal end ($t_{e4}$) of the fourth signal (s4), and
    wherein a fourth filter (F4) filters the difference of the third internal signal (S2Ba) and the fourth internal signal (S2Bb) to generate a fourth filter output signal (S8B), and
    wherein at least
        the fifth temporal start ($t_{s5}$) of the third receive window signal (SF3) and/or
        the fifth temporal end ($t_{e5}$) of the third receive window signal (SF3) and/or
        the sixth temporal start ($t_{s6}$) of the fourth receive window signal (SF4) and/or
        the sixth temporal end ($t_{e6}$) of the fourth receive window signal (SF4) and/or
        the delay time ($\Delta t$)
    are dependent, within said respective time segment ($T_z$), on the fourth filter output signal (S8B), and
    wherein the fourth filter output signal (S8B) and/or a further output signal (S4B) derived therefrom particularly by a following fifth filter (F5), is used, within said respective time segment ($T_z$), as a further measuring value for the travel time determination of the fourth signal (s4) in the second transmission path (I2).
    (see FIGS. 8 to 11)

109. Device according to Item 108,
    wherein a second summator ($\Sigma 2$) generates a receiver output sum signal (S0$\Sigma$) from the receiver output signal (S0) and the further receiver output signal (S0B) by summation,
    wherein the third multiplier (M3) multiplies the receiver output sum signal (S0$\Sigma$) instead of the further receiver output signal (S0B) by the third receive window signal (SF3) into the third internal signal (S2Ba), and
    wherein the fourth multiplier (M4) multiplies the receiver output sum signal (S0$\Sigma$) instead of the further receiver output signal (S0B) by the fourth receive window signal (SF4) into the fourth internal signal (S2Bb).
    (see FIGS. 8 to 11)

110. Device according to Item 108 or 109,
    wherein a fourth difference generation unit ($\Delta S$) generates a receiver output differential signal (S0$\Delta$) from the receiver output signal (S0) and the further receiver output signal (S0B) by difference generation,
    wherein the third multiplier (M3) multiplies the receiver output differential signal (S0$\Delta$) instead of the further receiver output signal (S0B) by the third receive window signal (SF3) into the third internal signal (S2Ba), and wherein the fourth multiplier (M4) multiplies the receiver output differential signal (S0Δ) instead of the further receiver output signal (S0B) by the fourth receive window signal (SF4) into the fourth internal signal (S2Bb).

(see FIGS. 8 to 11)

111. Device according to any one or a plurality of Items 86 to 110,
  wherein the first multiplier (M1) is designed as an analog switch which outputs either the receiver output signal (S0) or a predetermined fixed potential as a first internal signal (S2a) in dependence on the first receive window signal (SF1), and
  wherein the second multiplier (M2) is designed as an analog switch which outputs either the receiver output signal (S0) or a predetermined fixed potential as a second internal signal (S2b) in dependence on the second receive window signal (SF2).
  (see FIGS. 8 to 11)

112. Device according to any one or a plurality of Items 86 to 111,
  wherein the first multiplier (M1) is designed as an analog switch which connects the receiver output signal (S0) to the first internal signal (S2a) and separates the receiver output signal (S0) from the first receiver (D1) when the first receive window signal (SF1) is in a first state, and
  wherein the first multiplier (M1) separates the receiver output signal (S0) from the first internal signal (S2a) and connects the receiver output signal (S0) and the first receiver (D1) when the first receive window signal (SF1) is in a second state, and
  wherein the second multiplier (M2) is designed as an analog switch which connects the receiver output signal (S0) to the second internal signal (S2b) and separates the receiver output signal (S0) from the first receiver (D1) when the second receive window signal (SF2) is in a first state, and
  wherein the second multiplier (M2) separates the receiver output signal (S0) from the second internal signal (S2b) and connects the receiver output signal (S0) and the first receiver (D1) when the second receive window signal (SF2) is in a second state.
  (see FIGS. 8 to 11)

113. Device according to any one or a plurality of Items 86 to 111,
  wherein the first multiplier (M1) is designed as an analog switch which connects the receiver output signal (S0) to the first internal signal (S2a) and separates the receiver output signal (S0) from the first receiver (D1) when the first receive window signal (SF1) is in a first state, and
  wherein the first multiplier (M1) separates the receiver output signal (S0) from the first internal signal (S2a) and connects the receiver output signal (S0) and the receiver (D) and separates the first receiver (D1) from the current and voltage source when the first receive window signal (SF1) is in a second state, and
  wherein the second multiplier (M2) is designed as an analog switch which connects the receiver output signal (S0) to the second internal signal (S2b) and separates the receiver output signal (S0) from the first receiver (D1) when the second receive window signal (SF2) is in a first state, and
  wherein the second multiplier (M2) separates the receiver output signal (S0) from the second internal signal (S2b) and connects the receiver output signal (S0) and the first receiver (D1) when the second receive window signal (SF2) is in a second state, and
  wherein the device comprises a part device which connects the receiver output signal (S0) to a current and voltage source when the receiver output signal (S0) is connected neither to the first internal signal (S2a) nor to the second internal signal (S2b).
  (see FIGS. 8 to 11)

114. Method for travel time determination of a first optical signal (s1) in a first transmission path (I1) which can include an object (O), between a transmitter (H) and a first receiver (D1), comprising the steps of:
  optionally, at least temporarily delaying a transmission signal (S5) by a delay time (Δt) to generate a transmission wavelet signal (S5d), wherein this is performed particularly by a delay unit (ΔT) or the transmission wavelet signal (S5d) is equal to the transmission signal (S5),
  related to a time segment ($T_z$), time-segment-wise transmission of a first, particularly optical signal (s1) into the first transmission path (I1) in dependence on the transmission wavelet signal (S5d), particularly by a transmitter (H),
    wherein the first signal (s1) comprises at least one carrier signal as a signal component which at least by a modulation signal is modulated in the amplitude and/or phase and/or polarization and/or wavelength and/or amplitude modulation frequency and/or spectral composition, and
    wherein, in each time segment ($T_z$) in which particularly the transmitter (H) transmits the first signal (s1), the first signal (s1) comprises, within said respective time segment ($T_z$), a first temporal start ($t_{s1}$) and a first temporal end ($t_{e1}$);
  modifying the first signal (s1), when it is passing through this first transmission path (I1), to a second, particularly optical signal (s2), and
    wherein this modification relates to the amplitude and/or the phase and/or the polarization and/or the wavelength and/or the amplitude modulation frequency and/or the spectral composition of the second signal (s2) in comparison to the first signal (s1), and
  receiving the second signal (s2) after its exit from the transmission path (I1) within said respective time segment ($T_z$), particularly by the first receiver (D1);
  converting the second signal (s2) into a receiver output signal (S0), particularly in the first receiver (D1),
  multiplying the receiver output signal (S0) by a first receive window signal (SF1) into a first internal signal (S2a), particularly by a first multiplier (M1)
    wherein the first receive window signal (SF1) comprises, within said respective time segment ($T_z$), a second temporal start ($t_{s2}$) that is tempos rally situated before the first temporal start ($t_{s1}$) of the first signal (s1) and temporally before the temporal end ($t_{e1}$) of the first signal (s1), and
    wherein the first receive window signal (SF1) comprises, within said respective time segment ($T_z$), a second temporal end ($t_{e2}$) that is temporally situated after the first temporal start ($t_{s1}$) of the first signal (s1) and temporally before the temporal end ($t_{e1}$) of the first signal (s1), and
  multiplying the receiver output signal (S0) by a second receive window signal (SF2) into a second internal signal (S2b), particularly by a second multiplier (M2)
    wherein the second receive window signal (SF2) comprises, within said respective time segment ($T_z$), a third temporal start ($t_{s3}$) that is temporally situated after the first temporal start ($t_{s1}$) of the first signal (s1) and temporally before the temporal end ($t_{e1}$) of the first signal (s1), and wherein the second receive window signal (SF2) comprises, within said respective time segment ($T_z$), a third temporal end ($t_{e3}$) that is temporally situated after the first temporal start ($t_{s1}$) of the first signal (s1) and temporally after the temporal end ($t_{e1}$) of the first signal (s1), and filtering the difference of the first internal signal (S2a) and the second internal signal (S2b) to generate a first filter output signal (S8), particularly by a first filter (F1), generating an output signal (S4) in dependence on the first filter output signal (S8) and/or use of the first filter output signal (S8) as an output signal (S4), particularly by a subsequent second filter (F2);

using the output signal (S4) as representing a measuring value for the travel time determination of the first signal (s1) and/or the second signal (s2) together, in the first transmission path (I1), wherein at least
the second temporal start ($t_{s2}$) of the first receive window signal (SF1) and/or
the second temporal end ($t_{e2}$) of the first receive window signal (SF1) and/or
the third temporal start ($t_{s3}$) of the second receive window signal (SF2) and/or
the third temporal end ($t_{e3}$) of the second receive window signal (SF2) and/or
the delay time ($\Delta t$)
are dependent on the first filter output signal (S8).
(see FIGS. 8 to 11)

115. Method for travel time determination of a first, particularly optical signal (s1) in a first transmission path (I1) between a transmitter (H) and a first receiver (D1), wherein the transmitter (H) transmits a first signal (s1) into the first transmission path (I1) that, after passing through at least a part of the first transmission path (I1) (and thus being delayed), is received by the first receiver (D1) as a second signal (s2) being a modified first signal (s1), and is converted into a receiver output signal (S0), and wherein, in the first receiver (D1), the second signal (s2) is evaluated within two temporal receive windows, a first receive window (SF1) having a first temporal length (T1) and a second receive window (SF2) having a second temporal length (T2), wherein the start of the first signal (s1) is included exclusively in the first receive window (SF1) and the end of the first signal (s1) is included exclusively in the second receive window (SF2), wherein the receiver output signal (S0) comprises a first signal portion which is to be assigned to the first receive window (SF1), and a second signal portion which is to be assigned to the second receive window (SF2), wherein the first signal portion averaged over a predefined time segment ($T_z$) is, except for a deviation, as large as the second signal portion averaged over the time segment ($T_z$), and wherein the deviation is at least temporarily used as a feedback control signal for the temporal position of one or both receive windows (SF1, SF2) in relation to the first signal (s1) and/or the temporal position of the first signal (s1) in relation to the two receive windows (SF1,SF2), and/or the first temporal length (T1) of the first receive window and/or of the second temporal length (T2) of the second receive window (SF1,SF2).
(see FIGS. 8 to 11)

116. Method according to Item 115, wherein the deviation and a first correction signal (SKE) are summated and this sum is then integrated, and this integration result instead of the deviation is used as a feedback control signal (see FIGS. 8 to 11).

117. Method for travel time determination of a transmission path between a transmitter and a receiver, wherein
the transmitter transmits a signal into the transmission path that, after passing through at least a part of the transmission path (and thus being delayed), is detected by the receiver,
in the receiver, the signal is evaluated within two receive windows, wherein the start of the signal is included exclusively in the first window and the end of the signal is included exclusively in the second window,
a received signal (88) received by the receiver comprises a first signal portion which is to be assigned to the first receive window, and a second signal portion which is to be assigned to the second receive window, wherein the first signal portion averaged over a predefined time period (T) is as large as the second signal portion averaged over the time period (T), and,
relative to the received signal (88) received by the receiver, the deviation (99) of the first signal portion averaged over the predefined time period (T) from the second signal portion averaged over the predefined time period (T) is at least temporarily used as a feedback control signal for the temporal position of one or both receive windows in relation to the transmission signal and/or the temporal position of the transmission signal in relation to the two receive windows, and/or the distribution of the length of the two receive windows.

118. Method according to Item 117, wherein the receive windows consist of functions by which the signal is weighted prior to averaging, preferably having the following properties:
at the start of one or both receive windows, they increase monotonously from zero,
in the central portion, both windows are constant,
at the end of one or both receive windows, they decrease monotonously to zero,
the integral at the start of the first window is identical with the integral at the end of the second window,
the integral at the end of the second window is identical with the integral at the start of the second window.

119. Method according to any one or a plurality of Items 117 to 119, wherein a second comparator LED transmits alternatingly with the transmission signal and over a fixed distance is additively added to the received signal, and/or the two receiving windows are separated, abut each other or overlap with each other if the start of the signal is situated exclusively in the first window and the end of the signal is situated exclusively in the second window, and/or a feedback controller with integral portion is provided, wherein the digital-to-time and/or the digital-to-charge converter has a substantially higher resolution than the ADC, and possible feedback controllers are PID controllers whose integral portion is formed with hysteresis.

LIST OF REFERENCE NUMERALS (FIG. 1 BIS 7)

α first temporal compression of a wavelet
$α_1$ first temporal compression of a first wavelet WL1

α₂ first temporal compression of a second wavelet WL2
Δt delay of the receiver output signal S0 relative to the transmission wavelet signal S5d
CTR feedback controller
E receiver of the transmission path I1
F1 first filter
F1b further first filter
F2 second filter
I1 transmission path
K1 correction signal
KE correction unit
M1 first multiplier
M1b second multiplier
ω frequency
φ phase
Ref reference value
S transmitter of transmission path I1
S0 receiver output signal
S2 filter input signal
S2b second filter input signal
S5d transmission wavelet signal
S8 scalar product signal
S8s scalar product signal
S8a first scalar product pre-signal
S8b second scalar product pre-signal
S9 time-continuous, value-discrete evaluation signal
S10 corrected scalar product signal
S11 filtered scalar product signal
Σ1 first summator
Σ2 second summator
$t_m$ controlled parameter of the transmission wavelet and/or analysis waves let signal
$t_0$ first reference time point of the first wavelet WL1 during feedback control of the delay time $t_v$ of the second reference time point $t_0+t_v$ of the second wavelet WL2, and respectively second reference time point of the second wavelet WL2 during feedback control of the delay time $t_v$ of the first reference time point $t_0+t_v$ of the first wavelet WL1
$t_0+t_s$ intersection time point (i.e. the time point when the scalar product signal S8 and resp. S8s takes on the reference value Ref)
$t_0+t_v$ first reference time point $t_0+t_v$ of the first wavelet WL1 during feedback control thereof, and resp. second reference time point $t_0+t_v$ of the second wavelet WL2 during feedback control thereof,
$t_{sy}$ synchronization signal
$t_v$ delay
TDC time-to-digital converter (typically a comparator)
WG1 transmission wavelet signal generator
WG2 first analysis wavelet signal generator
WG3 second analysis wavelet signal generator
WL1 first wavelet
WL2 second wavelet
WS1 first analysis wavelet signal
WS2 second analysis wavelet signal
WS1,S0 Skalar-Produkt zwischen dem (ersten) Analysewavelet-Signal WS1 und dem Empfängerausgangssignal S0

LIST OF REFERENCE NUMERALS (FIGS. 8 to 11)

ΔS difference generation device
ΔS2 differential signal from the first internal signal S2a and the second internal signal S2b Δt delay time by which the delay unit ΔT delays the transmission signal S5 to generate the delayed transmission wavelet signal S5d
ΔT delay unit
ADC analog-to-digital-converter. In the simplest case, this can be a comparator, inverter, Schmitt trigger etc. as a one-bit analog-to-digital converter.
CTR feedback controller
D1 first receiver
D2 further receiver
DAC digital-to-analog converter
f(ΔS2) filter function of the first filter F1 with the parameter signal ΔS2
F1 first filter. The first filter F1 preferably is a linear filter with a filter function f(ΔS2), wherein ΔS2 is the differential signal from the first internal signal S2a and the second internal signal S2b.
F2 second filter
F3 third filter. The third filter F1 preferably is a linear filter with a filter function $f_3(S10)$.
F4 fourth filter. The fourth filter F4 preferably is a linear filter with a filter function f4(ΔS2B), wherein ΔS2B is the differential signal from the third internal signal S2Ba and the fourth internal signal S2Bb.
F5 fifth filter
I1 first transmission path
I2 second transmission path
$I_H$ transmitter current. This is the electric current that the transmitter H takes up for its operation
$I_{HM}$ transmission current detection device for detection of the transmitter current $I_H$
IMS transmission current measurement signal. This signal represents the transmission current detected by the transmission current detection device $I_{HM}$.
KE correction signal generating unit which generates the first correction signal SK1 in dependence on the digitized filter output signal S9
LED light-emitting diode
M1 first multiplier
M2 second multiplier
M3 third multiplier
M4 fourth multiplier
O object whose distance is to be measured by travel time measurement
O2 further object whose distance is to be measured by travel time measurement
Ref optional default value for the feedback controller CTR
Σ1 first summator
Σ2 second summator device
S0 receiver output sigmal signal of the first receiver D1
S0B further receiver output sigmal signal of the further receiver D2
S0Δ receiver output differential signal
S0Σ receiver output sum signal
s1 first, particularly optical signal
s2 second, particularly optical signal which, due to the travel time, is delayed particularly relative to the first signal s1 or is modified in another manner
s3 third, particularly optical signal
s4 fourth, particularly optical signal which, due to a further travel time, is delayed particularly relative to the third signal s3 or is modified in another manner
S2a first internal signal
S2b second internal signal
S2Ba third internal signal
S2Bb fourth internal signal
S4 first output signal S4B further output signal
S5 transmission signal
S5d transmission wavelet signal
S8 first filter output signal of the first filter F1
S8B fourth filter output signal of the fourth filter F4
S9 first digitized filter output signal
S10 second filter input signal
S11 third filter output signal
S12 first controller output signal
SF1 first receive window signal
SF2 second receive window signal
SF3 third receive window signal
SF4 fourth receive window signal
SK1 first correction signal
T temperature of the transmitter
$t_a$ rise time $t_a$ with which the transmitter H starts transmitting
$t_f$ fall time $t_f$ with which the transmitter H ends transmitting
$t_{k1}$ first temporal minimum constancy time in which the first receive window signal SF1 is different from zero and changes in amplitude by less than 25%, preferably not at all
$t_{k2}$ second temporal minimum constancy time in which the second receive window signal SF2 is different from zero and changes in amplitude by less than 25%, preferably not at all
$t_{s1}$ first temporal start of signal s1
$t_{e1}$ first temporal end of signal s1
$t_{s2}$ second temporal start of the first receive window signal SF1
$t_{e2}$ second temporal end of the first receive window signal SF1
$t_{s3}$ third temporal start of the second receive window signal SF2
$t_{e3}$ third temporal end of the second receive window signal SF2
$t_{s4}$ fourth temporal start of the third signal s3
$t_{e4}$ fourth temporal end of the third signal s3
$t_{ez}$ temporal end of time segment $T_z$
$t_{sz}$ temporal start of time segment $T_z$
$t_{s5}$ fifth temporal start of the third receive window signal SF3
$t_{e5}$ fifth temporal end of the third receive window signal SF3
$t_{s6}$ sixth temporal start of signal SF4
$t_{e6}$ sixth temporal end of the fourth receive window signal SF4
TS temperature sensor
TSS temperature sensor signal
$T_z$ time segment
V1 input amplifier
V2 transmission amplifier

The invention claimed is:

1. A device for converting into a digital value, a temporal delay of an output signal of a receiver of a transmission path relative to a transmission wavelet signal transmitted into the transmission path by a transmitter, comprising:
   a transmission wavelet signal generator programmed to generate the transmission wavelet signal on the basis of a first temporal wavelet having a first reference time point, wherein the transmission wavelet signal is defined, by respective parameters adapted to be predetermined by the transmission wavelet signal generator, with respect to (1) the transmission wavelet signal's temporal position, i.e. the transmission wavelet signal's start and/or the transmission wavelet signal's end time point, wherein both time points are variable, and/or with respect to (2) the transmission wavelet signal's temporal expansion or compression, i.e. a temporal interval between the transmission wavelet signal's start and the transmission wavelet signal's end time point, wherein both time points are variable in a concurrent or countercurrent manner, and/or with respect to (3) the transmission wavelet signal's amplitude,
   a first analysis wavelet signal generator programmed to generate a first analysis wavelet signal on the basis of a second temporal wavelet having a second reference time point, wherein the first analysis wavelet signal is defined, by respective parameters adapted to be predetermined by the first analysis wavelet signal generator, with respect to (1) its temporal position, i.e. the first analysis wavelet signal's start and/or the first analysis wavelet signal's end time point, wherein both time points are variable, and/or with respect to (2) the first analysis wavelet signal's temporal expansion or compression, i.e. a temporal interval between the first analysis wavelet signal's start and its end time point, wherein both time points are variable in a concurrent or countercurrent manner, and/or with respect to (3) the first analysis wavelet signal's amplitude,
   a scalar product unit programmed to calculate a temporal scalar product signal from the receiver output signal and the first analysis wavelet signal,
   a time-to-digital converter programmed to generate a time-continuous value-discrete, particularly binary evaluation signal for a length of a predeterminable measuring time interval by comparing a magnitude of the temporal scalar product signal with a first reference value and for changing the value of the evaluation signal at that time point at which the temporal scalar product signal becomes equal to the reference value or larger than the reference value, and
   a feedback controller programmed to vary either at least one of the parameters defining the transmission wavelet signal of the transmission wavelet signal generator or at least one of the parameters defining the first analysis wavelet signal of the first analysis wavelet signal generator or both at least one of the parameters defining the transmission wavelet signal of the transmission wavelet signal generator and at least one of the parameters defining the first analysis wavelet signal of the first analysis wavelet signal generator, namely in dependence on the time point at which, relative to the reference time point of the first temporal wavelet of the transmission wavelet signal, the temporal scalar product signal equals to the reference value or larger than the reference value, wherein this time point is a temporal working point,
   wherein the first temporal wavelet of the transmission wavelet signal generator and the second temporal wavelet of the first analysis wavelet generator are designed in such a different manner from each other that, in a temporal range around the temporal working point, a value of the temporal scalar product signal is dependent, in a monotonously decreasing, particularly strictly monotonously decreasing manner, or in a monotonously increasing, particularly strictly monotonously increasing manner, on the temporal delay the output signal of the receiver of the transmission path relative to the transmission wavelet signal transmitted into the transmission path by the transmitter, wherein the temporal delay is situated in a temporal interval whose temporal length is different from zero.

2. The device according to claim 1, wherein the scalar product unit is provided with a multiplier for computing a filter input signal as a multiplication of the receiver output signal and of the first analysis wavelet signal, and with a first filter, particularly a lowpass filter, for filtering the filter input signal.

3. The device according to claim 2, wherein the first filter is an integrator or is operated as an integrator.

4. The device according to claim 1, comprising:
- a correction unit for generating a correction signal, in dependence on the time point at which, relative to the reference time point of the first temporal wavelet of the transmission wavelet signal, the scalar product signal becomes equal to the reference value or larger than the reference value,
- a summator for generating a corrected scalar product signal by adding the correction signal to the scalar product signal;
- a second filter, particularly a lowpass filter, for filtering the corrected scalar product signal so as to generate a filtered scalar product signal;
- wherein the filtered scalar product signal is adapted to be supplied to the time-to-digital converter so as to generate the evaluation signal.

5. The device according to claim 4, wherein the second filter is an integrator or is operated as an integrator.

6. The device according to claim 1, wherein the time-to-digital converter is a comparator.

\* \* \* \* \*